US012699481B2

(12) United States Patent　　　　　(10) Patent No.:　US 12,699,481 B2
Han et al.　　　　　　　　　　　　　(45) Date of Patent:　　　Aug. 4, 2026

(54) ELECTRONIC DEVICE COMPRISING TOUCH SENSOR LAYER

(71) Applicant: Samsung Display Co., LTD., Yongin-si (KR)

(72) Inventors: Jeongyun Han, Yongin-si (KR); Yeri Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/025,858

(22) Filed: Jan. 16, 2025

(65) Prior Publication Data

US 2025/0348169 A1　　　Nov. 13, 2025

(30) Foreign Application Priority Data

May 9, 2024　(KR) ........................ 10-2024-0060896

(51) Int. Cl.
*G06F 3/041*　　　　(2006.01)
*G06F 3/0354*　　　(2013.01)
*G06F 3/044*　　　　(2006.01)
(52) U.S. Cl.
CPC ...... *G06F 3/04166* (2019.05); *G06F 3/03545* (2013.01); *G06F 3/04164* (2019.05);
(Continued)
(58) Field of Classification Search
CPC ................. G06F 3/046; G06F 3/04166; G06F 3/041662; G06F 3/04164; G06F 3/0448;
(Continued)

(56) References Cited

U.S. PATENT DOCUMENTS 11,264,434 B2　3/2022　Jeong et al.
11,782,550 B2　10/2023　Cho et al.
(Continued)

FOREIGN PATENT DOCUMENTS

EP　　　4421596 A1　8/2024
JP　　　6568982 B2　8/2019
(Continued)

OTHER PUBLICATIONS

Extended European Search Report issued in corresponding EP Application No. 25162156.1, dated Aug. 25, 2025 (10 pages).

*Primary Examiner* — Deeprose Subedi
(74) *Attorney, Agent, or Firm* — Womble Bond Dickinson (US) LLP

(57)　　　　　ABSTRACT

An electronic device includes: a sensor layer including a first conductive layer, a second conductive layer on the first conductive layer, a third conductive layer on the second conductive layer, and a fourth conductive layer on the third conductive layer; and a sensor driving unit driving the sensor layer and selectively operated in a first mode of sensing a touch input or a second mode of sensing a pen input, wherein two conductive layers include: a plurality of first touch electrodes; and a plurality of second touch electrodes and insulated from and intersecting the plurality of first touch electrodes, and wherein another two conductive layers among the first to fourth conductive layers include: a plurality of first pen electrodes arranged in the first direction; and a plurality of second pen electrodes arranged in the second direction and insulated from and intersecting the plurality of first pen electrodes.

34 Claims, 43 Drawing Sheets

(52) U.S. Cl.
CPC .......... *G06F 3/0445* (2019.05); *G06F 3/0446*
(2019.05); *G06F 2203/04111* (2013.01); *G06F*
*2203/04112* (2013.01)

(58) Field of Classification Search
CPC .. G06F 3/0445; G06F 3/03545; G06F 3/0446;
G06F 3/0412; G06F 2203/04112; G06F
2203/04106; G06F 2203/04111; G06F
2203/04102; H10K 59/40
See application file for complete search history.

(56) References Cited

U.S. PATENT DOCUMENTS

| | | |
|---|---|---|
| 12,019,823 B2 | 6/2024 | Choi et al. |
| 2014/0182894 A1 | 7/2014 | Liu et al. |
| 2018/0120971 A1* | 5/2018 | Lee ...................... G06F 3/0446 |
| 2018/0246608 A1 | 8/2018 | Huh et al. |
| 2023/0054462 A1 | 2/2023 | Jeon |
| 2024/0192822 A1* | 6/2024 | Shuai ..................... G06F 3/046 |
| 2025/0264946 A1 | 8/2025 | Moon et al. |

FOREIGN PATENT DOCUMENTS

| | | |
|---|---|---|
| KR | 10-2020-0060601 A | 6/2020 |
| KR | 10-2021-0124141 A | 10/2021 |
| KR | 10-2022-0091311 A | 6/2022 |
| KR | 10-2022-0113197 A | 8/2022 |
| KR | 10-2023-0103605 A | 7/2023 |
| WO | 2023/068872 A1 | 4/2023 |

* cited by examiner

EE

200

DR2

CDR2    CDR1

ELECTRONIC DEVICE COMPRISING TOUCH SENSOR LAYER

CROSS-REFERENCE TO RELATED APPLICATIONS

The present application claims priority to and the benefit of Korean Patent Application No. 10-2024-0060896, filed on May 9, 2024, in the Korean Intellectual Property Office, the entire disclosures of which is incorporated herein by reference.

BACKGROUND

Aspects of some embodiments of the present disclosure described herein relate to an electronic device.

Multimedia electronic devices such as televisions (TVs), mobile phones, tablet computers, laptops, navigation systems, and game consoles generally include a display device for displaying images. In addition to a general input method such as a button, a keyboard, and a mouse, electronic devices may include a sensor layer (or an input sensor) capable of providing a touch-based input method that allows a user to input information or commands easily and intuitively. The sensor layer may sense a touch or pressure by the user. Meanwhile, consumer demand for using a pen for detailed touch input for the user who is accustomed to inputting information using a writing instrument or a specific application (e.g., an application for sketching or drawing) is increasing.

The above information disclosed in this Background section is only for enhancement of understanding of the background and therefore the information discussed in this Background section does not necessarily constitute prior art.

SUMMARY

Aspects of some embodiments of the present disclosure described herein relate to an electronic device that may sense an input by a pen.

Aspects of some embodiments of the present disclosure include an electronic device capable of sensing an input by a pen.

According to some embodiments, an electronic device includes a sensor layer including a first conductive layer, a second conductive layer on the first conductive layer, a third conductive layer on the second conductive layer, and a fourth conductive layer on the third conductive layer, and a sensor driving unit that drives the sensor layer and is selectively operated in a first mode of sensing a touch input or a second mode of sensing a pen input. According to some embodiments, two conductive layers among the first to fourth conductive layers include a plurality of first touch electrodes arranged in a first direction, and a plurality of second touch electrodes arranged in a second direction intersecting the first direction and insulated from and intersecting the plurality of first touch electrodes. According to some embodiments, the other two conductive layers among the first to fourth conductive layers include a plurality of first pen electrodes arranged in the first direction, and a plurality of second pen electrodes arranged in the second direction and insulated from and intersecting the plurality of first pen electrodes.

According to some embodiments, each of the plurality of first touch electrodes may include first sensing patterns spaced apart from each other in the second direction and a first bridge pattern connecting the first sensing patterns, and the plurality of first sensing patterns and the second touch electrodes may be included in the fourth conductive layer, and the first bridge pattern may be included in the third conductive layer.

According to some embodiments, the plurality of first pen electrodes may be included in one of the first conductive layer and the second conductive layer, and the plurality of second pen electrodes may be included in the other one of the first conductive layer and the second conductive layer.

According to some embodiments, each of the plurality of second touch electrodes may include second sensing patterns spaced apart from each other in the first direction and a second bridge pattern connecting the second sensing patterns, and the plurality of second sensing patterns and the first touch electrodes may be included in the fourth conductive layer, and the second bridge pattern may be included in the third conductive layer.

According to some embodiments, each of the plurality of first touch electrodes may include first sensing patterns spaced apart from each other in the second direction and a first bridge pattern connecting the first sensing patterns, and the plurality of first sensing patterns and the second touch electrodes may be included in the second conductive layer, and the first bridge pattern may be included in the first conductive layer.

According to some embodiments, the plurality of first pen electrodes may be included in one of the third conductive layer and the fourth conductive layer, and the plurality of second pen electrodes may be included in the other one of the third conductive layer and the fourth conductive layer.

According to some embodiments, the plurality of first touch electrodes may be included in one of the third conductive layer and the fourth conductive layer, and the second touch electrodes may be included in the other one of the third conductive layer and the fourth conductive layer.

According to some embodiments, the plurality of first pen electrodes may be included in one of the first conductive layer and the second conductive layer, and the plurality of second pen electrodes may be included in the other one of the first conductive layer and the second conductive layer.

According to some embodiments, the plurality of first touch electrodes may be included in one of the first conductive layer and the second conductive layer, and the plurality of second touch electrodes may be included in the other one of the first conductive layer and the second conductive layer.

According to some embodiments, the plurality of first pen electrodes may be included in one of the third conductive layer and the fourth conductive layer, and the plurality of second pen electrodes may be included in the other one of the third conductive layer and the fourth conductive layer.

According to some embodiments, each of the plurality of first touch electrodes, the plurality of second touch electrodes, the plurality of first pen electrodes, and the plurality of second pen electrodes may have a mesh structure.

According to some embodiments, at least one of the first to fourth conductive layers may further include dummy patterns that are floating.

According to some embodiments, each of the plurality of first touch electrodes, the plurality of second touch electrodes, the plurality of first pen electrodes, the plurality of second pen electrodes, and the dummy patterns may have a mesh structure, and a boundary of each of the plurality of first touch electrodes, the plurality of second touch electrodes, the plurality of first pen electrodes, the plurality of second pen electrodes, and the dummy patterns may correspond to a cutting line that cuts the mesh structure.

According to some embodiments, at least one of the plurality of first touch electrodes, the plurality of second touch electrodes, the plurality of first pen electrodes, or the plurality of second pen electrodes may include sub-electrodes arranged on different layers and at least partially overlapping each other.

According to some embodiments, at least a portion of each of the plurality of first pen electrodes may overlap at least a portion of a corresponding first touch electrode among the plurality of first touch electrodes, and at least a portion of each of the plurality of second pen electrodes may overlap at least a portion of a corresponding second touch electrode among the plurality of second touch electrodes.

According to some embodiments, the sensor layer may further include a plurality of first trace lines electrically connected to the plurality of first touch electrodes, and each of the plurality of first trace lines may have a two-layer structure including two sub-wiring lines arranged on different layers.

According to some embodiments, the sensor layer may further include a plurality of first trace lines electrically connected to the plurality of first touch electrodes, and the plurality of first trace lines may include $(1\text{-}1)^{th}$ group lines and $(1\text{-}2)^{th}$ group lines arranged on different layers and alternately arranged, each of the $(1\text{-}1)^{th}$ group lines may be included in one of the first to fourth conductive layers, and each of the $(1\text{-}2)^{th}$ group lines may be included in another one of the first to fourth conductive layers.

According to some embodiments, the sensor layer may further include a plurality of second trace lines electrically connected to the plurality of second touch electrodes, and each of the plurality of second trace lines may have a multi-layer structure.

According to some embodiments, each of the plurality of second trace lines may have a four-layer structure including four sub-wiring lines arranged on different layers.

According to some embodiments, the plurality of second trace lines may include $(2\text{-}1)^{th}$ group lines and $(2\text{-}2)^{th}$ group lines arranged on different layers and alternately arranged, and each of the $(2\text{-}1)^{th}$ group lines and the $(2\text{-}2)^{th}$ group lines may have a two-layer structure including two sub-wiring lines arranged on different layers.

According to some embodiments, the sensor layer may further include a third trace line electrically connected to all of the plurality of first pen electrodes.

According to some embodiments, the sensor layer may further include a fourth trace line electrically connected to at least some of the plurality of second pen electrodes, and each of the plurality of fourth trace lines may have a multi-layer structure.

According to some embodiments, the sensor layer may further include a plurality of fifth trace lines electrically connected to the plurality of first pen electrodes, and each of the plurality of fifth trace lines may have a two-layer structure including two sub-wiring lines arranged on different layers.

According to some embodiments, the sensor layer may further include a plurality of fifth trace lines electrically connected to the plurality of first pen electrodes, and the plurality of fifth trace lines may include $(3\text{-}1)^{th}$ group lines and $(3\text{-}2)^{th}$ group lines arranged on different layers and arranged alternately, each of the $(3\text{-}1)^{th}$ group lines may be included in one of the first to fourth conductive layers, and each of the $(3\text{-}2)^{th}$ group lines may be included in another one of the first to fourth conductive layers.

According to some embodiments, the sensor layer may further include a plurality of first trace lines electrically connected to the plurality of first touch electrodes, and a plurality of fifth trace lines electrically connected to the plurality of first pen electrodes, and the plurality of first trace lines may be included in two of the first to fourth conductive layers, and the plurality of fifth trace lines may be included in the other two of the first to fourth conductive layers.

According to some embodiments, each of the plurality of first trace lines may include a $(1\text{-}1)^{th}$ line part and a $(1\text{-}2)^{th}$ line part having different structures, and each of the plurality of fifth trace lines may include a $(2\text{-}1)^{th}$ line part and a $(2\text{-}2)^{th}$ line part having different structures.

According to some embodiments, the sensor layer may further include a plurality of pads connected to the first trace lines and the fifth trace lines, and a sensing area and a peripheral area adjacent to the sensing area may be defined in the sensor layer, and the plurality of first trace lines and the plurality of fifth trace lines may be arranged between the sensing area and the plurality of pads.

According to some embodiments, electrodes included in the first to third conductive layers among the plurality of first touch electrodes, the plurality of second touch electrodes, the plurality of first pen electrodes, and the plurality of second pen electrodes may be defined as lower electrodes, and electrodes included in the fourth conductive layer among the plurality of first touch electrodes, the plurality of second touch electrodes, the plurality of first pen electrodes, and the plurality of second pen electrodes may be defined as upper electrodes.

According to some embodiments, in a plan view, all of the lower electrodes may overlap the upper electrodes.

According to some embodiments, a width of the upper electrodes in one direction may be smaller than or equal to a width of the lower electrodes in the one direction.

According to some embodiments, the sensor layer may further include a first insulating layer that covers lower electrodes included in the first conductive layer among the lower electrodes, a second insulating layer that covers lower electrodes included in the second conductive layer among the lower electrodes, and a third insulating layer that covers lower electrodes included in the third conductive layer among the lower electrodes, and at least one of the first to third insulating layers may include an inorganic film, and a thickness of the lower electrodes, which is directly covered by the insulating layer including the inorganic film, among the first to third insulating layers, may be smaller than a thickness of the upper electrodes.

According to some embodiments, in the first mode, the plurality of first touch electrodes and the plurality of second touch electrodes may sense capacitance, and the plurality of first pen electrodes and the plurality of second pen electrodes may be grounded, and the second mode may include a pen sensing drive mode, and in the pen sensing drive mode, the sensor driving unit may receive reception signals based on induced currents flowing through the plurality of first touch electrodes, the plurality of second touch electrodes, the plurality of first pen electrodes, and the plurality of second pen electrodes.

According to some embodiments, the second mode may further include a charging drive mode, and in the charging drive mode, a current path defined by at least the plurality of first pen electrodes may be formed, and the plurality of first touch electrodes, the plurality of second touch electrodes, and the plurality of second pen electrodes may be floating.

According to some embodiments, an electronic device includes a sensor layer, and a sensor driving unit that drives the sensor layer and is selectively operated in a first mode of sensing a touch input or a second mode of sensing a pen input. According to some embodiments, the sensor layer includes a plurality of first touch electrodes arranged in a first direction, a plurality of second touch electrodes arranged in a second direction intersecting the first direction and insulated from and intersecting the plurality of first touch electrodes, a plurality of first pen electrodes arranged in the first direction, and a plurality of second pen electrodes arranged in the second direction and insulated from and intersecting the plurality of first pen electrodes. According to some embodiments, the plurality of first touch electrodes and the plurality of second touch electrodes are arranged on a different layer from the plurality of first pen electrodes and the plurality of second pen electrodes.

According to some embodiments, the sensor layer may include a first conductive layer and a second conductive layer including a plurality of first electrodes arranged in the first direction and a plurality of second electrodes arranged in the second direction intersecting the first direction and insulated from and intersecting the plurality of first electrodes, and a third conductive layer and a fourth conductive layer including a plurality of first auxiliary electrodes arranged in the first direction and a plurality of second auxiliary electrodes arranged in the second direction and insulated from and intersecting the plurality of first auxiliary electrodes.

BRIEF DESCRIPTION OF THE DRAWINGS

The above and other aspects and features of embodiments according to the present disclosure will become more apparent by describing in more detail aspects of some embodiments thereof with reference to the accompanying drawings.

FIG. 14 is an enlarged cross-sectional view of a portion of a peripheral area of the sensor layer according to some embodiments of the present disclosure.

DETAILED DESCRIPTION

Figure 1A:
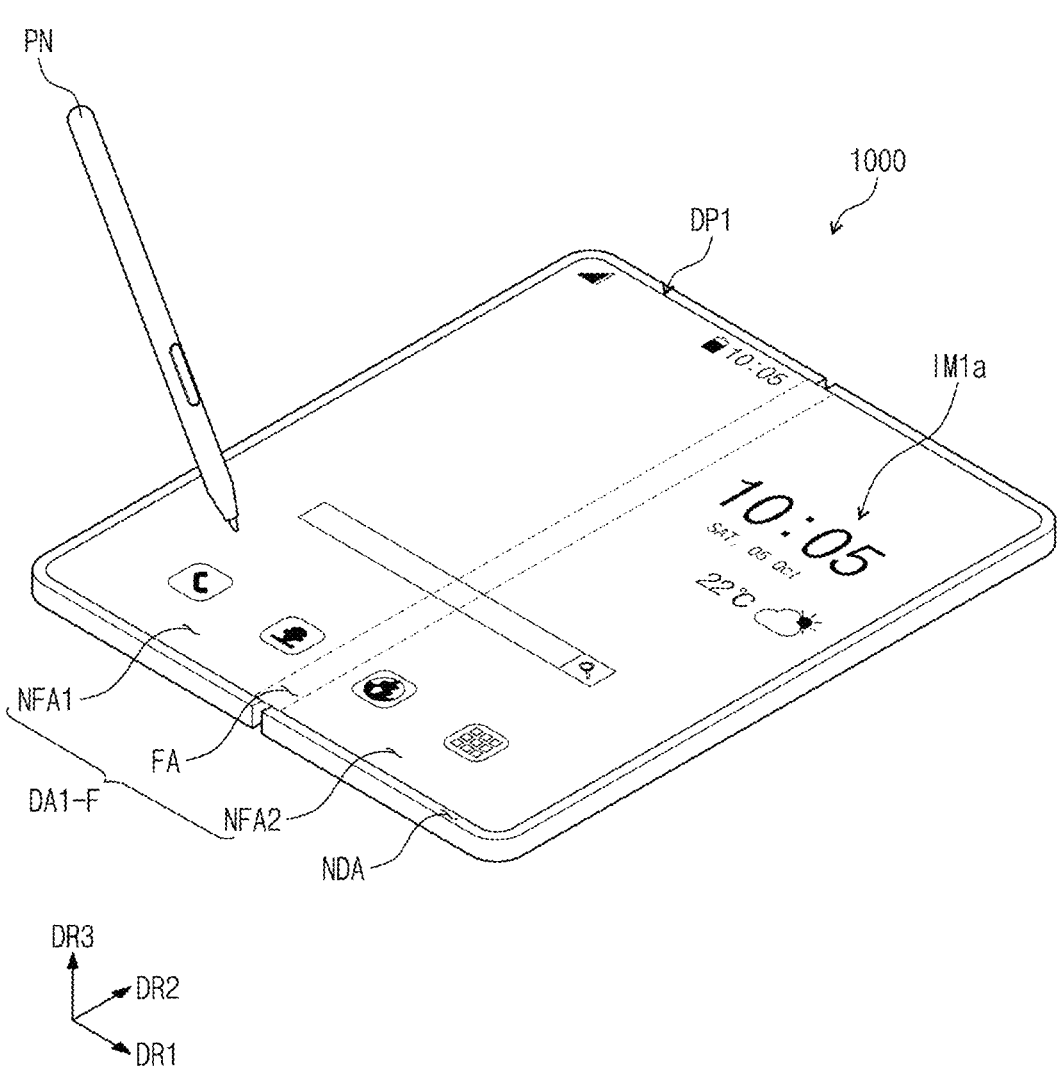
FIG. 1A is a perspective view of an electronic device according to some embodiments of the present disclosure.

In the specification, the expression that a first component (or an area, a layer, a part, a portion, etc.) is "located on", "connected with" or "coupled to" a second component means that the first component is directly located on/connected with/coupled to the second component or means that a third component is interposed therebetween.

The same reference numerals refer to the same components. Further, in the drawings, the thickness, the ratio, and the dimension of components are exaggerated for effective description of technical contents. The term "and/or" includes all combinations of one or more components that may be defined by associated components.

Although the terms "first", "second", etc. may be used to describe various components, the components should not be limited by the terms. The terms are only used to distinguish one component from another component. For example, without departing from the right scope of the present disclosure, a first component may be referred to as a second component, and similarly, the second component may be also referred to as the first component. Singular expressions include plural expressions unless clearly otherwise indicated in the context.

Also, the terms "under", "below", "on", "above", etc. are used to describe the correlation of components illustrated in drawings. The terms that are relative in concept are described based on a direction illustrated in drawings.

It will be understood that the terms "include", "comprise", "have", etc. specify the presence of features, numbers, steps, operations, elements, or components, described in the specification, or a combination thereof, and do not exclude in advance the presence or additional possibility of one or more other features, numbers, steps, operations, elements, or components or a combination thereof.

Unless otherwise defined, all terms (including technical terms and scientific terms) used in the specification have the same meaning as commonly understood by those skilled in the art to which the present disclosure belongs. Furthermore, terms such as terms defined in the dictionaries commonly used should be interpreted as having a meaning consistent with the meaning in the context of the related technology and should not be interpreted in overly ideal or overly formal meanings unless explicitly defined herein.

Terms "part" and "unit" mean a software component or hardware component that performs a specific function. The hardware component may include, for example, a field-programmable gate array (FPGA) or an application-specific integrated circuit (ASIC). The software component may refer to an executable code and/or data used by the executable code in an addressable storage medium. Thus, the software components may be, for example, object-oriented software components, class components, and task components, and may include processes, functions, attributes, procedures, subroutines, program code segments, drivers, firmwares, microcodes, circuits, data, database, data structures, tables, arrays, or variables.

Hereinafter, aspects of some embodiments of the present disclosure will be described in more detail with reference to the accompanying drawings.

Figure 1B:
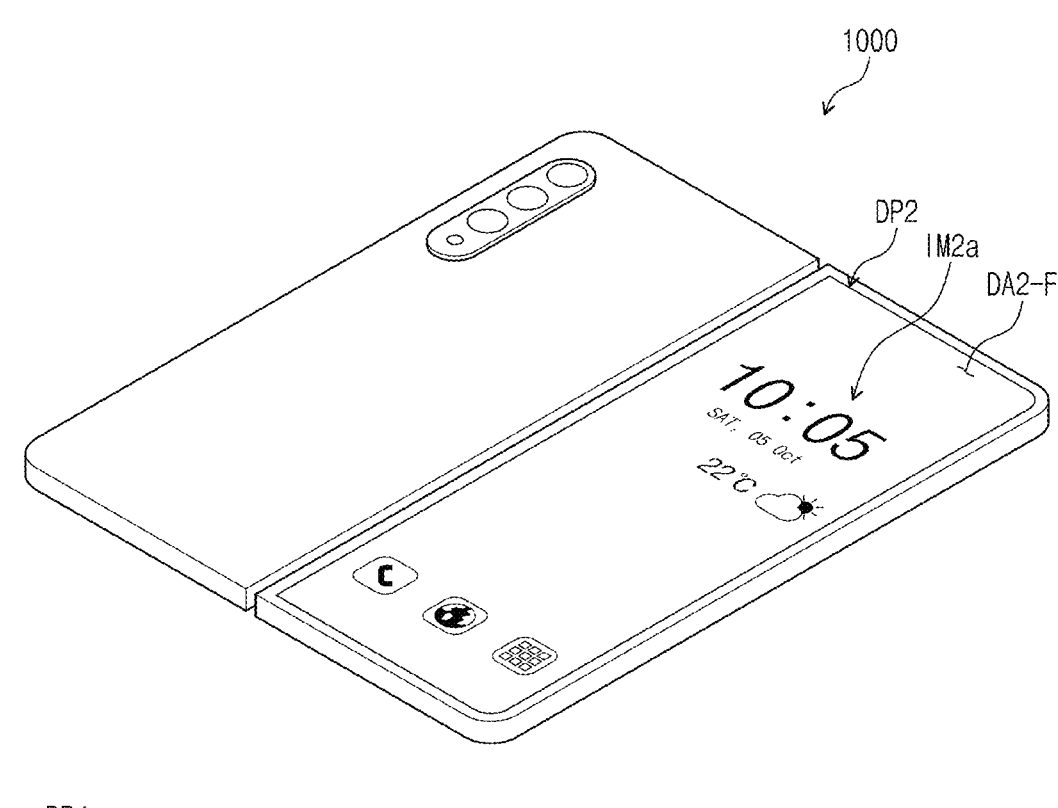
FIG. 1B is a rear perspective view of the electronic device according to some embodiments of the present disclosure.
Figure 1B:
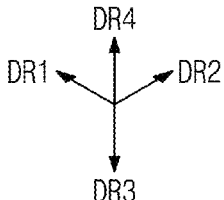

FIG. 1A is a perspective view of an electronic device 1000 according to some embodiments of the present disclosure. FIG. 1B is a rear perspective view of the electronic device 1000 according to some embodiments of the present disclosure.

Referring to FIGS. 1A and 1B, the electronic device 1000 may be a device that is activated according to an electrical signal. For example, the electronic device 1000 may display images and sense inputs applied from the outside. The external input may be an input of a user. The input of the user may include various types of external inputs such as a portion of a human body of the user, a pen PN, a light, heat, or pressure.

The electronic device 1000 may include a first display panel DP1 and a second display panel DP2. The first display panel DP1 and the second display panel DP2 may be separate panels separated from each other. The first display panel DP1 may be referred to as a main display panel, and the second display panel DP2 may be referred to as an auxiliary display panel or an external display panel.

The first display panel DP1 may include a first display unit DA1-F, and the second display panel DP2 may include a second display unit DA2-F. An area of the second display panel DP2 may be smaller than an area of the first display panel DP1. To correspond to the sizes of the first display panel DP1 and the second display panel DP2, an area of the first display unit DA1-F may be larger than an area of the second display unit DA2-F.

In a state in which the electronic device 1000 is unfolded, the first display unit DA1-F may have a plane parallel (or substantially parallel) to a first direction DR1 and a second direction DR2. A thickness direction of the electronic device 1000 may be parallel to a third direction DR3 intersecting the first direction DR1 and the second direction DR2. Thus, front surfaces (or upper surfaces) and rear surfaces (or lower surfaces) of members constituting the electronic device 1000 may be defined based on the third direction DR3.

The first display panel DP1 or the first display unit DA1-F may include a folding area FA that is folded or unfolded and a plurality of non-folding areas NFA1 and NFA2 spaced apart from each other with the folding area FA interposed therebetween. The second display panel DP2 may overlap one of the plurality of non-folding areas NFA1 and NFA2. For example, the second display panel DP2 may overlap the first non-folding area NFA1.

A display direction of a first image IM1a displayed on a portion of the first display panel DP1, for example, the first non-folding area NFA1, may be opposite to a display direction of a second image IM2a displayed on the second display panel DP2. For example, the first image IM1a may be displayed in the third direction DR3, and the second image IM2a may be displayed in a fourth direction DR4 that is opposite to the third direction DR3.

According to some embodiments of the present disclosure, the folding area FA may be bent with respect to a folding axis extending in a direction parallel to long sides of the electronic device 1000, for example, a direction parallel to the second direction DR2. In a state in which the electronic device 1000 is folded, the folding area FA has a curvature (e.g., a set or predetermined curvature) and a radius of curvature (e.g., a set or predetermined radius of curvature). The first non-folding area NFA1 and the second non-folding area NFA2 may face each other, and the electronic device 1000 may be inner-folded so that the first display unit DA1-F is prevented from being exposed to the outside.

According to some embodiments of the present disclosure, the electronic device 1000 may be outer-folded so that the first display unit DA1-F is exposed to the outside. According to some embodiments of the present disclosure, the electronic device 1000 may be both inner-folded or outer-folded in an unfolded state, but embodiments according to the present disclosure are not limited thereto.

FIG. 1A illustratively illustrates that one folding area FA is defined (provided or included) in the electronic device 1000, but embodiments according to the present disclosure are not limited thereto. For example, a plurality of folding axes and a plurality of folding areas corresponding thereto may be defined in an electronic device 1000-1, and the electronic device 1000-1 may be inner-folded or outer-folded in an unfolded state in each of the plurality of folding areas.

According to some embodiments of the present disclosure, even when at least one of the first display panel DP1 or the second display panel DP2 does not include a digitizer, the at least one of the first display panel DP1 or the second display panel DP2 may sense an input by the pen PN. Thus, because the digitizer for sensing the pen PN is omitted, an increase in a thickness, an increase in a weight, and a decrease in flexibility of the electronic device 1000 caused by addition of the digitizer may not occur. Thus, the second display panel DP2 as well as the first display panel DP1 may be designed to sense the pen PN.

Figure 2:
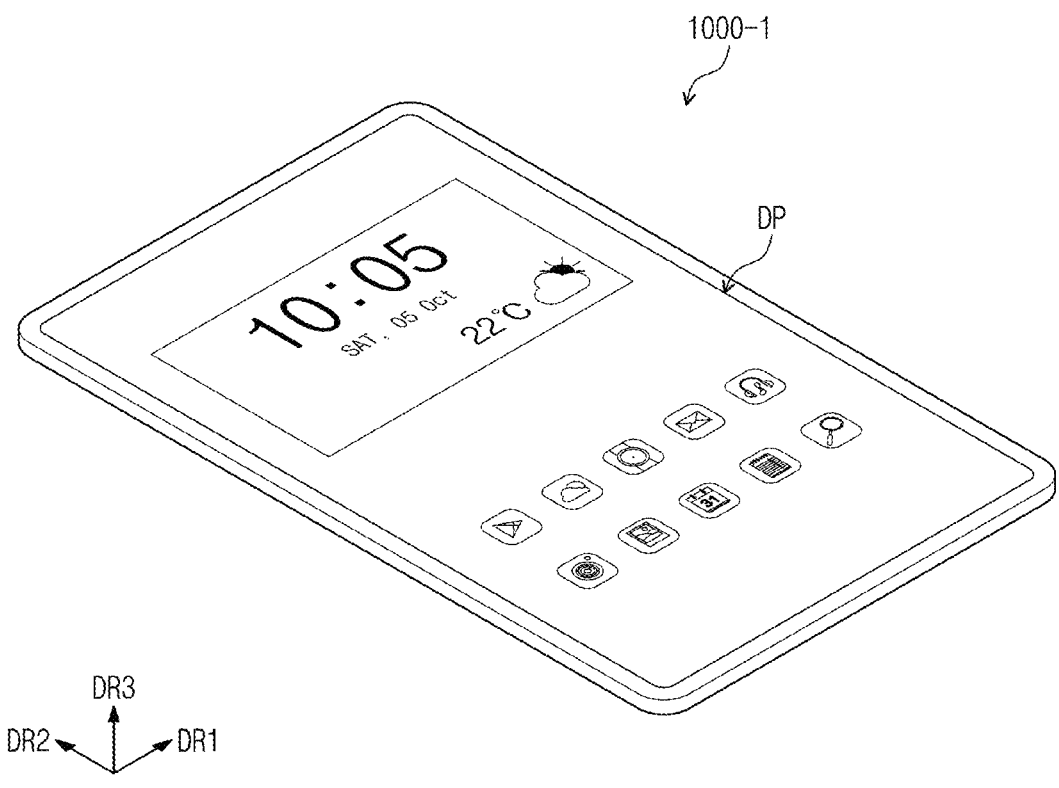
FIG. 2 is a perspective view of the electronic device according to some embodiments of the present disclosure.
Figure 3:
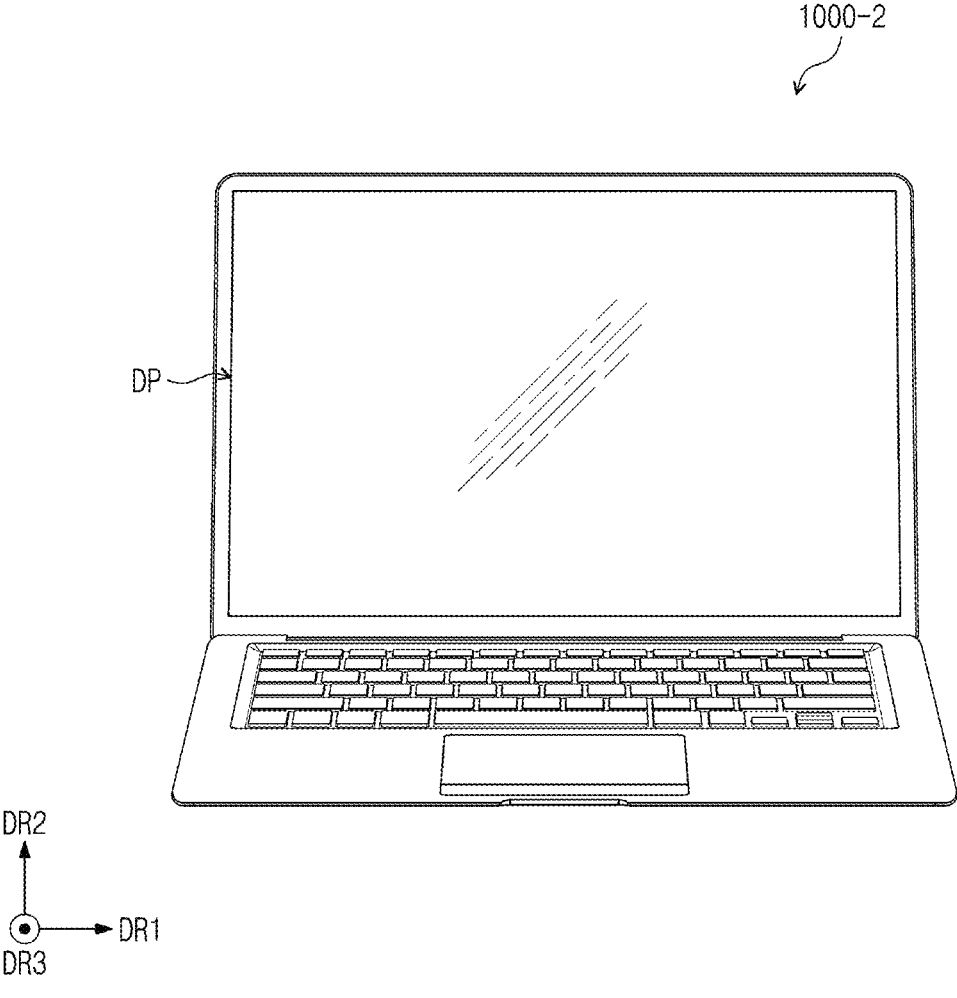
FIG. 3 is a perspective view of the electronic device according to some embodiments of the present disclosure.

FIG. 2 is a perspective view of the electronic device 1000-1 according to some embodiments of the present disclosure. FIG. 3 is a perspective view of an electronic device 1000-2 according to some embodiments of the present disclosure.

FIG. 2 illustratively illustrates that the electronic device 1000-1 is a mobile phone, and the electronic device 1000-1 may include a display panel DP. FIG. 3 illustratively illustrates that the electronic device 1000-2 is a laptop, and the electronic device 1000-2 may include the display panel DP.

According to some embodiments of the present disclosure, the display panel DP may sense inputs applied from the outside. The external input may be an input of the user. The input of the user may include various types of external inputs such as the portion of the human body of the user, the pen PN (see FIG. 1A), the light, the heat, or the pressure.

According to some embodiments of the present disclosure, the display panel DP may sense an input by the pen PN even when the display panel DP does not include the digitizer. Thus, because the digitizer for sensing the pen PN is omitted, an increase in the thickness and an increase in the weight of the electronic device 1000-1 or 1000-2 caused by the addition of the digitizer may not occur.

FIG. 1A illustratively illustrates the foldable-type electronic device 1000, and FIG. 2 illustratively illustrates the bar-type electronic device 1000-1, but embodiments according to the present disclosure described below are not limited thereto. For example, the following descriptions may be applied to various electronic devices such as a rollable-type electronic device, a slidable-type electronic device, and a stretchable-type electronic device.

Figure 4:
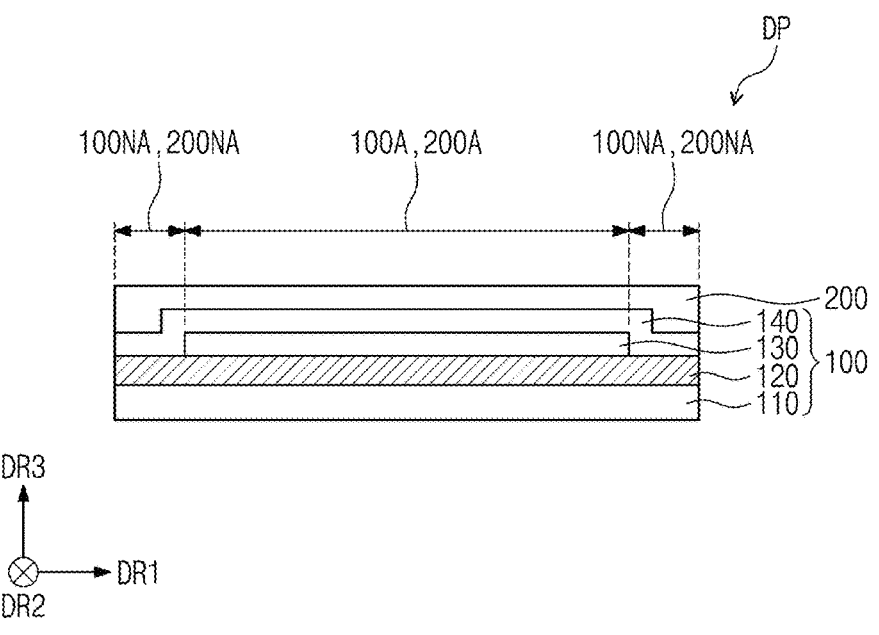
FIG. 4 is a schematic cross-sectional view of a display panel according to some embodiments of the present disclosure.

FIG. 4 is a schematic cross-sectional view of the display panel DP according to some embodiments of the present disclosure.

Referring to FIG. 4, the display panel DP may include a display layer 100 and a sensor layer 200.

The display layer 100 may be a component that generates an image. The display layer 100 may be a light emitting display layer. For example, the display layer 100 may be an organic light emitting display layer, an inorganic light emitting display layer, an organic-inorganic light emitting display layer, a quantum dot display layer, a micro-light emitting diode (LED) display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is located. The base layer 110 may have a multi-layer structure or a single-layer structure. The base layer 110 may be a glass substrate, a metal substrate, a silicon substrate, a polymer substrate or the like, but embodiments according to the present disclosure are not limited thereto.

The circuit layer 120 may be located on the base layer 110. The circuit layer 120 may include an insulating layer, a semiconductor pattern, a conductive pattern, a signal line, and the like. The insulating layer, a semiconductor layer, and a conductive layer may be formed on the base layer 110 in a manner such as coating and deposition, and the insulating layer, the semiconductor layer, and the conductive layer may be selectively patterned through a plurality of photolithography processes.

The light emitting element layer 130 may be located on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be located on the light emitting element layer 130. The encapsulation layer 140 may protect the light emitting element layer 130 from moisture, oxygen, and foreign substances such as dust particles.

The sensor layer 200 may be located on the display layer 100. The sensor layer 200 may sense an external input applied from an external unit. The sensor layer 200 may be an integrated sensor formed continuously during a process of manufacturing the display layer 100 or the sensor layer 200 may be an external sensor attached to the display layer 100. The sensor layer 200 may be referred to as a sensor, an input sensing layer, an input sensing panel, an electronic device for sensing input coordinates, or the like.

According to some embodiments of the present disclosure, the sensor layer 200 may sense both inputs for a passive input means such as the human body of the user and an input device that generates a magnetic field having a resonant frequency (e.g., a set or predetermined resonant frequency). The input device may be referred to as a pen, an input pen, a magnetic pen, a stylus pen, or an electromagnetic resonance pen.

Figure 5:
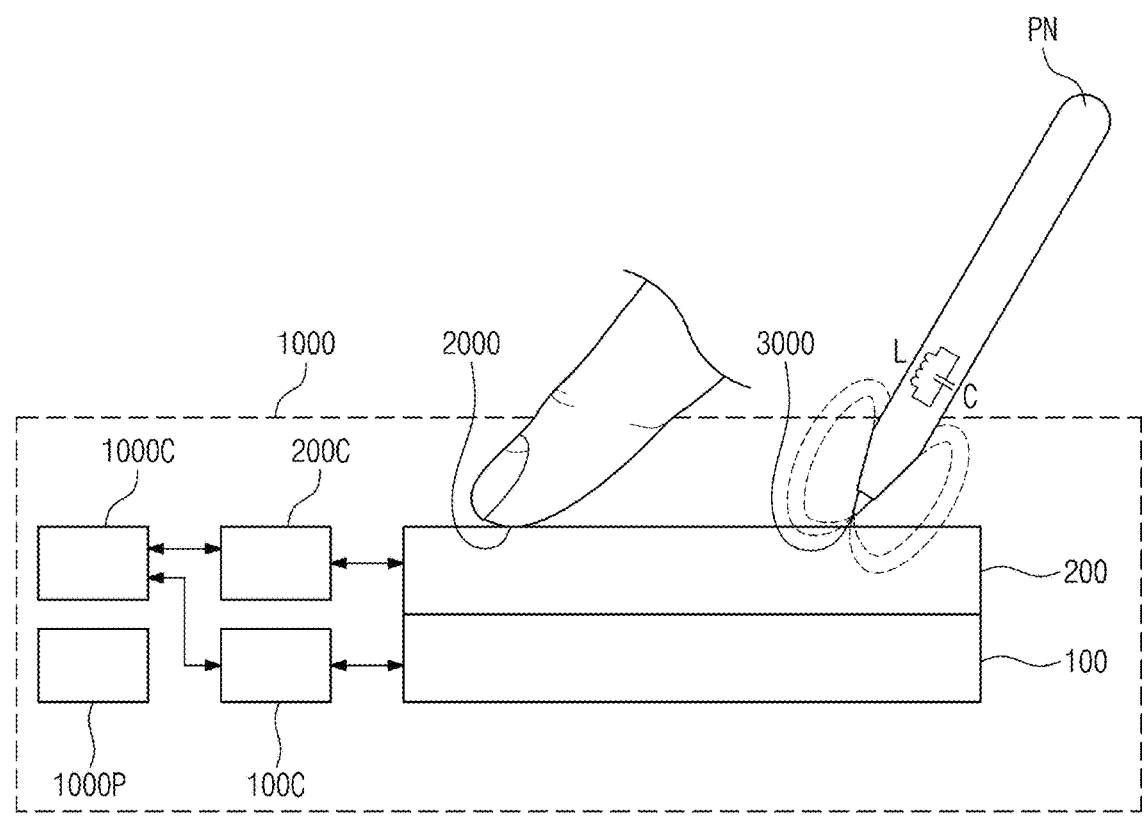
FIG. 5 is a view for describing an operation of the electronic device according to some embodiments of the present disclosure.

FIG. 5 is a view for describing an operation of the electronic device 1000 according to some embodiments of the present disclosure.

Referring to FIG. 5, the electronic device 1000 may include the display layer 100, the sensor layer 200, a display driving unit 100C, a sensor driving unit 200C, a main driving unit 1000C, and a power circuit 1000P.

The sensor layer 200 may sense a first input 2000 or a second input 3000 applied from an external unit. The first input 2000 and the second input 3000 may be input means that may provide a change in a capacitance of the sensor layer 200 or may be input means that may cause an induced current in the sensor layer 200. For example, the first input 2000 may be a passive-type input means such as the human body of the user. The second input 3000 may be an input by the pen PN or an input by a radio frequency integrated circuit (RFIC) tag. For example, the pen PN may be a passive pen or an active pen.

According to some embodiments of the present disclosure, the pen PN may be a device that generates a magnetic field having a resonant frequency (e.g., a set or predetermined resonant frequency). The pen PN may be configured to transmit an output signal based on an electromagnetic resonance method. The pen PN may be referred to as an input device, an input pen, a magnetic pen, a stylus pen, or an electromagnetic resonance pen.

The pen PN may include an RLC resonant circuit, and the RLC resonant circuit may include an inductor "L" and a capacitor "C." According to some embodiments of the present disclosure, the RLC resonant circuit may be a variable resonant circuit having a variable resonant frequency. In this case, the inductor "L" may be a variable inductor and/or the capacitor "C" may be a variable capacitor, but embodiments according to the present disclosure are not limited thereto.

The inductor "L" generates a current by a magnetic field formed in the electronic device 1000, for example, the sensor layer 200. However, embodiments according to the present disclosure are not particularly limited thereto. For example, when the pen PN operates as an active type, the pen PN may generate a current even when the pen PN does not receive a magnetic field from an external unit. The generated current is transmitted to the capacitor "C." The capacitor "C" charges a current input from the inductor "L" and discharges the charged current to the inductor "L." Thereafter, the inductor "L" may emit a magnetic field having a resonant frequency. The induced current may flow in the sensor layer 200 by the magnetic field emitted by the pen PN, and the induced current as a reception signal (or a sensing signal) may be transmitted to the sensor driving unit 200C.

The main driving unit 1000C may control an overall operation of the electronic device 1000. For example, the main driving unit 1000C may control operations of the display driving unit 100C and the sensor driving unit 200C. The main driving unit 1000C may include at least one microprocessor and may further include a graphic controller. The main driving unit 1000C may be referred to as an application processor, a central processing unit, or a main processor.

The display driving unit 100C may drive the display layer 100. The display driving unit 100C may receive image data and a control signal from the main driving unit 1000C. The control signal may include various signals. For example, the control signal may include an input vertical synchronization signal, an input horizontal synchronization signal, a main clock, a data enable signal, and the like.

The sensor driving unit 200C may drive the sensor layer 200. The sensor driving unit 200C may receive the control signal from the main driving unit 1000C. The control signal may include a clock signal of the sensor driving unit 200C. Further, the control signal may further include a mode determining signal that determines driving modes of the sensor driving unit 200C and the sensor layer 200.

The sensor driving unit 200C may be implemented as an integrated circuit (IC) and electrically connected to the sensor layer 200. For example, the sensor driving unit 200C may be directly mounted on an area (e.g., a set or predetermined area) of the display panel or mounted on a separate printed circuit board using a chip on film (COF) method and electrically connected to the sensor layer 200.

The sensor driving unit 200C and the sensor layer 200 may be selectively operated in a first mode or a second mode. For example, the first mode may be a mode for sensing a touch input, for example, the first input 2000. The second mode may be a mode for sensing the input by the pen PN, for example, the second input 3000. The first mode may be referred to as a touch sensing mode, and the second mode may be referred to as a pen sensing mode.

Switching between the first mode and the second mode may be performed in various manners. For example, the sensor driving unit 200C and the sensor layer 200 may be driven in the first mode and the second mode in a time division manner and may sense the first input 2000 and the second input 3000. Alternatively, the switching between the first mode and the second mode may be generated by selection by the user or by a specific action (or an input) of the user, any one of the first mode and the second mode may be activated or deactivated by activating or deactivating a specific application, or a current mode may be switched from one to the other one of the first mode and the second mode. Alternatively, while the sensor driving unit 200C and the sensor layer 200 are alternately operated in the first mode and the second mode, when the first input 2000 is sensed, the first mode is maintained or when the second input 3000 is sensed, the second mode is maintained.

The sensor driving unit 200C may calculate coordinate information of the input based on a signal received from the sensor layer 200 and provide a coordinate signal having the coordinate information to the main driving unit 1000C. The main driving unit 1000C executes an operation corresponding to the input of the user based on the coordinate signal. For example, the main driving unit 1000C may operate the display driving unit 100C so that a new application image is displayed on the display layer 100.

The power circuit 1000P may include a power management integrated circuit (PMIC). The power circuit 1000P may generate a plurality of driving voltages for driving the display layer 100, the sensor layer 200, the display driving unit 100C, and the sensor driving unit 200C. For example, the plurality of driving voltages may include a gate-high voltage, a gate-low voltage, a first driving voltage (e.g., an ELVSS voltage), a second driving voltage (e.g., an ELVDD voltage), an initialization voltage or the like, but embodiments according to the present disclosure are not particularly limited to the above example.

Figure 6:
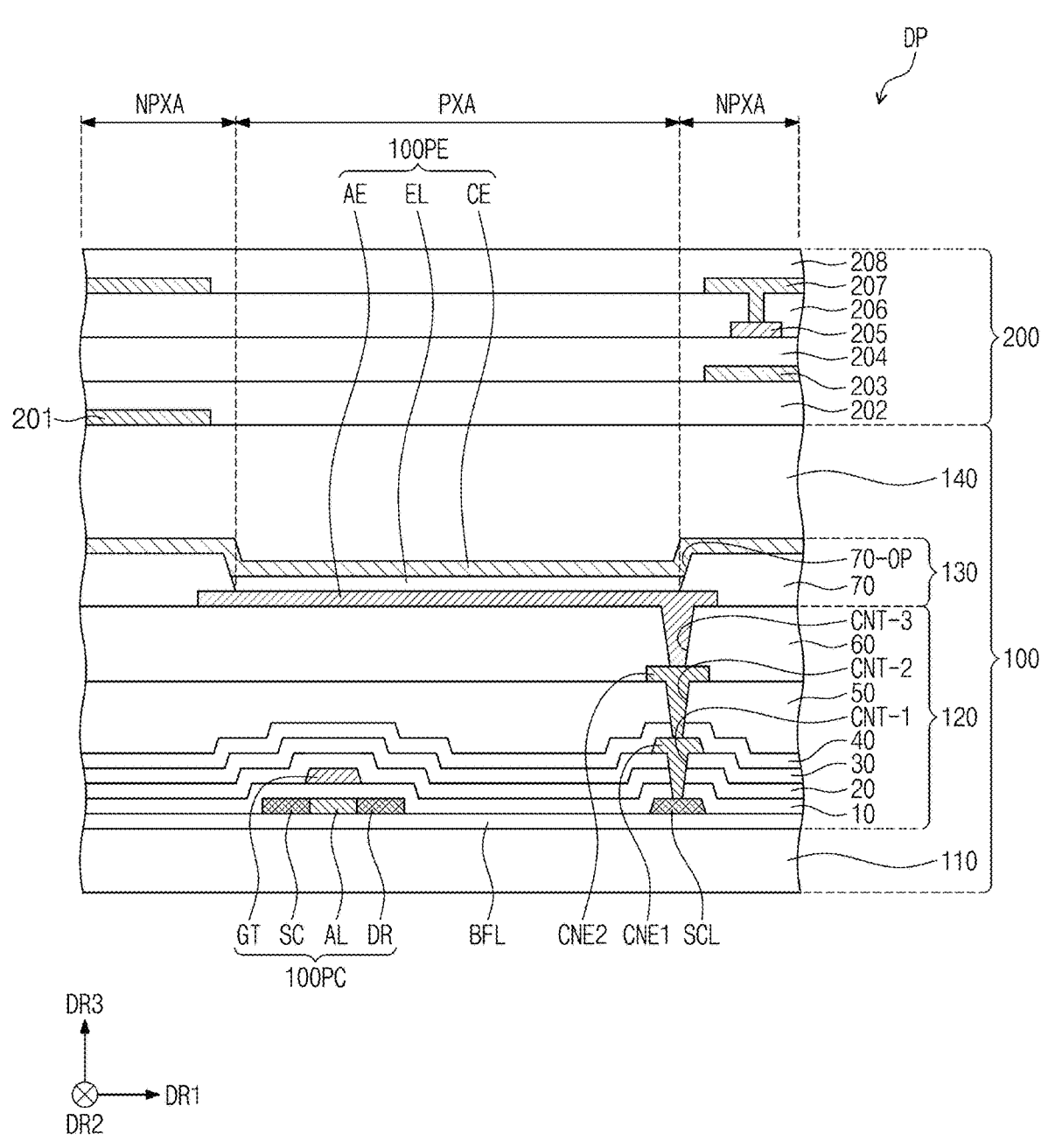
FIG. 6 is a cross-sectional view of the display panel according to some embodiments of the present disclosure.

FIG. 6 is a cross-sectional view of the display panel DP according to some embodiments of the present disclosure.

Referring to FIG. 6, at least one buffer layer BFL is formed on an upper surface of the base layer 110. The buffer layer BFL may relatively improve a coupling force between the base layer 110 and the semiconductor pattern. The buffer layer BFL may be formed in multiple layers. Alternatively, the display layer 100 may further include a barrier layer. The buffer layer BFL may include at least one of a silicon oxide, a silicon nitride, or a silicon oxy nitride. For example, the buffer layer BFL may include a structure in which silicon oxide layers and silicon nitride layers are alternately laminated.

Semiconductor patterns SC, AL, DR, and SCL may be arranged on the buffer layer BFL. The semiconductor patterns SC, AL, DR, and SCL may include polysilicon. However, embodiments according to the present disclosure are not limited thereto, and the semiconductor patterns SC, AL, DR, and SCL may also include an amorphous silicon, a low-temperature polycrystalline silicon, or an oxide semiconductor.

FIG. 6 illustrates some of the semiconductor patterns SC, AL, DR, and SCL, and the semiconductor pattern may be further arranged in other areas. The semiconductor patterns SC, AL, DR, and SCL may be arranged in a specific rule across pixels. The semiconductor patterns SC, AL, DR, and SCL may have different electrical properties depending on whether or not the semiconductor patterns SC, AL, DR, and SCL are doped. The semiconductor patterns SC, AL, DR, and SCL may include the first areas SC, DR, and SCL having high conductivity and the second area AL having low conductivity. The first areas SC, DR, and SCL may be doped with an N-type dopant or a P-type dopant. A P-type transistor may include a doped area doped with the P-type dopant, and an N-type transistor may include a doped area doped with the N-type dopant. The second area AL may be a non-doped area or an area doped at a lower concentration than the first areas SC, DR, and SCL.

A conductivity of the first areas SC, DR, and SCL may be greater than a conductivity of the second area AL, and the first areas SC, DR, and SCL may serve as an electrode or a signal line. The second area AL may correspond to the active area AL (or a channel) of a transistor 100PC. In other words, the part AL of the semiconductor patterns SC, AL, DR, and SCL may be the active area AL of the transistor 100PC, the other parts SC and DR may be the source area SC or the drain area DR of the transistor 100PC, and the other part SCL may be a connection electrode or the connection signal line SCL.

Each of pixels may have an equivalent circuit including a plurality of transistors, at least one capacitor, and at least one light emitting element, and the equivalent circuit of the pixel may be modified into various forms. FIG. 6 illustratively illustrates the one transistor 100PC and one light emitting element 100PE included in the pixel.

The source area SC, the active area AL, and the drain area DR of the transistor 100PC may be formed from the semiconductor patterns SC, AL, DR, and SCL. The source area SC and the drain area DR may extend from the active area AL in opposite directions on a cross section. FIG. 6 illustrates a portion of the connection signal line SCL formed from the semiconductor patterns SC, AL, DR, and SCL. Although not separately illustrated, the connection signal line SCL may be connected to the drain area DR of the transistor 100PC on a plane.

A first insulating layer 10 may be located on the buffer layer BFL. The first insulating layer 10 may commonly overlap the plurality pixels and cover the semiconductor patterns SC, AL, DR, and SCL. The first insulating layer 10 may be an inorganic layer and/or an organic layer and may have a single-layer structure or a multi-layer structure. The first insulating layer 10 may include at least one of an aluminum oxide, a titanium oxide, a silicon oxide, a silicon nitride, a silicon oxy nitride, a zirconium oxide, or a hafnium oxide. According to some embodiments, the first insulating layer 10 may be a single-layer silicon oxide layer. The first insulating layer 10 and an insulating layer of the circuit layer 120, which will be described in more detail below, may be an inorganic layer and/or an organic layer, and may have a single-layer structure or a multi-layer structure. The inorganic layer may include at least one of the above-described materials, but embodiments according to the present disclosure are not limited thereto.

A gate GT of the transistor 100PC is located on the first insulating layer 10. The gate GT may be a portion of a metal pattern. The gate GT overlaps the active area AL. In a process of doping or reducing the semiconductor patterns SC, AL, DR, and SCL, the gate GT may function as a mask.

A second insulating layer 20 may be located on the first insulating layer 10 and cover the gate GT. The second insulating layer 20 may commonly overlap pixels PX. The second insulating layer 20 may be an inorganic layer and/or an organic layer and may have a single-layer structure or a multi-layer structure. The second insulating layer 20 may include at least one of a silicon oxide, a silicon nitride, or a silicon oxy nitride. According to some embodiments, the second insulating layer 20 may have a multi-layer structure including a silicon oxide layer and a silicon nitride layer.

A third insulating layer 30 may be located on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be located on the third insulating layer 30. The first connection electrode CNE1 may be connected to the connection signal line SCL through a contact hole CNT-1 passing through the first insulating layer 10, the second insulating layer 20, and the third insulating layer 30.

A fourth insulating layer 40 may be located on the third insulating layer 30. The fourth insulating layer 40 may be a single-layer silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be located on the fifth insulating layer 50 to cover the second connection electrode CNE2. The sixth insulating layer 60 may be an organic layer.

The light emitting element layer 130 may be located on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, it will be described that the light emitting element 100PE is an organic light emitting element, but embodiments according to the present disclosure are not particularly limited thereto.

The light emitting element 100PE may include a first electrode AE, a light emitting layer EL, and a second electrode CE.

The first electrode AE may be located on the sixth insulating layer 60. The first electrode AE may be connected to the second connection electrode CNE2 through a contact hole CNT-3 passing through the sixth insulating layer 60.

A pixel defining film 70 may be located on the sixth insulating layer 60 and cover a portion of the first electrode AE. An opening 70-OP is defined in the pixel defining film 70. The opening 70-OP of the pixel defining film 70 exposes at least a portion of the first electrode AE.

The first display unit DA1-F (see FIG. 1A) may include a light emitting area PXA and a non-light emitting area NPXA adjacent to the light emitting area PXA. The non-light emitting area NPXA may surround the light emitting area PXA. According to some embodiments, the light emitting area PXA is defined to correspond to a partial area of the first electrode AE, which is exposed by the opening 70-OP.

The light emitting layer EL may be located on the first electrode AE. The light emitting layer EL may be located in an area corresponding to the opening 70-OP. FIG. 6 illustratively illustrates that the light emitting layer EL is located inside the opening 70-OP, but embodiments according to the present disclosure are not limited thereto. For example, the light emitting layer EL may extend to cover portions of a side surface of the pixel defining film 70 that defines the opening 70-OP and an upper surface of the pixel defining film 70.

According to some embodiments of the present disclosure, the light emitting layer EL may be formed separately from each of the pixels. When the light emitting layer EL is formed separately from each of the pixels, each of the light emitting layers EL may emit a light having at least one of a blue color, a red color, or a green color. However, embodiments according to the present disclosure are not limited thereto, and the light emitting layers EL may be connected to the pixels and may be commonly included in the pixels. In this case, the light emitting layer EL may also provide a blue light or a white light.

The second electrode CE may be located on the light emitting layer EL. The second electrode CE may have an integral shape and may be commonly included in the plurality of pixels.

According to some embodiments of the present disclosure, a hole control layer may be located between the first electrode AE and the light emitting layer EL. The hole control layer may be commonly located in the light emitting area PXA and the non-light emitting area NPXA. The hole control layer may include a hole transport layer and may further include a hole injection layer. An electron control layer may be located between the light emitting layer EL and the second electrode CE. The electron control layer may include an electron transport layer and may further include an electron injection layer. The hole control layer and the electron control layer may be commonly formed in the plurality of pixels by using an open mask or an inkjet process.

The encapsulation layer 140 may be located on the light emitting element layer 130. The encapsulation layer 140 may include an inorganic layer, an organic layer, and an inorganic layer that are sequentially laminated, and layers constituting the encapsulation layer 140 are not limited thereto. The inorganic layers may protect the light emitting element layer 130 from moisture and oxygen, and the organic layer may protect the light emitting element layer 130 from foreign substances such as dust particles. The inorganic layers may include a silicon nitride layer, a silicon oxy nitride layer, a silicon oxide layer, a titanium oxide layer, an aluminum oxide layer or the like. The organic layer may include an acryl-based organic layer, and embodiments according to the present disclosure are not limited thereto.

The sensor layer 200 may be directly located on the encapsulation layer 140. The sensor layer 200 may include a first conductive layer 201, a first insulating layer 202, a second conductive layer 203, a second insulating layer 204, a third conductive layer 205, a third insulating layer 206, a fourth conductive layer 207, and a fourth insulating layer 208. That is, the sensor layer 200 may include the four conductive layers.

The first conductive layer 201 may be located on the encapsulation layer 140, and the first insulating layer 202 may be located on the encapsulation layer 140 and cover the first conductive layer 201. The second conductive layer 203 may be located on the first insulating layer 202, and the second insulating layer 204 may be located on the first insulating layer 202 and cover the second conductive layer 203. The third conductive layer 205 may be located on the second insulating layer 204, and the third insulating layer 206 may be located on the second insulating layer 204 and cover the third conductive layer 205. The fourth conductive layer 207 may be located on the third insulating layer 206, and the fourth insulating layer 208 may be located on the third insulating layer 206 and cover the fourth conductive layer 207.

Each of the first to fourth conductive layers 201, 203, 205, and 207 may have a single-layer structure or have a multi-layer structure in which layers are laminated in the third direction DR3.

Each of the first to fourth conductive layers 201, 203, 205, and 207 having a single-layer structure may include a metal layer or a transparent conductive layer. The metal layer may include molybdenum, silver, titanium, copper, aluminum, or alloys thereof. The transparent conductive layer may include a transparent conductive oxide such as an indium tin oxide (ITO), an indium zinc oxide (IZO), a zinc oxide (ZnO), or an indium zinc tin oxide (IZTO). In addition, the transparent conductive layer may include a conductive polymer such as poly(3,4-ethylenedioxythiophene) (PEDOT), a metal nanowire, graphene, or the like.

Each of the first to fourth conductive layers 201, 203, 205, and 207 having a multi-layer structure may include metal layers. The metal layers may have, for example, a three-layer structure of titanium/aluminum/titanium. The conductive layer having a multi-layer structure may include at least one metal layer and at least one transparent conductive layer.

At least one of the first to fourth insulating layers 202, 204, 206, or 208 may include an inorganic film. The inorganic film may include at least one of an aluminum oxide, a titanium oxide, a silicon oxide, a silicon nitride, a silicon oxy nitride, a zirconium oxide, or a hafnium oxide.

At least one of the first to fourth insulating layers 202, 204, 206, or 208 may include an organic film. The organic film may include at least one of an acryl-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

According to some embodiments of the present disclosure, the sensor layer 200 may further include a base layer located between the encapsulation layer 140 and the first conductive layer 201. The base layer may be an inorganic layer including at least one of a silicon nitride, a silicon oxy nitride, or a silicon oxide. Alternatively, the base layer may be an organic layer including an epoxy resin, an acryl-based resin, or an imide-based resin. The base layer may have a single-layer structure or a multi-layer structure in which layers are laminated in the third direction DR3.

Figure 7A:
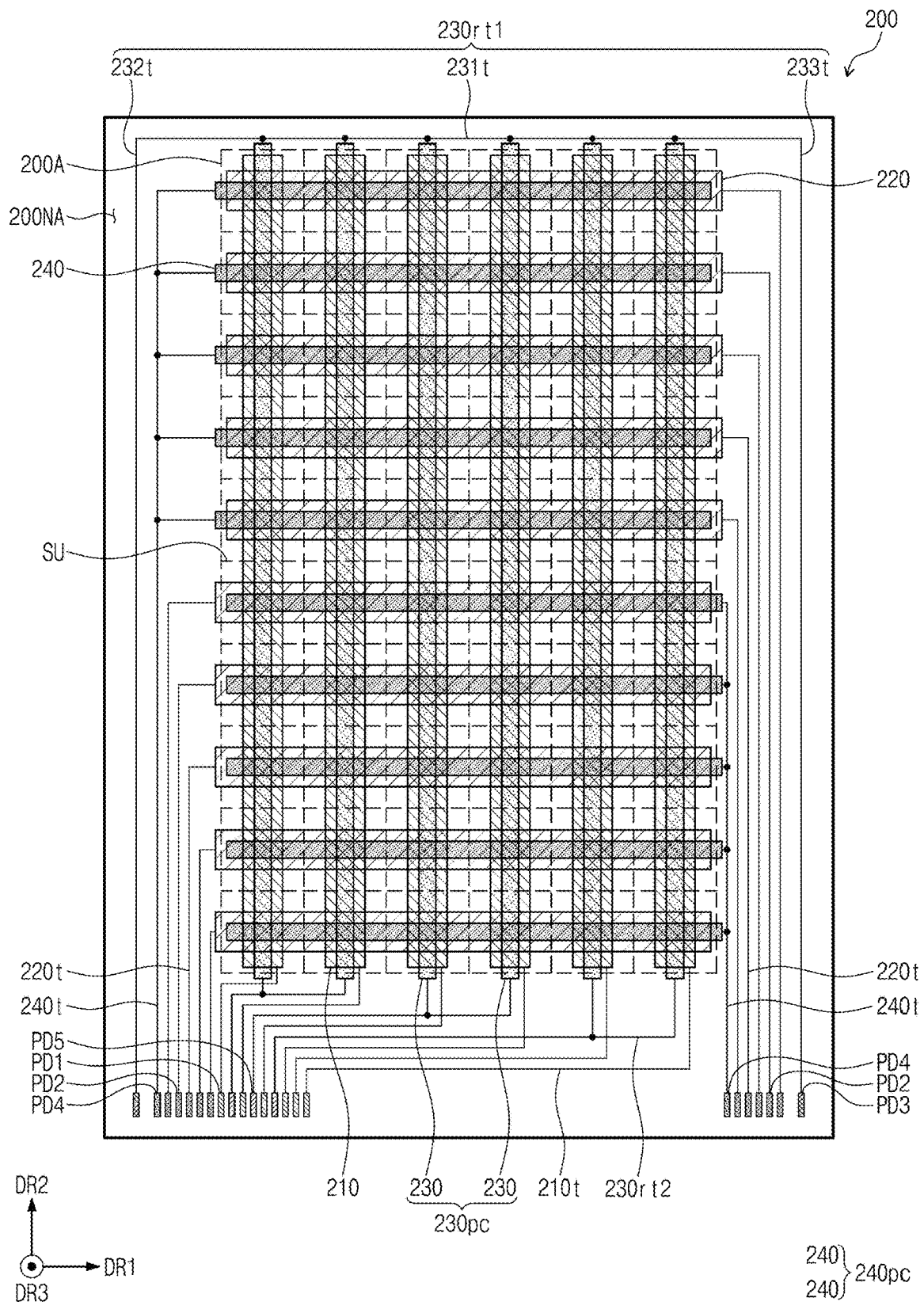
FIG. 7A is a plan view of a sensor layer according to some embodiments of the present disclosure.
Figure 7B:
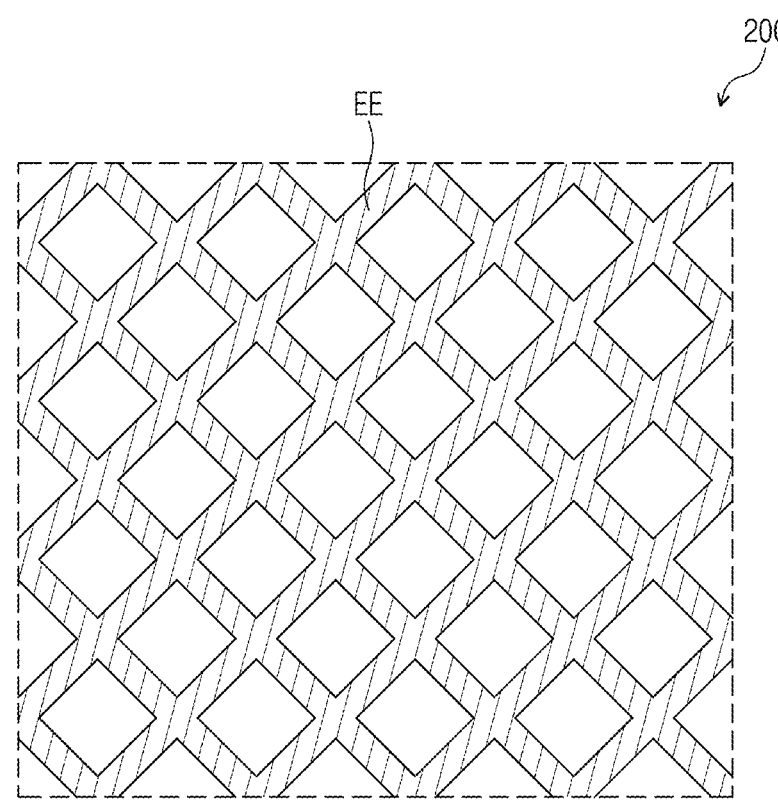
FIG. 7B is an enlarged plan view of one electrode inside the sensor layer according to some embodiments of the present disclosure.

FIG. 7A is a plan view of the sensor layer 200 according to some embodiments of the present disclosure. FIG. 7B is an enlarged plan view of one electrode inside the sensor layer 200 according to some embodiments of the present disclosure.

Figure 7B:
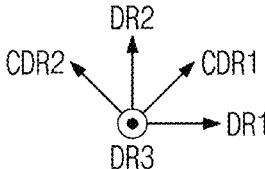

Referring to FIG. 7, a sensing area 200A and a peripheral area 200NA adjacent to the sensing area 200A may be defined in the sensor layer 200.

The sensor layer 200 may include a plurality of first electrodes 210, a plurality of second electrodes 220, a plurality of third electrodes 230, and a plurality of fourth electrodes 240, which area arranged in the sensing area 200A. In the specification, the plurality of first electrodes 210 may be referred to as a plurality of first touch electrodes, and the plurality of second electrodes 220 may be referred to as a plurality of second touch electrodes. In the specification, the plurality of third electrodes 230 may be referred to as a plurality of first pen electrodes or a plurality of first auxiliary electrodes, and the plurality of fourth electrodes 240 may be referred to as a plurality of second pen electrodes or a plurality of second auxiliary electrodes.

The first electrodes 210 may intersect the second electrodes 220. Each of the first electrodes 210 may extend in the second direction DR2, and the first electrodes 210 may be arranged to be spaced apart from each other in the first direction DR1. Each of the second electrodes 220 may extend in the first direction DR1, and the second electrodes 220 may be arranged to be spaced apart from each other in the second direction DR2. The second electrodes 220 may be insulated from and intersect the first electrodes 210. A sensing unit SU of the sensor layer 200 may be an area in which the one first electrode 210 and the one second electrode 220 intersect each other.

FIG. 7A illustratively illustrates six first electrodes 210 and ten second electrodes 220 and illustratively illustrates 60 sensing units SU, but the number of first electrodes 210 and the number of second electrodes 220 are not limited thereto.

Each of the third electrodes 230 may extend in the second direction DR2, and the third electrodes 230 may be arranged to be spaced apart from each other in the first direction DR1. The one third electrode 230 may at least partially overlap the one first electrode 210. According to some embodiments of the present disclosure, an overlapping area between the one first electrode 210 and the one third electrode 230 may be adjusted to adjust a capacitance (or a coupling capacitance) between the one first electrode 210 and the one third electrode 230.

According to some embodiments of the present disclosure, at least some of the third electrodes 230 may be connected in parallel to each other. For example, FIG. 7A illustratively illustrates that the two third electrodes 230 are connected to each other in parallel to constitute a first electrode group 230pc, and three first electrode groups 230pc may be arranged in the first direction DR1. However, the number of third electrodes 230 constituting the first electrode group 230pc is not limited thereto. For example, the one first electrode group 230pc may include only the one third electrode 230 or may include three or more third electrodes 230.

As the number of third electrodes 230 included in the first electrode group 230pc and connected in parallel to each other is increased, resistance of the first electrode group 230pc is decreased, and thus power efficiency may be relatively improved, and sensing sensitivity may be relatively improved. In contrast, as the number of third electrodes 230 included in the first electrode group 230pc is decreased, a loop coil pattern formed using the first electrode group 230pc may be implemented in more various forms.

The fourth electrodes 240 may be arranged in the second direction DR2, and the fourth electrodes 240 may extend in the first direction DR1. The fourth electrodes 240 may be insulated from and intersect the third electrodes 230. The one fourth electrode 240 may at least partially overlap the one second electrode 220. According to some embodiments of the present disclosure, an overlapping area between the one second electrode 220 and the one fourth electrode 240 may be adjusted to adjust a capacitance (or a coupling capacitance) between the one second electrode 220 and the one fourth electrode 240.

According to some embodiments of the present disclosure, at least some of the fourth electrodes 240 may be electrically connected to each other to constitute one second electrode group 240pc. For example, FIG. 7A illustratively illustrates the five fourth electrodes 240 are connected to the same trace line, for example, a fourth trace line 240t to constitute the one second electrode group 240pc. Thus, FIG. 7A illustrates that the two second electrode groups 240pc may be arranged in the second direction DR2. However, the number of fourth electrodes 240 constituting the one second electrode group 240pc is not limited thereto. For example, the number of fourth electrodes 240 constituting the one second electrode group 240pc may be ten, and in this case, the sensor layer 200 may include only the one second electrode group 240pc.

The sensor layer 200 may further include a plurality of first trace lines 210t arranged in the peripheral area 200NA, a plurality of first pads PD1 connected to the first trace lines 210t in one-to-one correspondence, a plurality of second trace lines 220t, and a plurality of second pads PD2 connected to the second trace lines 220t in one-to-one correspondence. The first trace lines 210t may be electrically connected to the first electrodes 210 in one-to-one correspondence. The second trace lines 220t may be electrically connected to the second electrodes 220 in one-to-one correspondence.

The sensor layer 200 may further include a third trace line 230rt1 located in the peripheral area 200NA, a plurality of third pads PD3 connected to one end and the other end of the third trace line 230rt1, fourth trace lines 240t, fourth pads PD4 connected to the fourth trace lines 240t in one-to-one correspondence, fifth trace lines 230rt2, and fifth pads PD5 connected to the fifth trace lines 230rt2 in one-to-one correspondence.

The third trace line 230rt1 may be electrically connected to the third electrodes 230. According to some embodiments of the present disclosure, the third trace line 230rt1 may be electrically connected to all of the third electrodes 230. The third trace line 230rt1 may include a first line part 231t extending in the first direction DR1 and electrically connected to the third electrodes 230, a second line part 232t extending from a first end of the first line part 231t in the second direction DR2, and a third line part 233t extending from a second end of the first line part 231t in the second direction DR2.

According to some embodiments of the present disclosure, each of resistance of the second line part 232t and resistance of the third line part 233t may be the same (or substantially the same) as resistance of the one third electrodes 230 among the third electrodes 230. Thus, the second line part 232t and the third line part 233t may serve as the third electrodes 230, and the same effect may be obtained as if the third electrodes 230 are also arranged in the peripheral area 200NA. For example, any one of the second line part 232t and the third line part 233t and any one of the third electrodes 230 may form a coil. Thus, the pen positioned in an area adjacent to the peripheral area 200NA may also be sufficiently charged by a loop including the second line part 232t or the third line part 233t.

According to some embodiments of the present disclosure, a width of each of the second line part 232t and the third line part 233t in the first direction DR1 may be adjusted to adjust the resistance of the second line part 232t and the resistance of the third line part 233t. However, this is merely an example, and the first to third line parts 231t, 232t, and 233t may have the same (or substantially the same) width.

The fifth trace lines 230rt2 may be connected to the first electrode groups 230pc in one-to-one correspondence. That is, the number of fifth trace lines 230rt2 may correspond to the number of first electrode groups 230pc. FIG. 7A illustratively illustrates three fifth trace lines 230rt2 and three first electrode groups 230pc.

According to some embodiments of the present disclosure, the fifth trace lines 230rt2 and the fifth pad PD5 may be omitted, and a charging drive mode for charging the pen may be omitted. In this case, the sensor layer 200 may sense an input by the active pen that may emit a magnetic field even when the magnetic field is not provided from the sensor layer 200.

The fourth trace lines 240t may be spaced apart from each other with the sensing area 200A interposed therebetween. The fourth trace lines 240t may be electrically connected to the second electrode groups 240pc in one-to-one correspondence. FIG. 7A illustratively illustrates that the two second electrode groups 240*pc* are arranged. The fourth trace line 240*t* connected to the one second electrode group 240*pc* and the fourth trace line 240*t* connected to the other one second electrode group 240*pc* may be spaced apart from each other with the sensing area 200A interposed therebetween. However, embodiments according to the present disclosure are not particularly limited thereto.

FIG. 7B is an enlarged plan view illustrating one electrode EE inside the sensor layer 200, and the one electrode EE may correspond to any one of the first electrodes 210, the second electrode 220, the third electrodes 230, and the fourth electrodes 240 of FIG. 7A. Referring to FIGS. 7A and 7B, each of the first electrodes 210, the second electrodes 220, the third electrodes 230, and the fourth electrodes 240 may have a mesh structure. Each of the mesh structures may include a plurality of mesh lines. Each of the plurality of mesh lines may have a shape extending in a direction (e.g., a set or predetermined direction), and the mesh lines may be connected to each other. The shape may be various shapes such as a straight line, a line having a protrusion, and an uneven line. Openings without a mesh structure may be defined (provided or formed) in each of the first electrodes 210, second electrodes 220, third electrodes 230, and fourth electrodes 240. The openings may overlap the light emitting area PXA (see FIG. 6), and the mesh lines may overlap the non-light emitting area NPXA (see FIG. 6). However, embodiments according to the present disclosure are not particularly limited thereto.

FIG. 7B illustratively illustrate that the mesh structure includes mesh lines extending in a first intersection direction CDR1 that intersects the first direction DR1 and the second direction DR2 and mesh lines extending in a second intersection direction CDR2 that intersects the first intersection direction CDR1. However, the extension direction of the mesh lines constituting the mesh structure is not particularly limited to illustration of FIG. 7B. For example, the mesh structure may include only mesh lines extending in the first direction DR1 and the second direction DR2 or may include mesh lines extending in the first direction DR1, the second direction DR2, the first intersection direction CDR1, and the second intersection direction CDR2. That is, the mesh structure may be changed into various forms.

Figure 8A:
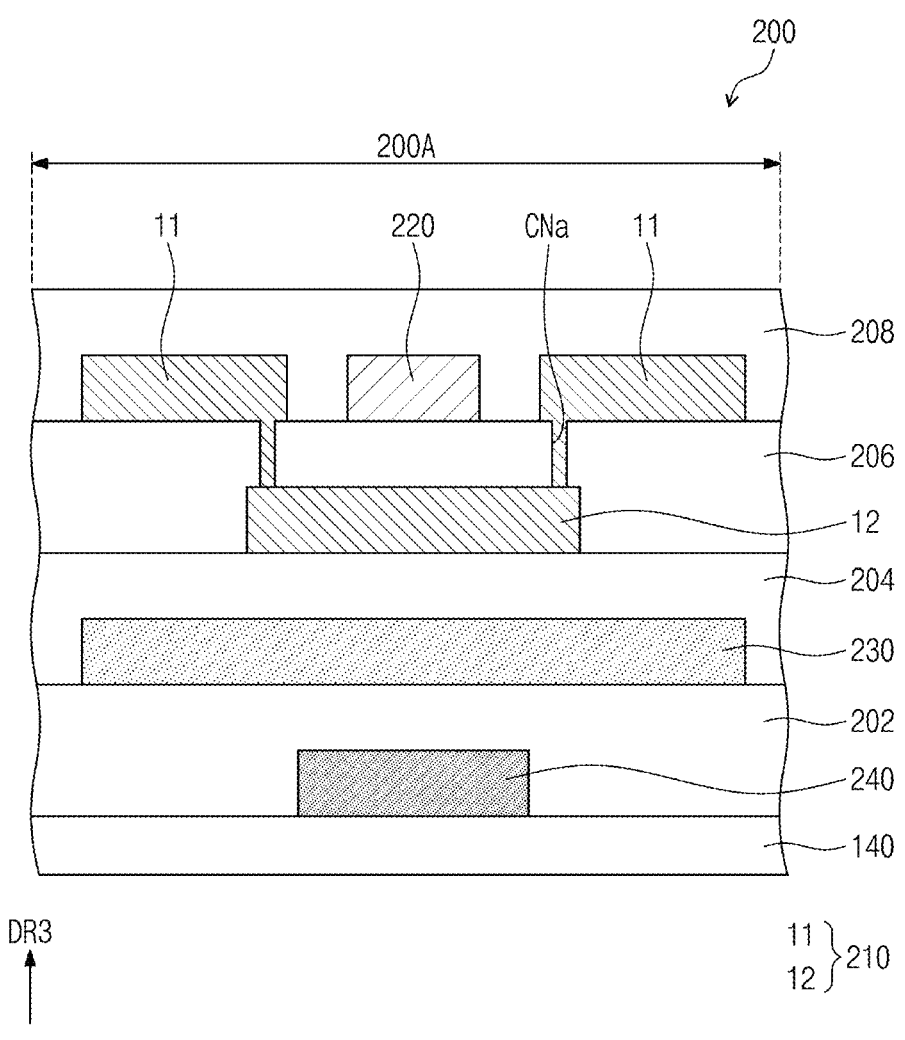
FIGS. 8A and 8B are enlarged cross-sectional views of a portion of a sensing area of the sensor layer according to some embodiments of the present disclosure.
Figure 8B:
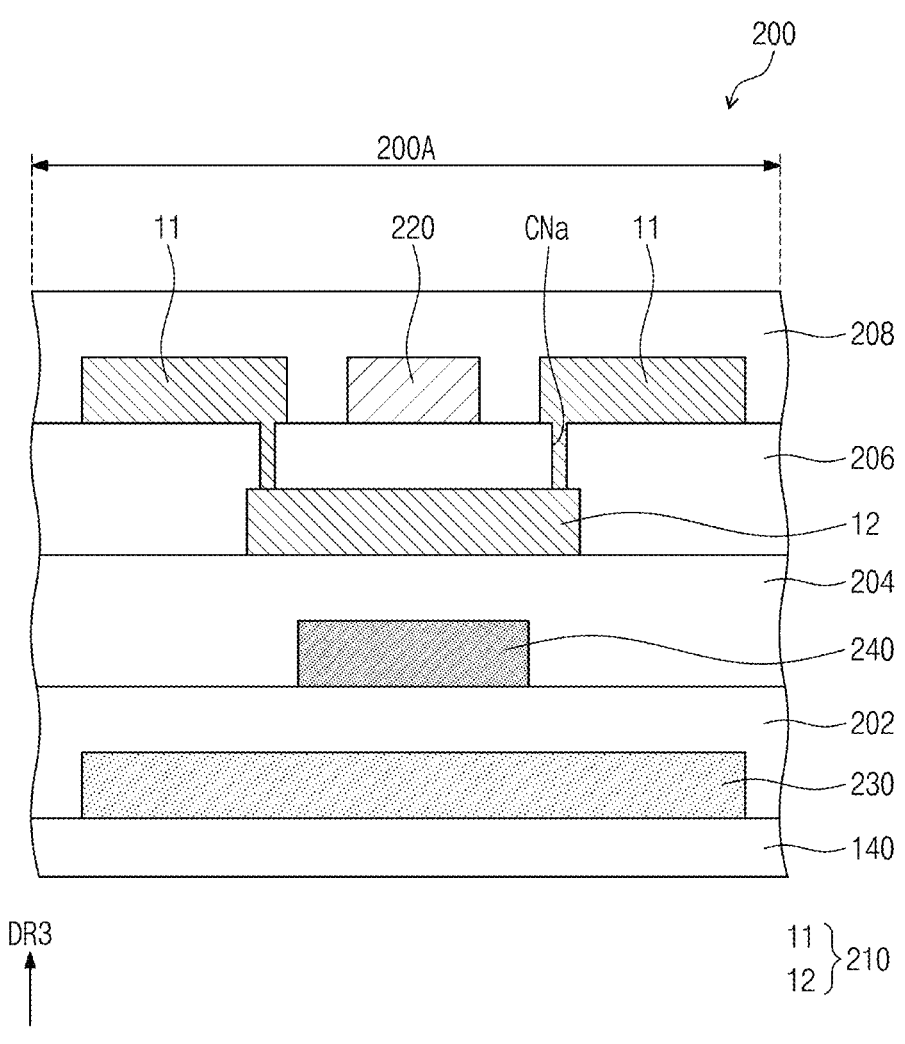

FIGS. 8A and 8B are enlarged cross-sectional views of a portion of the sensing area 200A of the sensor layer 200 according to some embodiments of the present disclosure.

Referring to FIGS. 6, 7A, 8A, and 8B, the sensor layer 200 may include the first electrodes 210, the second electrodes 220, the third electrodes 230, and the fourth electrodes 240. Further, the sensor layer 200 may include four conductive layers, that is, the first to fourth conductive layers 201, 203, 205, and 207. For convenience of description, FIGS. 8A and 8B illustrate the encapsulation layer 140 together, and according to some embodiments, as illustrated in FIGS. 8A and 8B, the sensor layer 200 may be directly located on the encapsulation layer 140. For example, the first conductive layer 201 may be directly located on the encapsulation layer 140.

According to some embodiments of the present disclosure, each of the first electrodes 210 may include first sensing patterns 11 and a first bridge pattern 12 connecting adjacent first sensing patterns 11. Inside the one first electrode 210, the first sensing patterns 11 may be arranged in the first direction DR1 that is an extension direction of the first electrode 210. Inside the one first electrode 210, the first bridge pattern 12 may be provided as a plurality of first bridge patterns 12, and each of the plurality of first bridge patterns 12 may connect the adjacent first sensing patterns 11.

The first sensing patterns 11 and the first bridge patterns 12 may be arranged on different layers. The first sensing patterns 11 and the first bridge patterns 12 may be connected to each other through a contact hole CNa.

The first sensing patterns 11 of the first electrodes 210 and the second electrodes 220 may be arranged on the same layer. The first bridge pattern 12 may be located on a different layer from those of the first sensing patterns 11 and the second electrodes 220. For example, the first sensing patterns 11 and the second electrodes 220 may be included in the fourth conductive layer 207, and the first bridge pattern 12 may be included in the third conductive layer 205.

The third electrodes 230 may be arranged on a different layer from those of the first and second electrodes 210 and 220. According to some embodiments, the third electrodes 230 may be arranged below the first and second electrodes 210 and 220.

The fourth electrodes 240 may be arranged on a different layer from those of the first to third electrodes 210, 220, and 230. According to some embodiments, the fourth electrodes 240 may be arranged below the first and second electrodes 210 and 220.

As illustrated in FIG. 8A, according to some embodiments of the present disclosure, the third electrodes 230 may be included in the second conductive layer 203, and the fourth electrodes 240 may be included in the first conductive layer 201.

Alternatively, as illustrated in FIG. 8B, according to some embodiments of the present disclosure, the third electrodes 230 may be included in the first conductive layer 201, and the fourth electrodes 240 may be included in the second conductive layer 203.

Figure 8C:
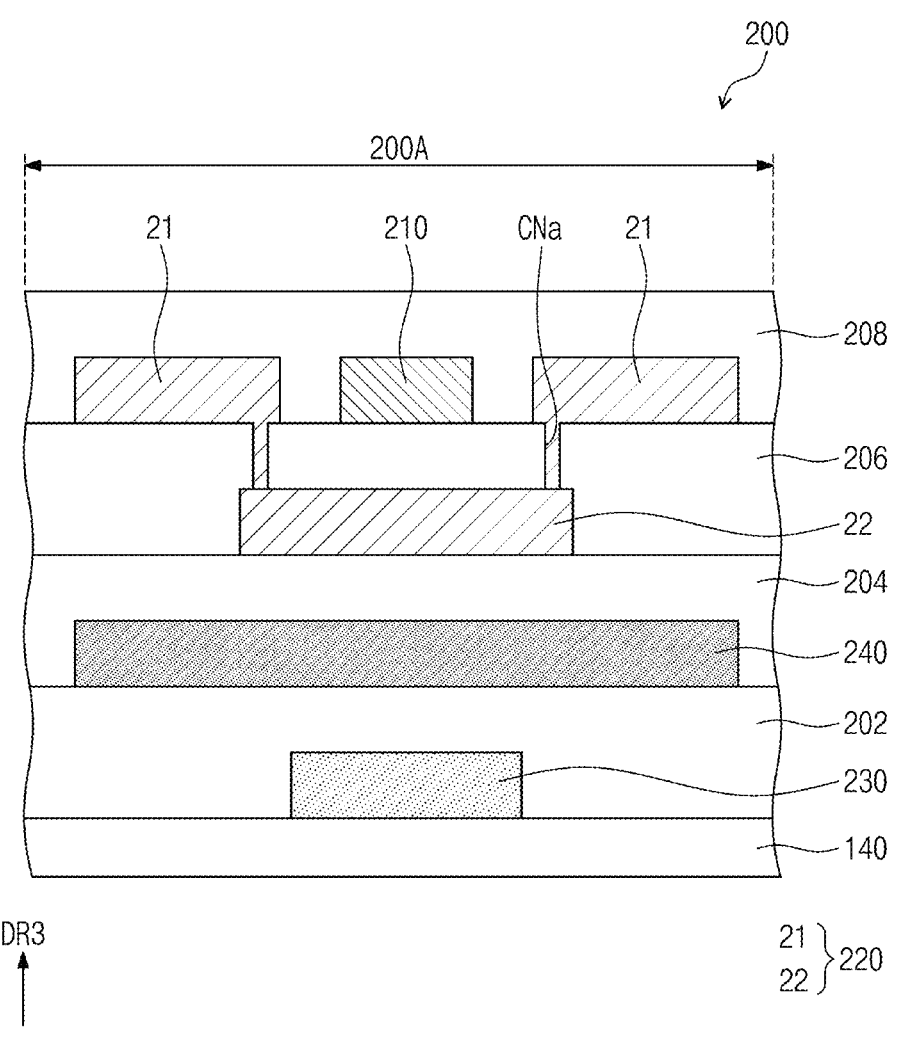
FIG. 8C is an enlarged cross-sectional view of the portion of the sensing area of the sensor layer according to some embodiments of the present disclosure.

FIG. 8C is an enlarged cross-sectional view of a portion of the sensing area 200A of the sensor layer 200 according to some embodiments of the present disclosure.

Referring to FIGS. 6, 7A, and 8C, according to some embodiments of the present disclosure, each of the second electrodes 220 may include second sensing patterns 21 and a second bridge pattern 22 that connects adjacent second sensing patterns 21. Inside the one second electrode 220, the second sensing patterns 21 may be arranged in the second direction DR2 that is an extension direction of the second electrode 220. Inside the one second electrode 220, the second bridge pattern 22 may be provided as a plurality of second bridge patterns 22, and each of the plurality of second bridge patterns 22 may connect the adjacent second sensing patterns 21.

The second sensing patterns 21 and the second bridge patterns 22 may be arranged on different layers. The second sensing patterns 21 and the second bridge patterns 22 may be connected to each other through the contact hole CNa.

According to some embodiments, the second sensing patterns 21 of the second electrodes 220 and the first electrodes 210 may be arranged on the same layer. The second bridge pattern 22 may be located on a different layer from those of the second sensing patterns 21 and the first electrodes 210. For example, the second sensing patterns 21 and the first electrodes 210 may be included in the fourth conductive layer 207, and the second bridge pattern 22 may be included in the third conductive layer 205.

The third electrodes 230 may be arranged on a different layer from those of the first and second electrodes 210 and 220. According to some embodiments, the third electrodes 230 may be arranged below the first and second electrodes 210 and 220.

The fourth electrodes 240 may be arranged on a different layer from those of the first to third electrodes 210, 220, and 230. According to some embodiments, the fourth electrodes 240 may be arranged below the first and second electrodes 210 and 220.

As illustrated in FIG. 8C, according to some embodiments of the present disclosure, the third electrodes 230 may be included in the second conductive layer 203, and the fourth electrodes 240 may be included in the first conductive layer 201. However, embodiments according to the present disclosure are not limited thereto, the third electrodes 230 may be included in the first conductive layer 201, and the fourth electrodes 240 may be included in the second conductive layer 203.

Figure 9A:
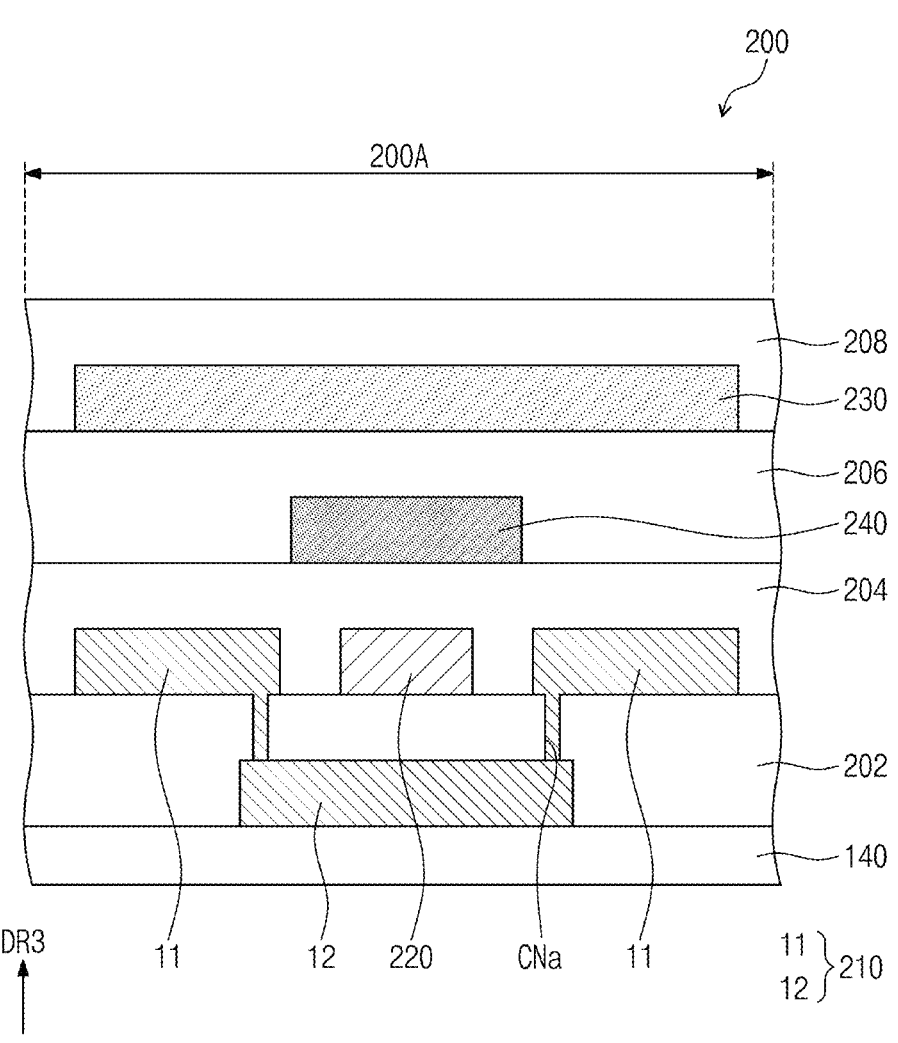
FIGS. 9A and 9B are enlarged cross-sectional views of the portion of the sensing area of the sensor layer according to some embodiments of the present disclosure.
Figure 9B:
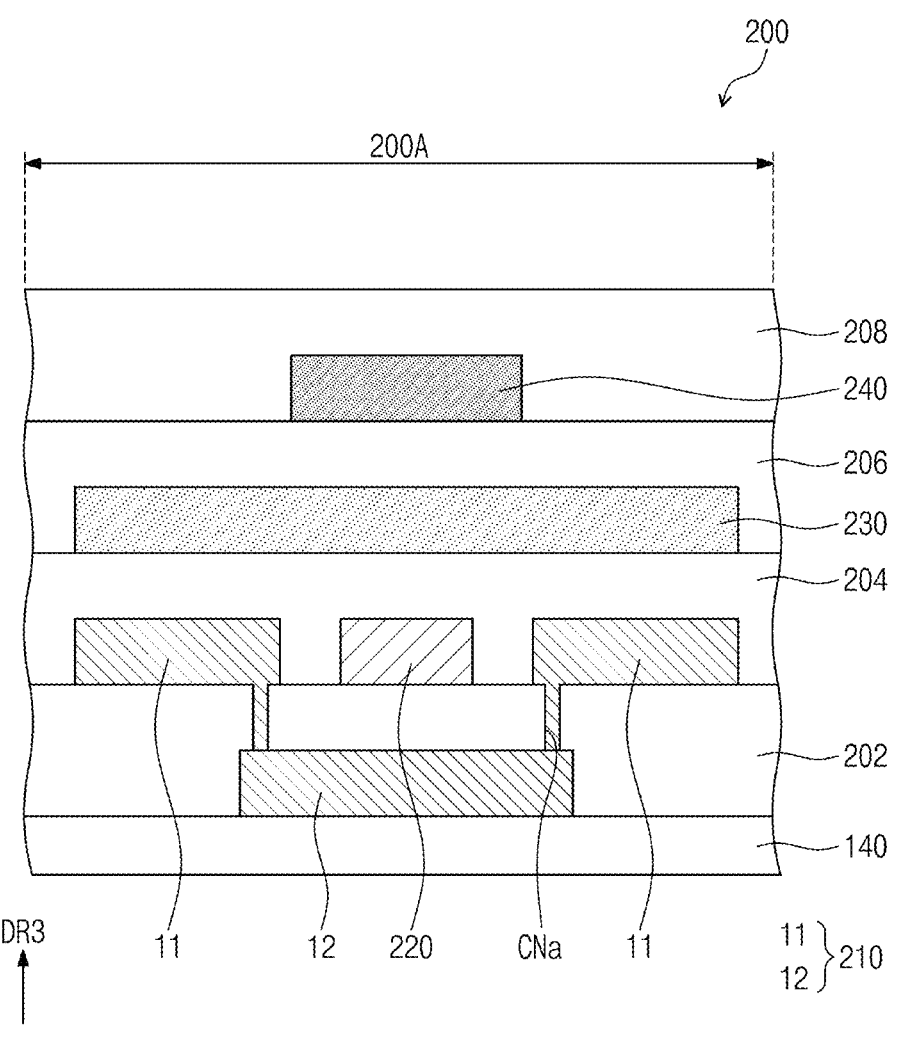

FIGS. 9A and 9B are enlarged cross-sectional views of the portion of the sensing area 200A of the sensor layer 200 according to some embodiments of the present disclosure.

Referring to FIGS. 6, 7A, 9A, and 9B, according to some embodiments of the present disclosure, each of the first electrodes 210 may include the first sensing patterns 11 and the first bridge pattern 12 connecting adjacent first sensing patterns 11. The first sensing patterns 11 and the first bridge patterns 12 may be arranged on different layers. The first sensing patterns 11 and the first bridge patterns 12 may be connected to each other through the contact hole CNa.

The first sensing patterns 11 and the second electrodes 220 may be arranged on the same layer. The first bridge pattern 12 may be located on a different layer from those of the first sensing patterns 11 and the second electrodes 220. For example, the first sensing patterns 11 and the second electrodes 220 may be included in the second conductive layer 203, and the first bridge pattern 12 may be included in the first conductive layer 201.

The third electrodes 230 may be arranged on a different layer from those of the first and second electrodes 210 and 220. According to some embodiments, the third electrodes 230 may be arranged above the first and second electrodes 210 and 220.

The fourth electrodes 240 may be arranged on a different layer from those of the first to third electrodes 210, 220, and 230. According to some embodiments, the fourth electrodes 240 may be arranged above the first and second electrodes 210 and 220.

As illustrated in FIG. 9A, according to some embodiments of the present disclosure, the third electrodes 230 may be included in the fourth conductive layer 207, and the fourth electrodes 240 may be included in the third conductive layer 205.

Alternatively, as illustrated in FIG. 9B, according to some embodiments of the present disclosure, the third electrodes 230 may be included in the third conductive layer 205, and the fourth electrodes 240 may be included in the fourth conductive layer 207.

Figure 10A:
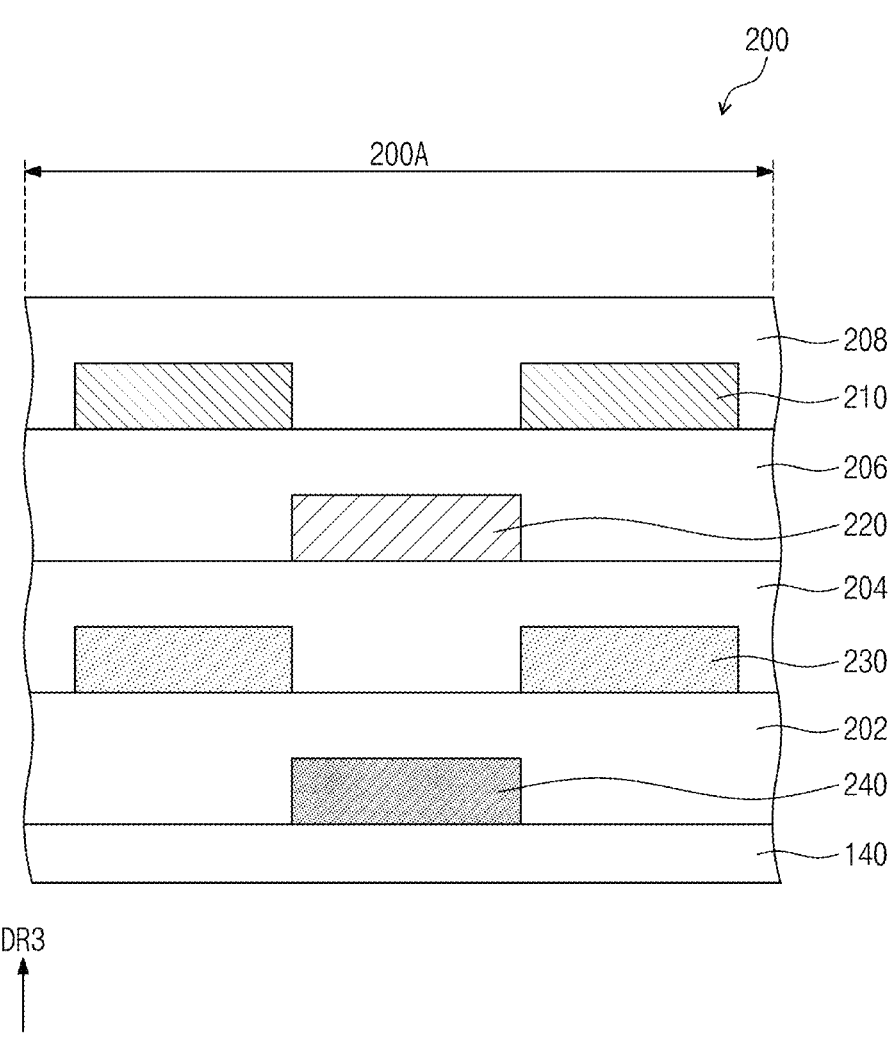
FIGS. 10A and 10B are enlarged cross-sectional views of the portion of the sensing area of the sensor layer according to some embodiments of the present disclosure.
Figure 10B:
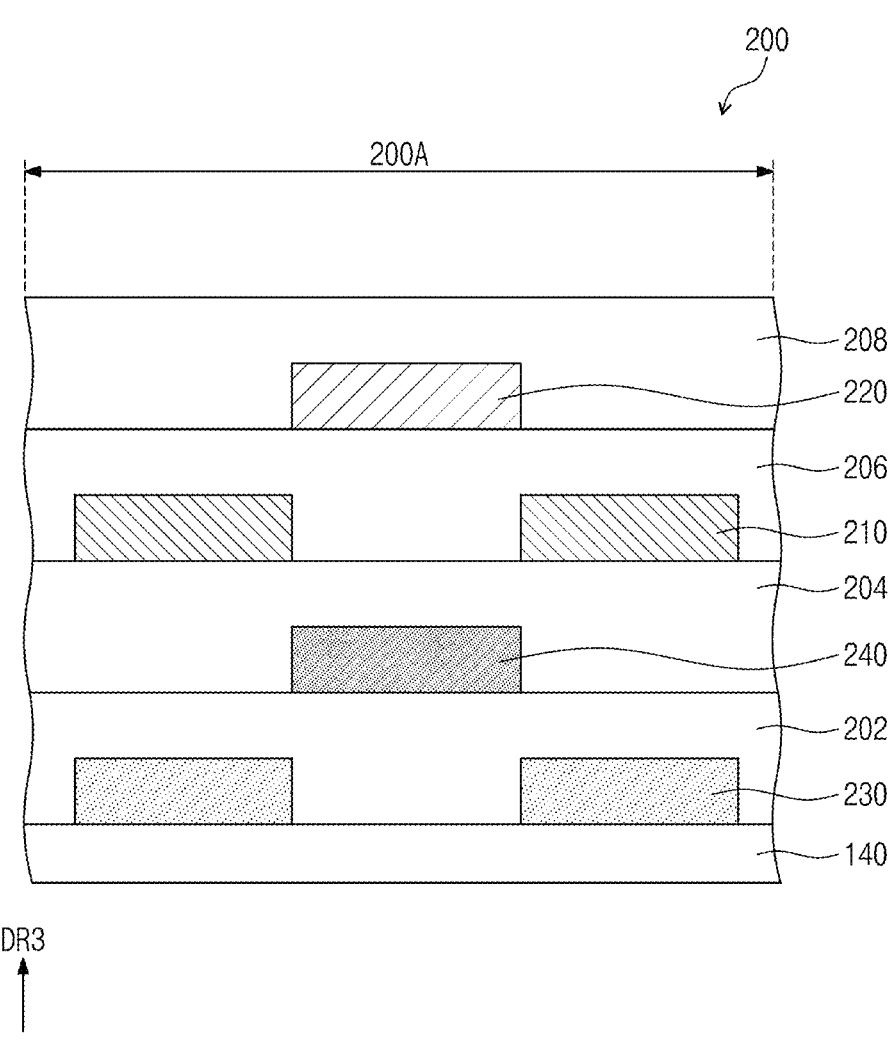

FIGS. 10A and 10B are enlarged cross-sectional views of the portion of the sensing area 200A of the sensor layer 200 according to some embodiments of the present disclosure.

Referring to FIGS. 6, 7A, 10A, and 10B, according to some embodiments of the present disclosure, the first electrodes 210 and the second electrodes 220 may be arranged on different layers. Accordingly, all of the first electrodes 210 and the second electrodes 220 may not include a separate bridge pattern for connecting adjacent sensing patterns in an area in which the first and second electrodes 210 and 220 intersect each other. The first electrodes 210 may be arranged to be included in one conductive layer, and the second electrodes 220 may be arranged to be included in another conductive layer.

As illustrated in FIG. 10A, according to some embodiments of the present disclosure, all of the first electrodes 210 may be included in the fourth conductive layer 207, and all of the second electrodes 220 may be included in the third conductive layer 205.

Alternatively, as illustrated in FIG. 10B, according to some embodiments of the present disclosure, all of the first electrodes 210 may be included in the third conductive layer 205, and all of the second electrodes 220 may be included in the fourth conductive layer 207.

The third electrodes 230 may be arranged on a different layer from those of the first and second electrodes 210 and 220. According to some embodiments, the third electrodes 230 may be arranged below the first and second electrodes 210 and 220.

The fourth electrodes 240 may be arranged on a different layer from those of the first to third electrodes 210, 220, and 230. According to some embodiments, the fourth electrodes 240 may be arranged below the first and second electrodes 210 and 220.

As illustrated in FIG. 10A, according to some embodiments of the present disclosure, the third electrodes 230 may be included in the second conductive layer 203, and the fourth electrodes 240 may be included in the first conductive layer 201.

Alternatively, as illustrated in FIG. 10B, according to some embodiments of the present disclosure, the third electrodes 230 may be included in the first conductive layer 201, and the fourth electrodes 240 may be included in the second conductive layer 203.

Figure 11A:
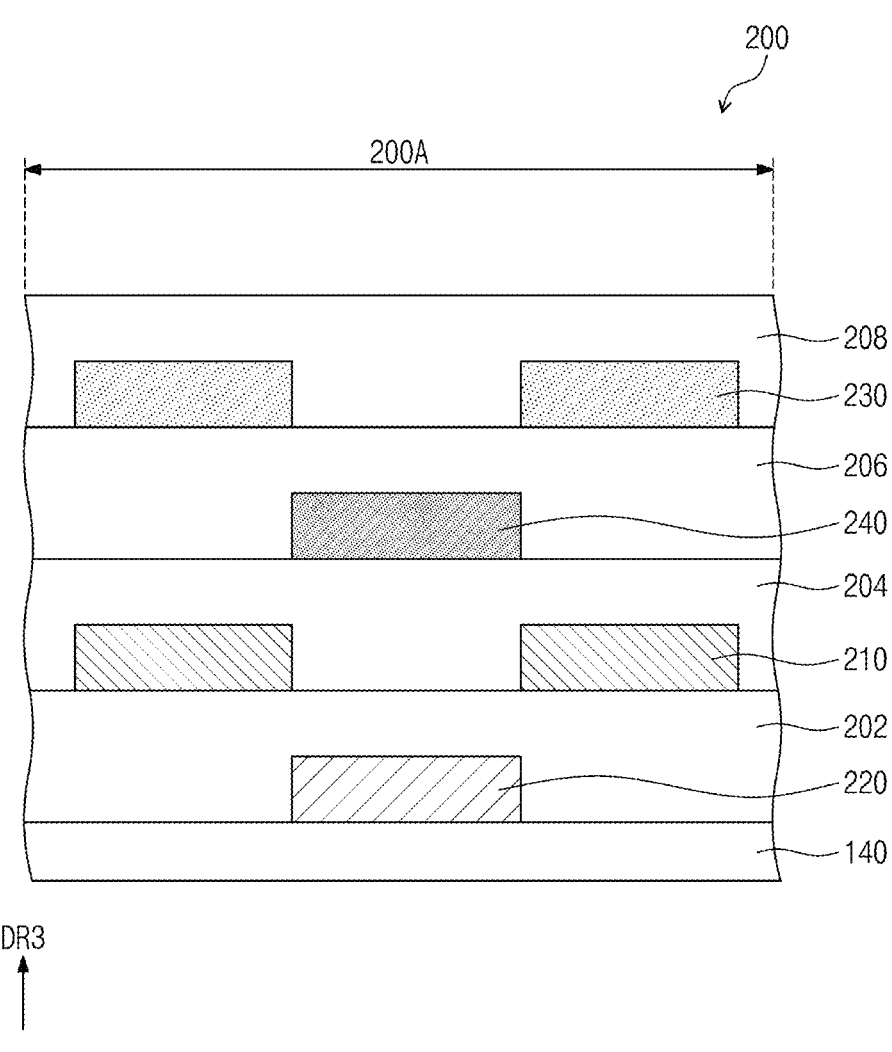
FIGS. 11A and 11B are enlarged cross-sectional views of the portion of the sensing area of the sensor layer according to some embodiments of the present disclosure.
Figure 11B:
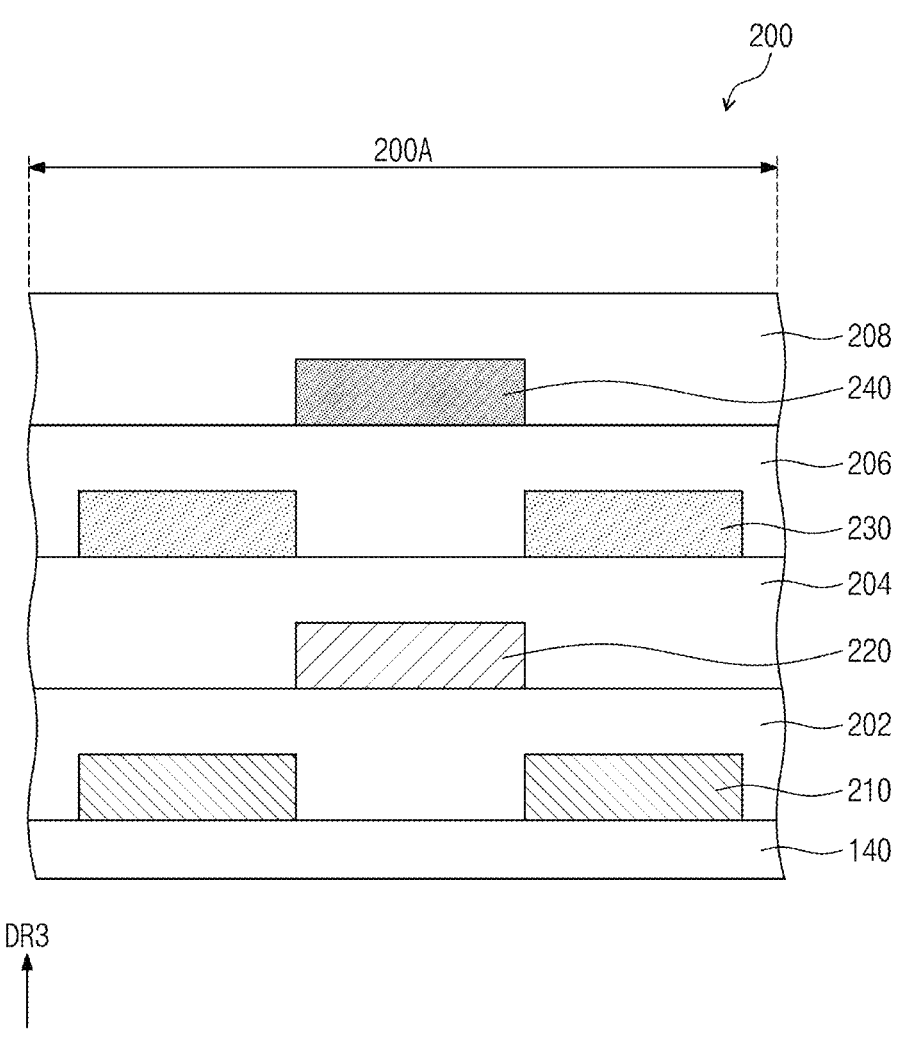

FIGS. 11A and 11B are enlarged cross-sectional views of the portion of the sensing area 200A of the sensor layer 200 according to some embodiments of the present disclosure.

Referring to FIGS. 6, 7A, 11A, and 11B, according to some embodiments of the present disclosure, the first electrodes 210 and the second electrodes 220 may be arranged on different layers. The first electrodes 210 may be arranged to be included in one conductive layer, and the second electrodes 220 may be arranged to be included in another conductive layer.

As illustrated in FIG. 11A, according to some embodiments of the present disclosure, the first electrodes 210 may be included in the second conductive layer 203, and the second electrodes 220 may be included in the first conductive layer 201.

Alternatively, as illustrated in FIG. 11B, according to some embodiments of the present disclosure, the first electrodes 210 may be included in the first conductive layer 201, and the second electrodes 220 may be included in the second conductive layer 203.

The third electrodes 230 may be arranged on a different layer from those of the first and second electrodes 210 and 220. According to some embodiments, the third electrodes 230 may be arranged above the first and second electrodes 210 and 220.

The fourth electrodes 240 may be arranged on a different layer from those of the first to third electrodes 210, 220, and 230. According to some embodiments, the fourth electrodes 240 may be arranged above the first and second electrodes 210 and 220.

As illustrated in FIG. 11A, according to some embodiments of the present disclosure, the third electrodes 230 may be included in the fourth conductive layer 207, and the fourth electrodes 240 may be included in the third conductive layer 205.

Alternatively, as illustrated in FIG. 11B, according to some embodiments of the present disclosure, the third electrodes 230 may be included in the third conductive layer 205, and the fourth electrodes 240 may be included in the fourth conductive layer 207.

FIGS. 8A to 11B illustrate aspects of an arrangement design of the first to fourth electrodes 210, 220, 230, and 240. According to some embodiments, the sensor layer 200 may include the four conductive layers 201, 203, 205, and 207 that are laminated in a thickness direction, and thus a sufficient area in which electrodes inside the sensor layer 200 may be arranged may be secured. Accordingly, the degree of freedom in designing a pattern of each of the electrodes may be relatively improved.

According to some embodiments, electrodes (e.g., the first electrodes 210 and the second electrodes 220) provided for touch sensing and electrodes (e.g., the third electrodes 230 and the fourth electrodes 240) provided for pen sensing may not be arranged on the same layer, and thus a width of an area in which the electrodes provided for the touch sensing and the electrodes provided for the pen sensing may be arranged may be maximally secured. Further, the electrodes provided for the touch sensing may be designed through two conductive layers, and thus a width of an area in which electrodes (e.g., the first electrodes) arranged in one direction and electrodes (e.g., the second electrodes) arranged in a direction that intersects the one direction may be arranged may be also maximally secured. Likewise, the electrodes provided for the pen sensing may be designed through two conductive layers, and thus a width of an area in which electrodes (e.g., the third electrodes) arranged in one direction and electrodes (e.g., the fourth electrodes) arranged in a direction that intersects the one direction may be arranged may be also maximally secured. As a result, both touch sensing sensitivity and pen sensing sensitivity may be relatively improved.

Figure 12A:
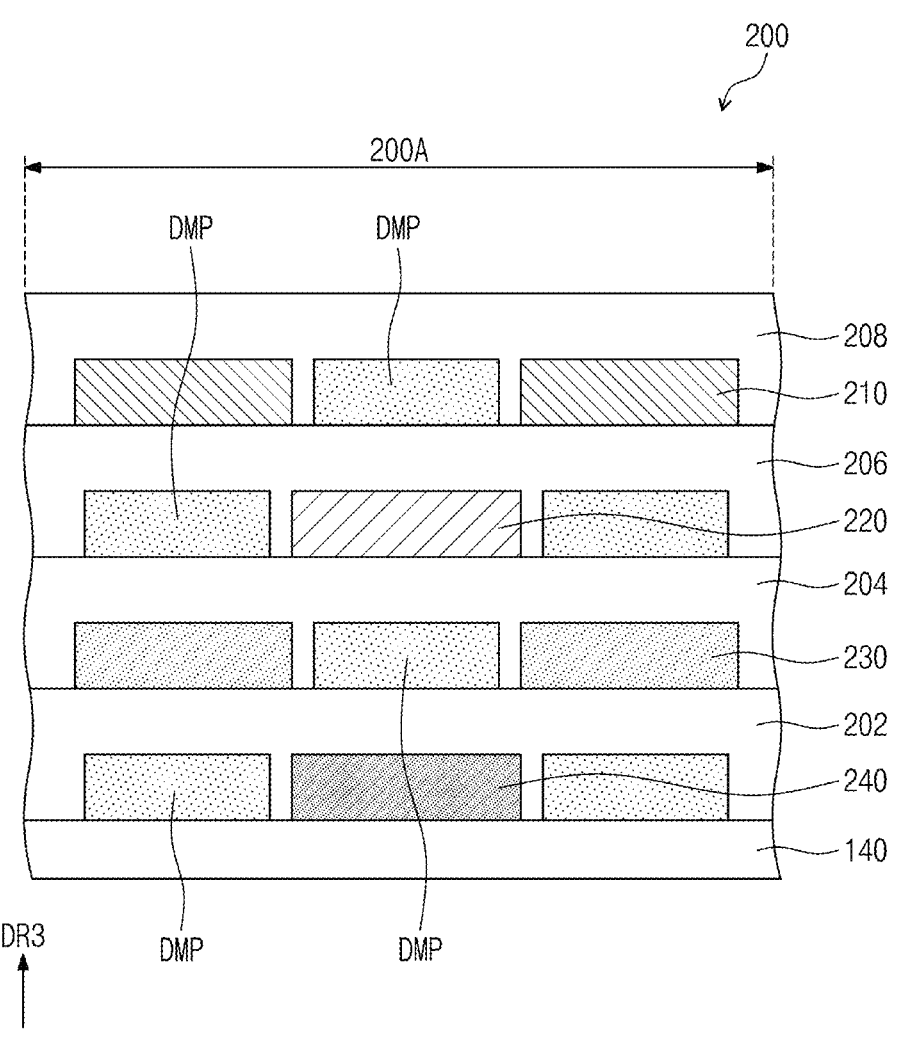
FIG. 12A is an enlarged cross-sectional view of the portion of the sensing area of the sensor layer according to some embodiments of the present disclosure.
Figure 12B:
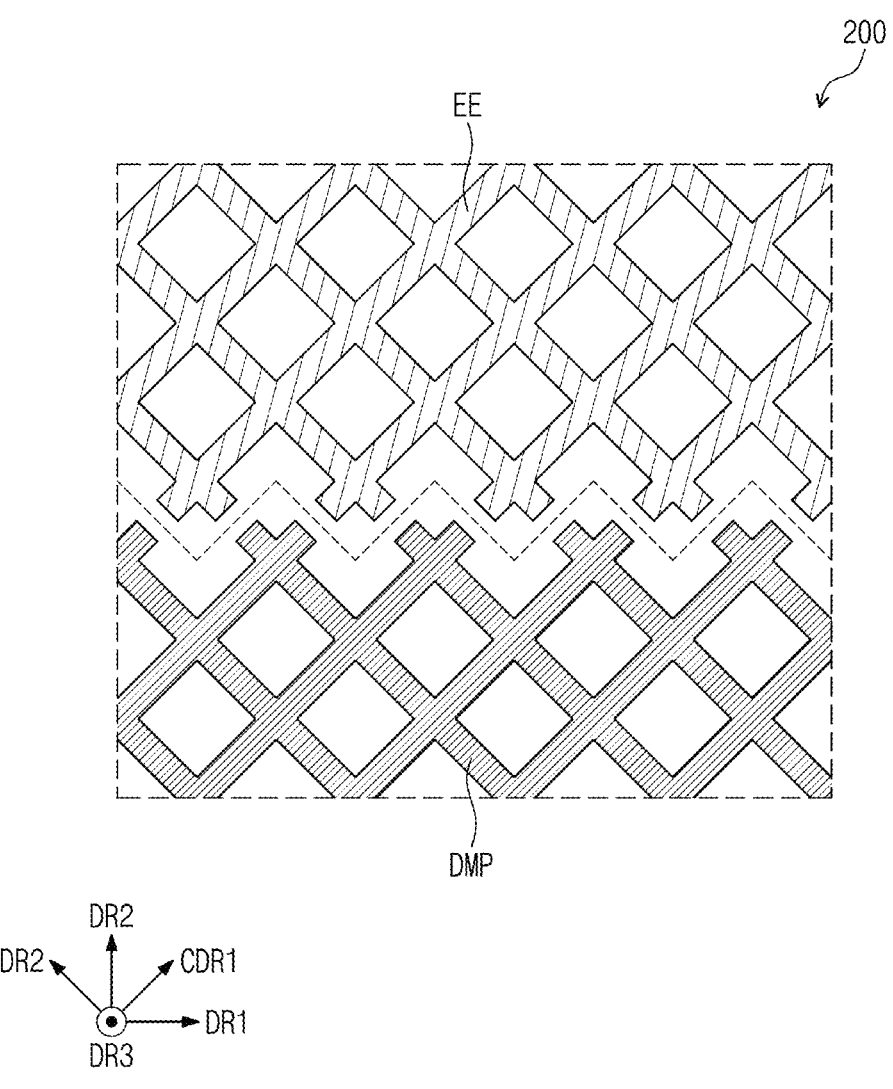
FIG. 12B is an enlarged plan view of the portion of the sensing area of the sensor layer according to some embodiments of the present disclosure.

FIG. 12A is an enlarged cross-sectional view of the portion of the sensing area 200A of the sensor layer 200 according to some embodiments of the present disclosure. FIG. 12B is an enlarged plan view of the portion of the sensing area 200A of the sensor layer 200 according to some embodiments of the present disclosure.

Referring to FIGS. 6, 7A, 12A, and 12B, according to some embodiments of the present disclosure, the sensor layer 200 may include the first electrodes 210, the second electrodes 220, the third electrodes 230, the fourth electrodes 240, and at least one dummy pattern DMP. That is, the sensor layer 200 may further include the dummy pattern DMP. The dummy pattern DMP may be floating or electrically floating.

The dummy pattern DMP may be included in at least one of the first to fourth conductive layers 201, 203, 205, or 207. The dummy pattern DMP may be provided in a space in which the first to fourth electrodes 210, 220, 230, and 240 are not arranged in at least one of the first to fourth conductive layers 201, 203, 205, or 207. The dummy pattern DMP may be insulated from the first to fourth electrodes 210, 220, 230, and 240.

FIG. 12A illustratively illustrates that the dummy pattern DMP is provided in a space in which the first to fourth electrodes 210, 220, 230, and 240 are not arranged in each of the first to fourth conductive layers 201, 203, 205, and

207. That is, it is illustratively illustrated that all of the first to fourth conductive layers 201, 203, 205, and 207 include the dummy patterns DMP.

FIG. 12B is an enlarged plan view illustrating the one electrode EE and the dummy pattern DMP adjacent thereto inside the sensor layer 200, and the one electrode EE may correspond to any one of the first electrodes 210, the second electrode 220, the third electrodes 230, and the fourth electrodes 240 of FIG. 12A. Each of the one electrode EE and the dummy pattern DMP adjacent thereto may have a mesh structure. The above description in FIG. 7B may be similarly applied to a description of the mesh structure of the dummy pattern DMP.

Cutting lines cutting the mesh structure illustrated in FIG. 12B may correspond to boundaries between respective components. In plan views of the sensing unit described below with reference, it may be understood that lines forming boundaries between electrodes and dummy patterns correspond to the cutting lines cutting the mesh structure illustrated in FIG. 12B.

Figure 13A:
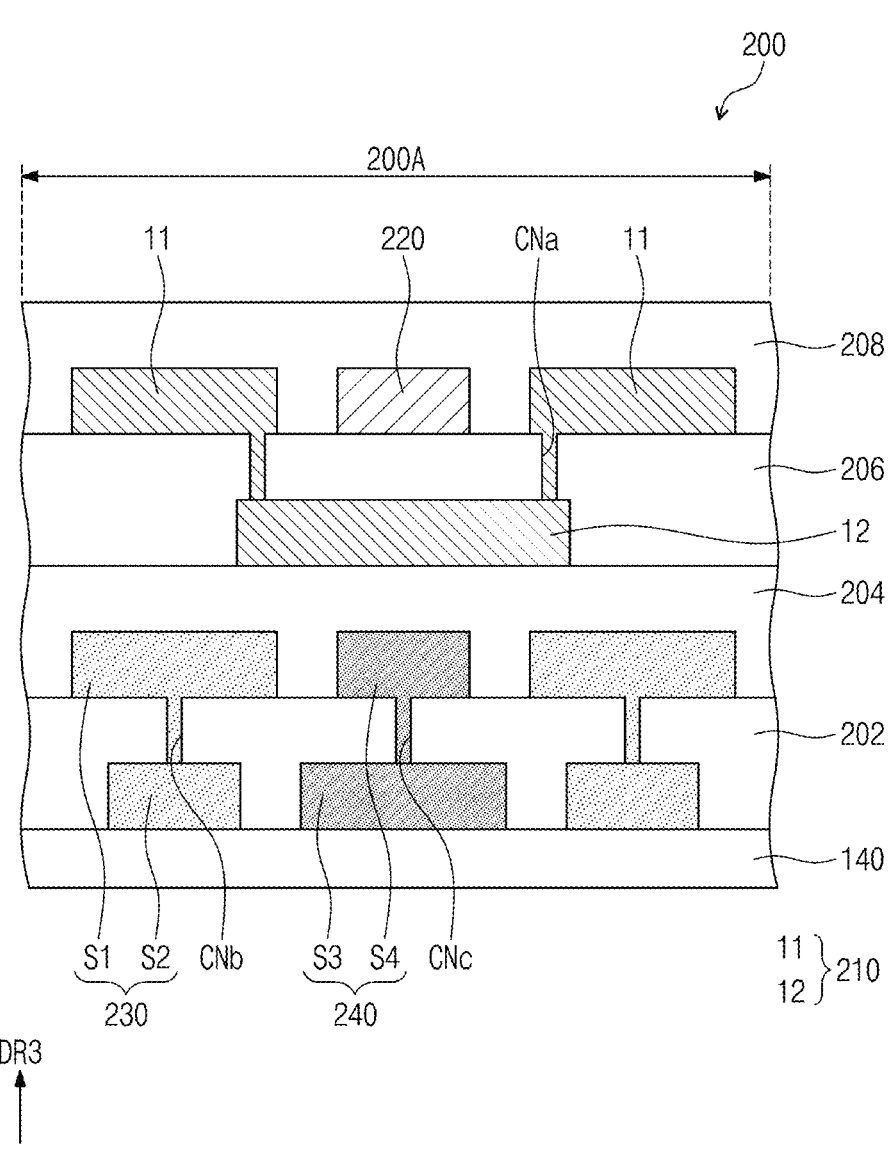
FIGS. 13A and 13B are enlarged cross-sectional views of the portion of the sensing area of the sensor layer according to some embodiments of the present disclosure.
Figure 13B:
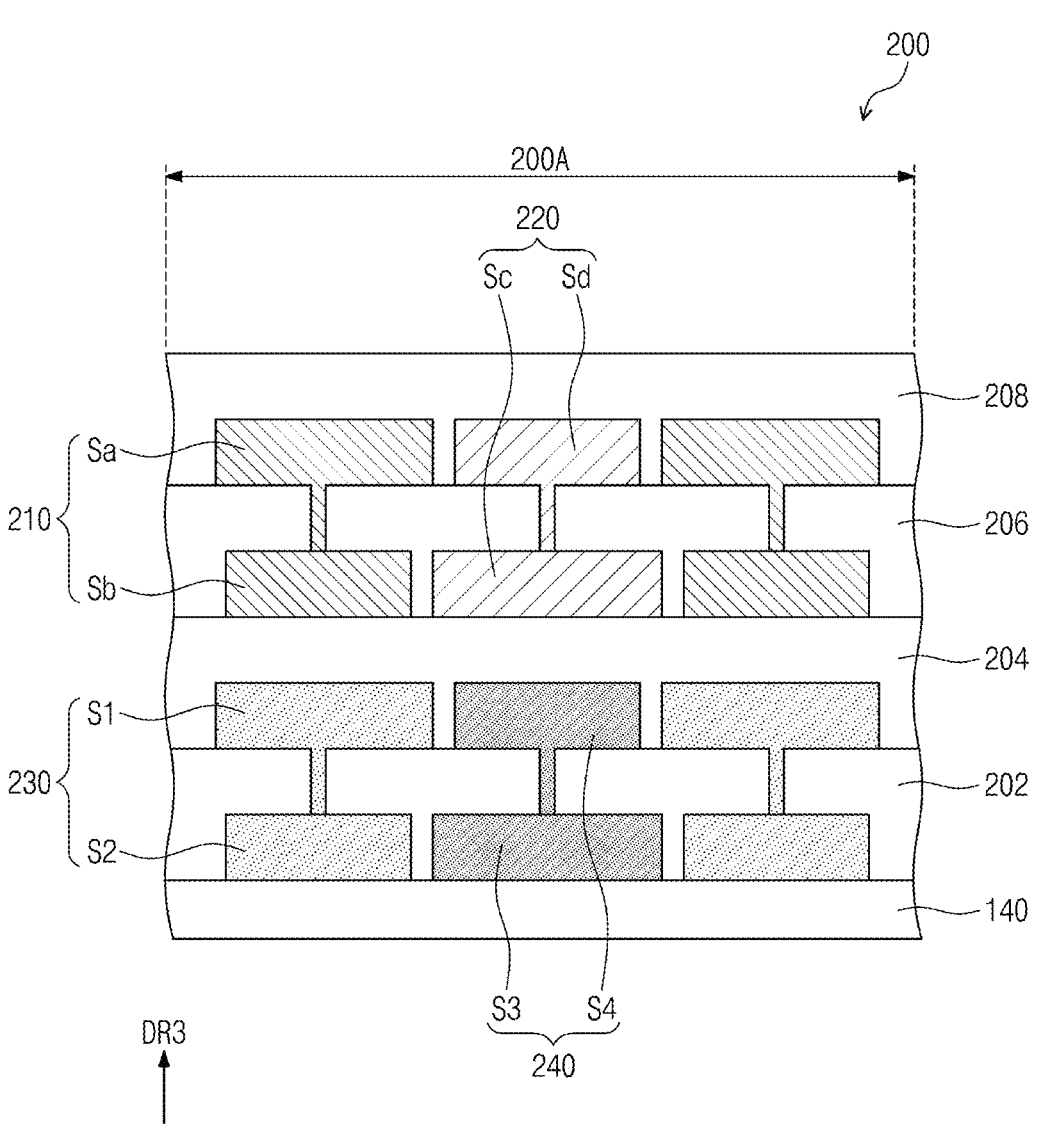

FIGS. 13A and 13B are enlarged cross-sectional views of the portion of the sensing area 200A of the sensor layer 200 according to some embodiments of the present disclosure.

Referring to FIGS. 6, 7A, 13A, and 13B, according to some embodiments of the present disclosure, at least some of the first to fourth electrodes 210, 220, 230, and 240 may include sub-electrodes that at least partially overlap each other. The sub-electrodes included in any one of the first to fourth electrodes 210, 220, 230, and 240 may be arranged on different layers and at least partially overlap each other.

FIG. 13A illustratively illustrates that each of the third electrodes 230 includes a first sub-electrode S1 and a second sub-electrode S2 arranged on different layers, and each of the fourth electrodes 240 includes a third sub-electrode S3 and a fourth sub-electrode S4 arranged on different layers. For example, the first sub-electrode S1 may be included in the second conductive layer 203, and the second sub-electrode S2 may be included in the first conductive layer 201. For example, the third sub-electrode S3 may be included in the first conductive layer 201, and the fourth sub-electrode S4 may be included in the second conductive layer 203. The first sub-electrode S1 of the third electrode 230 and the fourth sub-electrode S4 of the fourth electrode 240 may be arranged on the same layer, and the second sub-electrode S2 of the third electrode 230 and the third sub-electrode S3 of the fourth electrode 240 may be arranged on the same layer. Each of the third electrodes 230 and the fourth electrodes 240 includes sub-electrodes, and thus at least portions of the third electrodes 230 may be arranged on the same layer as that of the fourth electrodes 240, and at least portions of the fourth electrodes 240 may be arranged on the same layer as that of the third electrodes 230.

Meanwhile, positions in which the first to fourth sub-electrodes S1, S2, S3, and S4 are arranged are not limited thereto, and some of the first to fourth sub-electrodes S1, S2, S3, and S4 may be arranged on the same layer as that of the first electrodes 210 or the second electrodes 220.

The first sub-electrode S1 and the second sub-electrode S2 inside the one third electrode 230 may be connected to each other through a contact hole CNb passing through an insulating layer (e.g., the first insulating layer 202) located between the first and second sub-electrodes S1 and S2. The third sub-electrode S3 and the fourth sub-electrode S4 inside the one fourth electrode 240 may be connected to each other through a contact hole CNc passing through an insulating layer (e.g., the first insulating layer 202) located between the third and fourth sub-electrodes S3 and S4.

FIG. 13B illustratively illustrates that each of the first electrodes 210, the second electrodes 220, the third electrodes 230, and the fourth electrodes 240 includes sub-electrodes. For example, the first electrode 210 may include sub-electrodes Sa and Sb respectively arranged on the fourth conductive layer 207 and the third conductive layer 205, and the second electrode 220 may include sub-electrodes Sc and Sd respectively arranged on the third conductive layer 205 and the fourth conductive layer 207. The third electrode 230 may include the sub-electrodes S1 and S2 respectively arranged on the second conductive layer 203 and the first conductive layer 201, and the fourth electrode 240 may include the sub-electrodes S3 and S4 respectively arranged on the first conductive layer 201 and the second conductive layer 203. Meanwhile, positions in which the sub-electrodes of the first to fourth electrodes 210, 220, 230, and 240 are arranged are illustratively illustrated, and are not limited to the illustrated arrangement.

According to some embodiments, the sensor layer 200 has a structure including four conductive layers, and thus a space in which the sub-electrodes overlapping each other may be arranged may be more easily provided, and the degree of freedom in designing patterns of the electrodes inside the sensor layer may be relatively improved. Accordingly, the electrodes that may relatively improve touch sensing sensitivity and pen sensing sensitivity may be more easily provided.

Figure 14:
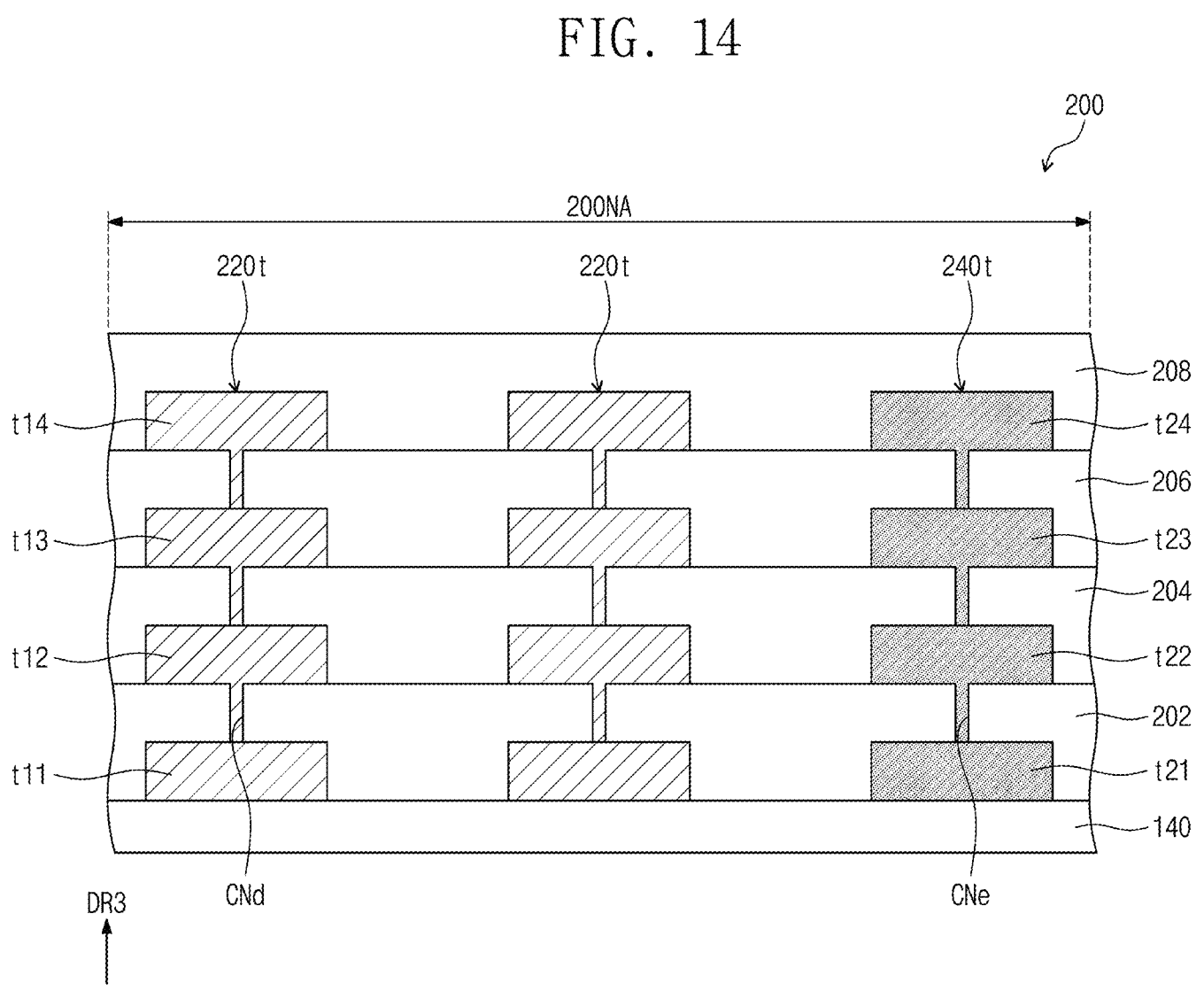

FIG. 14 is an enlarged cross-sectional view of a portion of the peripheral area 200NA of the sensor layer 200 according to some embodiments of the present disclosure.

Referring to FIGS. 6, 7A, and 14, the sensor layer 200 may include the second trace lines 220t and the fourth trace lines 240t arranged in the peripheral area 200NA. The second trace lines 220t may be electrically connected to the second electrodes 220, and the fourth trace lines 240t may be electrically connected to the fourth electrodes 240. The second trace lines 220t and the fourth trace lines 240t may be arranged in an area located on a left side from the sensing area 200A and an area located on a right side from the sensing area 200A in the peripheral area 200NA.

Each of the second trace lines 220t may have a multi-layer structure. Each of the second trace lines 220t may include a $(1\text{-}1)^{th}$ sub-wiring line t11, a $(1\text{-}2)^{th}$ sub-wiring line t12, a $(1\text{-}3)^{th}$ sub-wiring line t13, and a $(1\text{-}4)^{th}$ sub-wiring line t14. That is, each of the second trace lines 220t may have a four-layer structure. The $(1\text{-}1)^{th}$ to $(1\text{-}4)^{th}$ sub-wiring lines t11, t12, t13, and t14 may be included in the first to fourth conductive layers 201, 203, 205, and 207, respectively. The $(1\text{-}1)^{th}$ to $(1\text{-}4)^{th}$ sub-wiring lines t11, t12, t13, and t14 included in the one second trace line 220t may be electrically connected to each other through contact holes CNd.

Each of the fourth trace lines 240t may have a multi-layer structure. Each of the fourth trace lines 240t may include a $(2\text{-}1)^{th}$ sub-wiring line t21, a $(2\text{-}2)^{th}$ sub-wiring line t22, a $(2\text{-}3)^{th}$ sub-wiring line t23, and a $(2\text{-}4)^{th}$ sub-wiring line t24. That is, each of the fourth trace lines 240t may have a four-layer structure. The $(2\text{-}1)^{th}$ to $(2\text{-}4)^{th}$ sub-wiring lines t21, t22, t23, and t24 may be included in the first to fourth conductive layers 201, 203, 205, and 207, respectively. The $(2\text{-}1)^{th}$ to $(2\text{-}4)^{th}$ sub-wiring lines t21, t22, t23, and t24 included in the one fourth trace line 240t may be electrically connected to each other through contact holes CNe.

Meanwhile, according to some embodiments, as illustrated in FIG. 7A, the third trace line 230rt1 may be further located in an area located on a left side from the sensing area 200A and an area located on a right side from the sensing area 200A in the peripheral area 200NA. Similar to the fourth trace line 240t, the third trace line 230rt1 may also have a multi-layer structure including four sub-wiring lines overlapping each other.

Meanwhile, the number of sub-wiring lines provided in a multi-layer structure is not limited thereto, and for example, the trace line having a multi-layer structure may include two sub-wiring lines or three sub-wiring lines.

According to some embodiments, the sensor layer 200 has a structure including four conductive layers, so that the trace lines may be provided in a multi-layer structure. The trace lines may be provided in a multi-layer structure of up to four layers, and therefore, resistance of the trace lines may be decreased. As a result, power efficiency may be relatively improved, and sensing sensitivity may be relatively improved.

Figure 15:
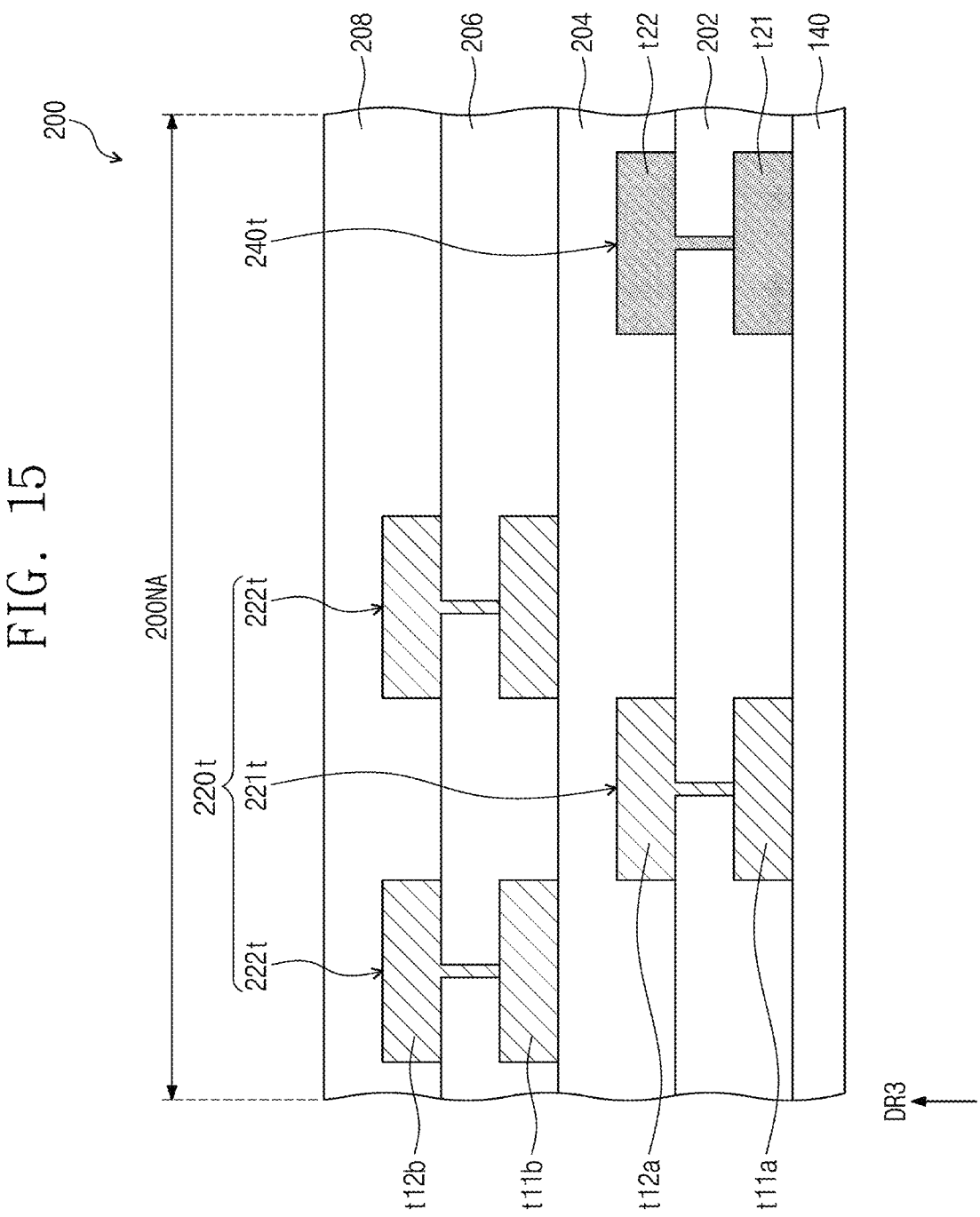
FIG. 15 is an enlarged cross-sectional view of the portion of the peripheral area of the sensor layer according to some embodiments of the present disclosure.

FIG. 15 is an enlarged cross-sectional view of the portion of the peripheral area 200NA of the sensor layer 200 according to some embodiments of the present disclosure.

Referring to FIGS. 6, 7A, and 15, the sensor layer 200 may include the second trace lines 220t and the fourth trace lines 240t arranged in the peripheral area 200NA. The second trace lines 220t and the fourth trace lines 240t may be arranged in the area located on the left side from the sensing area 200A and the area located on the right side from the sensing area 200A in the peripheral area 200NA.

Each of the second trace lines 220t may have a multi-layer structure. Each of the second trace lines 220t may include $(1\text{-}1)^{th}$ sub-wiring lines t11a and t11b and $(1\text{-}2)^{th}$ sub-wiring lines t12a and t12b. That is, each of the second trace lines 220t may have a two-layer structure.

The second trace lines 220t may include $(2\text{-}1)^{th}$ group lines 221t and $(2\text{-}2)^{th}$ group lines 222t arranged on different layers. The $(1\text{-}1)^{th}$ sub-wiring line t11a and the $(1\text{-}2)^{th}$ sub-wiring line t12a of the $(2\text{-}1)^{th}$ group line 221t may be included in the first conductive layer 201 and the second conductive layer 203, respectively. The $(1\text{-}1)^{th}$ sub-wiring line t11b and the $(1\text{-}2)^{th}$ sub-wiring line t12b of the $(2\text{-}2)^{th}$ group line 222t may be included in the third conductive layer 205 and the fourth conductive layer 207, respectively. The plurality of $(2\text{-}1)^{th}$ group lines 221t and the plurality of $(2\text{-}2)^{th}$ group lines 222t may be alternately arranged on a plane. Each of the $(2\text{-}1)^{th}$ group lines 221t may be located between adjacent $(2\text{-}2)^{th}$ group lines 222t, and each of the $(2\text{-}2)^{th}$ group lines 222t may be located between adjacent $(2\text{-}1)^{th}$ group lines 221t.

According to some embodiments, the second trace lines 220t have a structure in which group lines arranged on different layers are arranged alternately, and thus the same number of second trace lines 220t may be arranged within a narrow width as compared to a case in which all of the second trace lines 220t are arranged on the same layer. Accordingly, an area of the area located on the left side from the sensing area 200A and an area of the area located on the right side of the sensing area 200A in the peripheral area 200NA may be decreased. As a result, the area of the front surface of the electronic device 1000 (see FIG. 1A), which is occupied by the peripheral area 200NA, may be decreased, and a narrow bezel may be implemented.

Further, according to some embodiments, the sensor layer 200 may have a structure including four conductive layers, and thus the second trace lines 220t may have a multi-layer structure, and at the same time, may have a structure in which group lines arranged on different layers are alternately arranged. Accordingly, as resistance of the second trace lines 220t is decreased, the narrow bezel may be implemented, and at the same time, power efficiency may be relatively improved, and sensing sensitivity may be relatively improved.

Each of the fourth trace lines 240$t$ may have a multi-layer structure. Each of the fourth trace lines 240$t$ may include the (2-1)$^{th}$ sub-wiring line t21 and the (2-2)$^{th}$ sub-wiring line t22. For example, the (2-1)$^{th}$ sub-wiring line t21 and the (2-2)$^{th}$ sub-wiring line t22 may be included in the first conductive layer 201 and the second conductive layer 203, respectively. However, positions in which the (2-1)$^{th}$ sub-wiring line t21 and the (2-2)$^{th}$ sub-wiring line t22 are arranged are not limited to the illustrated arrangement. FIG. 15 illustratively illustrates that each of the fourth trace lines 240$t$ has a two-layer structure, but according to some embodiments, each of the fourth trace lines 240$t$ may have a three-layer structure or a four-layer structure.

Meanwhile, according to some embodiments, as illustrated in FIG. 7A, the third trace line 230$rt$1 may be further located in the area located on the left side from the sensing area 200A and the area located on the right side from the sensing area 200A in the peripheral area 200NA. Similar to the fourth trace line 240$t$, the third trace line 230$rt$1 may have a multi-layer structure including a plurality of sub-wiring lines overlapping each other.

Figure 16:
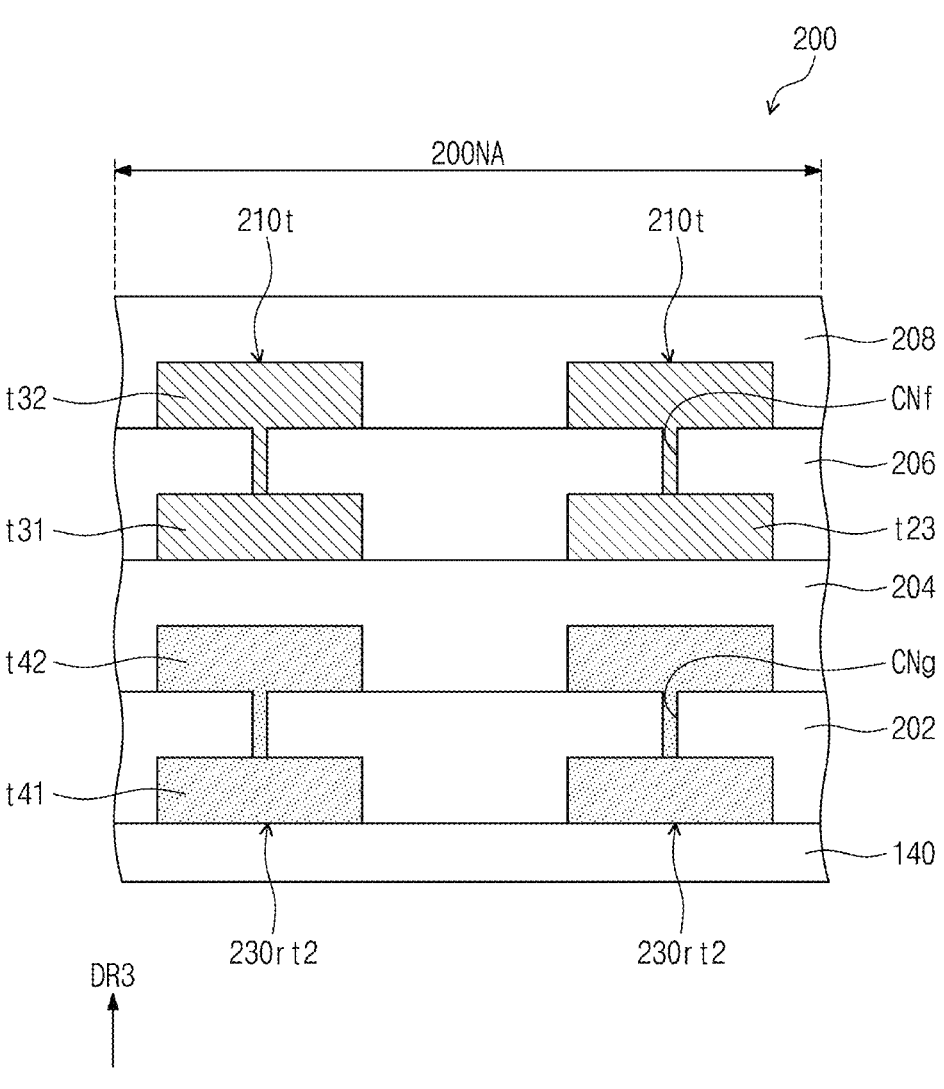
FIG. 16 is an enlarged cross-sectional view of the portion of the peripheral area of the sensor layer according to some embodiments of the present disclosure.

FIG. 16 is an enlarged cross-sectional view of the portion of the peripheral area 200NA of the sensor layer 200 according to some embodiments of the present disclosure.

Referring to FIGS. 6, 7A, and 16, the sensor layer 200 may include the first trace lines 210$t$ and the fifth trace lines 230$rt$2 arranged in the peripheral area 200NA. The first trace lines 210$t$ may be electrically connected to the first electrodes 210, and the fifth trace lines 230$rt$2 may be electrically connected to the third electrodes 230. The first trace lines 210$t$ and the fifth trace lines 230$rt$2 may be arranged between the sensing area 200A and the pads PD1, PD2, PD3, PD4, and PD5. The first trace lines 210$t$ and the fifth trace lines 230$rt$2 may be arranged between the first pads PD1 connected to the first trace lines 210$t$ and the fifth pads PD5 connected to the fifth trace lines 230$rt$2. The first trace lines 210$t$ and the fifth trace lines 230$rt$2 may be arranged in an area located on a lower side from the sensing area 200A in the peripheral area 200NA.

Each of the first trace lines 210$t$ may have a multi-layer structure. Each of the first trace lines 210$t$ may include a (3-1)$^{th}$ sub-wiring line t31 and a (3-2)$^{th}$ sub-wiring line t32. That is, each of the first trace lines 210$t$ may have a two-layer structure. For example, the (3-1)$^{th}$ sub-wiring line t31 and the (3-2)$^{th}$ sub-wiring line t32 may be included in the third conductive layer 205 and the fourth conductive layer 207, respectively. The (3-1)$^{th}$ and (3-2)$^{th}$ sub-wiring lines t31 and t32 included in the one first trace line 210$t$ may be electrically connected to each other through contact holes CNf.

Each of the fifth trace lines 230$rt$2 may have a multi-layer structure. Each of the fifth trace lines 230$rt$2 may include a (4-1)$^{th}$ sub-wiring line t41 and a (4-2)$^{th}$ sub-wiring line t42. That is, each of the fifth trace lines 230$rt$2 may have a two-layer structure. The (4-1)$^{th}$ and (4-2)$^{th}$ sub-wiring lines t41 and t42 of the fifth trace lines 230$rt$2 may be arranged in layers different from the (3-1)$^{th}$ and (3-2)$^{th}$ sub-wiring lines t31 and t32 of the first trace lines 210$t$. For example, the (4-1)$^{th}$ sub-wiring line t41 and the (4-2)$^{th}$ sub-wiring line t42 may be included in the first conductive layer 201 and the second conductive layer 203, respectively. The (4-1)$^{th}$ and (4-2)$^{th}$ sub-wiring lines t41 and t42 included in the one fifth trace line 230$rt$2 may be electrically connected to each other through contact holes CNg.

According to some embodiments, the sensor layer 200 has a structure including four conductive layers, and thus each of the first trace lines 210$t$ and the fifth trace lines 230$rt$2 may be provided in a multi-layer structure, and at the same time, the first trace lines 210$t$ and the fifth trace lines 230$rt$2 may be arranged on different layers. Therefore, resistance of the first trace lines 210$t$ and the fifth trace lines 230$rt$2 may be decreased. As a result, power efficiency may be relatively improved, and sensing sensitivity may be relatively improved. At the same time, the same number of first and fifth trace lines 210$t$ and 230$rt$2 may be arranged in a narrow width as compared to a case in which all of the first and fifth trace lines 210$t$ and 230$rt$2 are arranged on the same layer. Accordingly, an area of the area located on the lower side from the sensing area 200A in the peripheral area 200NA may be decreased. As a result, the area of the front surface of the electronic device 1000 (see FIG. 1A), which is occupied by the peripheral area 200NA, may be decreased, and the narrow bezel may be implemented.

Figure 17A:
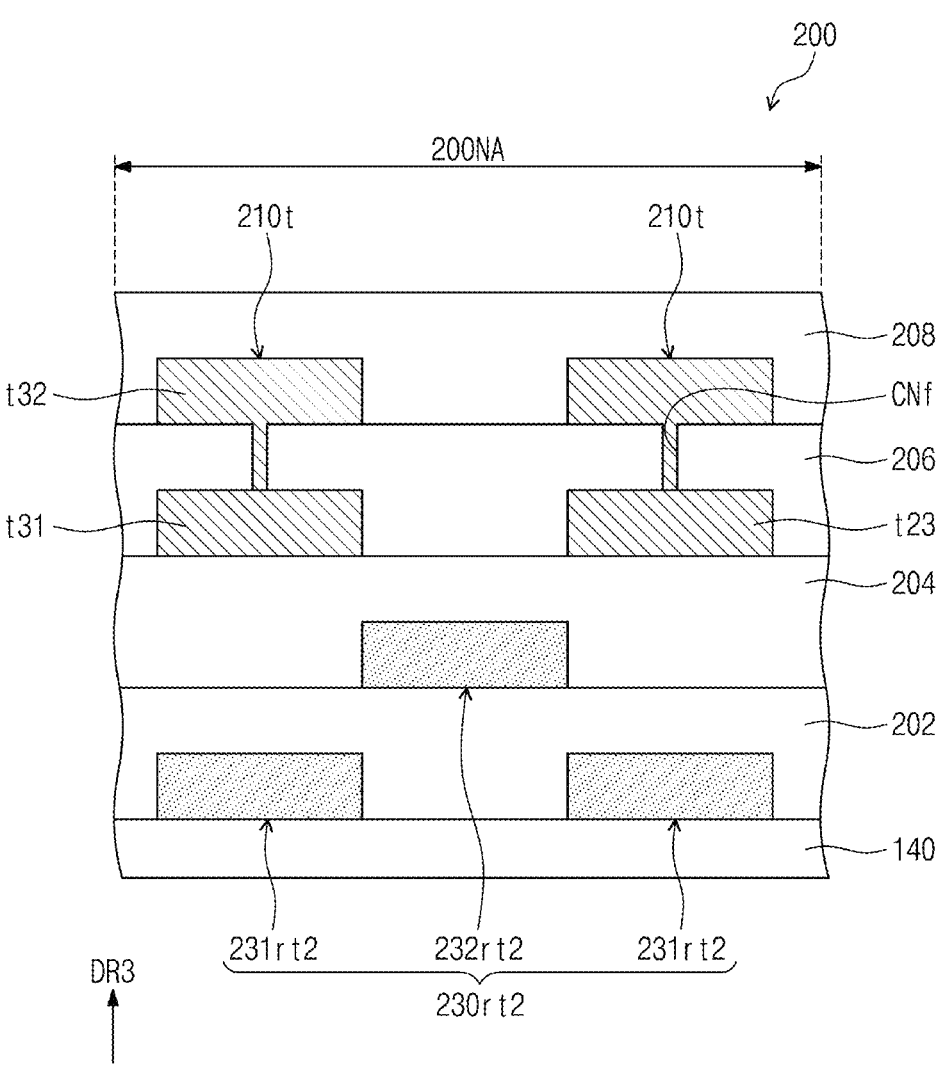
FIGS. 17A to 17C are enlarged cross-sectional views of the portion of the peripheral area of the sensor layer according to some embodiments of the present disclosure.
Figure 17B:
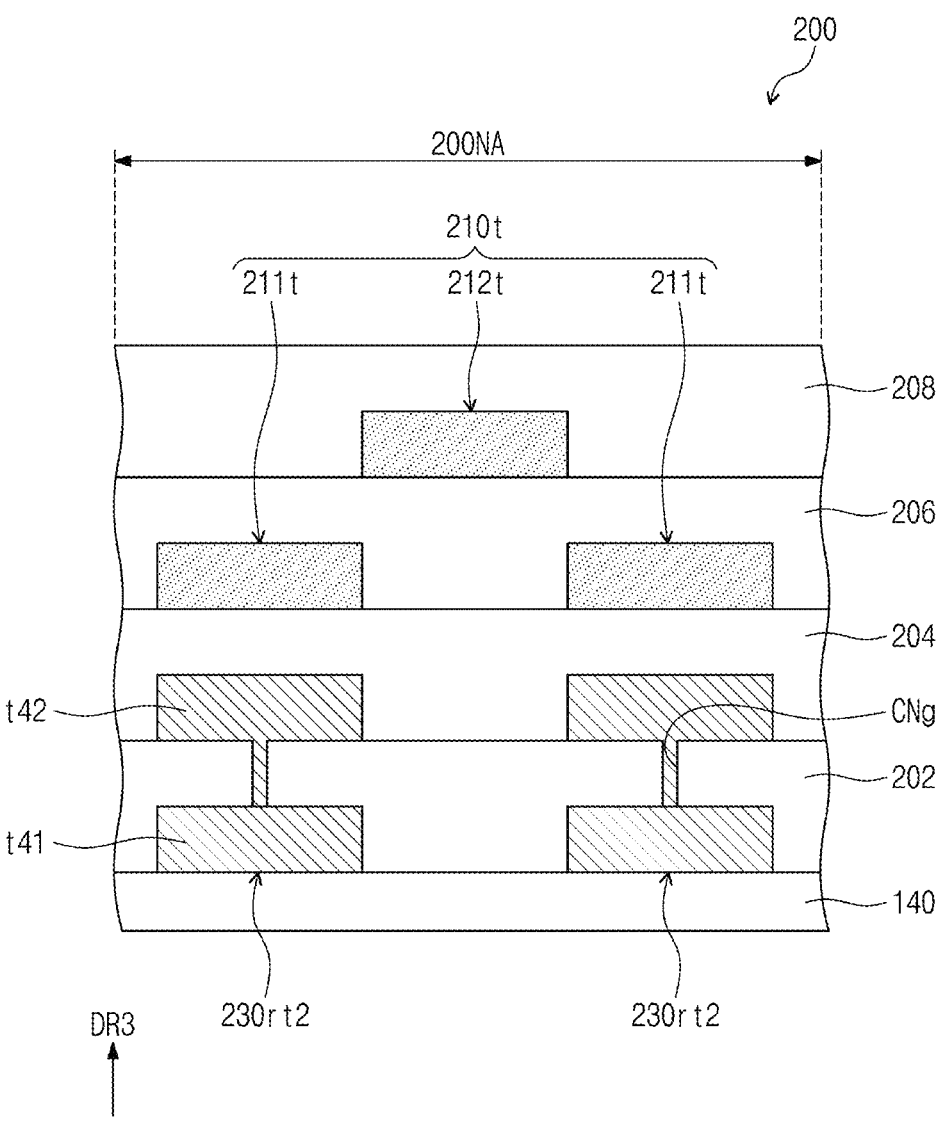
Figure 17C:
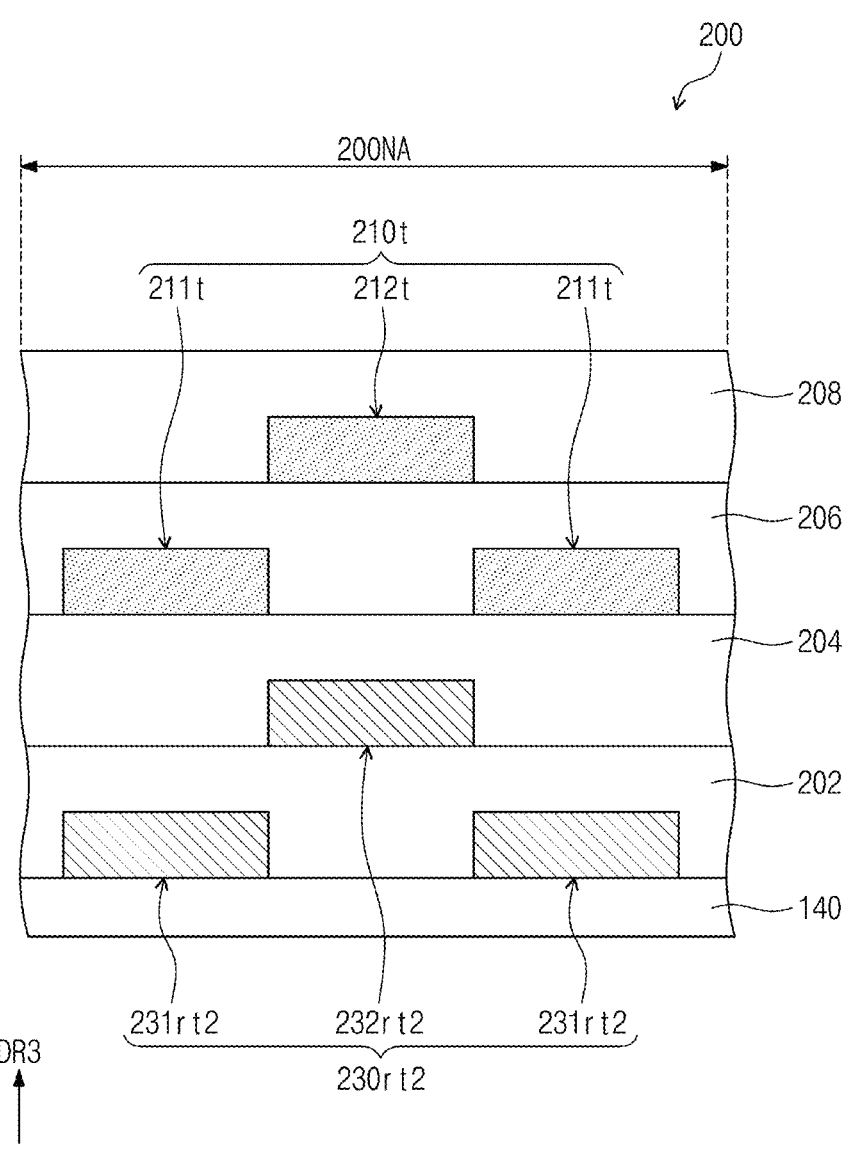

FIGS. 17A to 17C are enlarged cross-sectional views of the portion of the peripheral area 200NA of the sensor layer 200 according to some embodiments of the present disclosure.

Referring to FIGS. 6, 7A, and 17A, the sensor layer 200 may include the first trace lines 210$t$ and the fifth trace lines 230$rt$2 arranged in the peripheral area 200NA. The first trace lines 210$t$ and the fifth trace lines 230$rt$2 may be arranged in the area located on a lower side from the sensing area 200A in the peripheral area 200NA.

Each of the first trace lines 210$t$ may have a multi-layer structure. Each of the first trace lines 210$t$ may include the (3-1)$^{th}$ sub-wiring line t31 and the (3-2)$^{th}$ sub-wiring line t32. That is, each of the first trace lines 210$t$ may have a two-layer structure. For example, the (3-1)$^{th}$ sub-wiring line t31 and the (3-2)$^{th}$ sub-wiring line t32 may be included in the third conductive layer 205 and the fourth conductive layer 207, respectively.

Each of the fifth trace lines 230$rt$2 may not include sub-wiring lines arranged on different layers and may be arranged to be included only in a single layer among the conductive layers. The fifth trace lines 230$rt$2 may be arranged on a different layer from the first trace lines 210$t$.

The fifth trace lines 230$rt$2 may include (3-1)$^{th}$ group lines 231$rt$2 and (3-2)$^{th}$ group lines 232$rt$2 arranged on different layers. The (3-1)$^{th}$ group line 231$rt$2 may be included in the first conductive layer, and the (3-2)$^{th}$ group line 232$rt$2 may be included in the second conductive layer. The plurality of (3-1)$^{th}$ group lines 231$rt$2 and the plurality of (3-2)$^{th}$ group lines 232$rt$2 may be alternately arranged on a plane. Each of the (3-1)$^{th}$ group lines 231$rt$2 may be located between adjacent (3-2)$^{th}$ group lines 232$rt$2, and each of the (3-2)$^{th}$ group lines 232$rt$2 may be located between adjacent (3-1)$^{th}$ group lines 231$rt$2.

According to some embodiments, the sensor layer 200 has a structure including four conductive layers, thus the first trace lines 210$t$ may be provided in a multi-layer structure, and at the same time, the fifth trace lines 230$rt$2 may be provided in a structure in which group lines arranged on different layers are arranged alternately. Therefore, the resistance of the first trace lines 210$t$ may be decreased. As a result, power efficiency may be relatively improved, and sensing sensitivity may be relatively improved. At the same time, the same number of fifth trace lines 230$rt$2 may be arranged in a narrow width as compared to a case in which all of the fifth trace lines 230$rt$2 are arranged on the same layer. Accordingly, the area of the area located on the lower side from the sensing area 200A in the peripheral area 200NA may be decreased. As a result, the area of the front surface of the electronic device 1000 (see FIG. 1A), which is occupied by the peripheral area 200NA, may be decreased, and the narrow bezel may be implemented.

Referring to FIGS. 6, 7A, and 17B, according to some embodiments of the present disclosure, each of the first trace lines 210t may not include sub-wiring lines arranged on different layers and may be included in only a single layer among the conductive layers.

The first trace lines 210t may include $(1-1)^{th}$ group lines 211t and $(1-2)^{th}$ group lines 212t arranged on different layers. The $(1-1)^{th}$ group line 211t may be included in the third conductive layer 205, and the $(1-2)^{th}$ group line 212t may be included in the fourth conductive layer 207. The plurality of $(1-1)^{th}$ group lines 211t and the plurality of $(1-2)^{th}$ group lines 212t may be alternately arranged on a plane. Each of the $(1-1)^{th}$ group lines 211t may be located between adjacent $(1-2)^{th}$ group lines 212t, and each of the $(1-2)^{th}$ group lines 212t may be located between adjacent $(1-1)^{th}$ group lines 211t.

According to some embodiments of the present disclosure, each of the fifth trace lines 230rt2 may have a multi-layer structure. Each of the fifth trace lines 230rt2 may include the $(4-1)^{th}$ sub-wiring line t41 and the $(4-2)^{th}$ sub-wiring line t42. For example, the $(4-1)^{th}$ sub-wiring line t41 and the $(4-2)^{th}$ sub-wiring line t42 may be included in the first conductive layer 201 and the second conductive layer 203, respectively.

Referring to FIGS. 6, 7A, and 17C, according to some embodiments of the present disclosure, the first trace lines 210t and the fifth trace lines 230rt2 may not include sub-wiring lines arranged on different layers and may be included only in a single layer among the conductive layers.

The first trace lines 210t may include the $(1-1)^{th}$ group lines 211t and the $(1-2)^{th}$ group lines 212t arranged on different layers and alternately arranged on a plane. For example, the $(1-1)^{th}$ group line 211t may be included in the third conductive layer 205, and the $(1-2)^{th}$ group line 212t may be included in the fourth conductive layer 207.

The fifth trace lines 230rt2 may include the $(3-1)^{th}$ group lines 231rt2 and the $(3-2)^{th}$ group lines 232rt2 arranged on different layers and alternately arranged on a plane. For example, the $(3-1)^{th}$ group line 231rt2 may be included in the first conductive layer 201, and the $(3-2)^{th}$ group line 232rt2 may be included in the second conductive layer 203.

According to some embodiments, the sensor layer 200 has a structure including four conductive layers, and thus all of the first trace lines 210t and the fifth trace lines 230rt2 may be provided in a structure in which group lines arranged on different layers are alternately arranged. Therefore, the same number of first and fifth trace lines 210t and 230rt2 may be arranged in a narrow width as compared to a case in which the first trace lines 210t are arranged on the same layer, and the fifth trace lines 230rt2 are arranged on the same layer. Accordingly, the area of the area located on the lower side from the sensing area 200A in the peripheral area 200NA may be decreased. As a result, the area of the front surface of the electronic device 1000 (see FIG. 1A), which is occupied by the peripheral area 200NA, may be decreased, and the narrow bezel may be implemented.

Figure 18A:
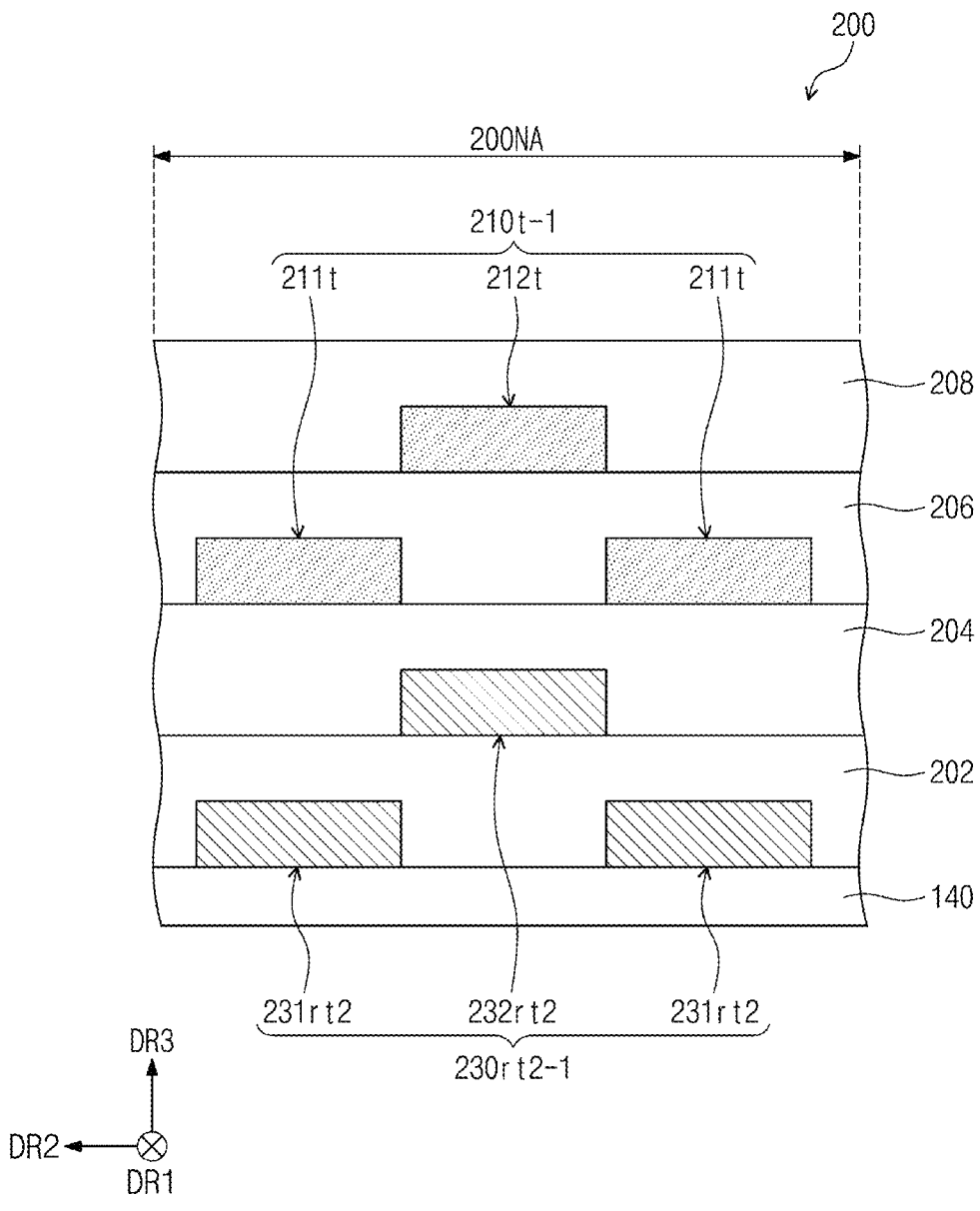
FIGS. 18A and 18B are enlarged cross-sectional views of the portion of the peripheral area of the sensor layer according to some embodiments of the present disclosure.
Figure 18B:
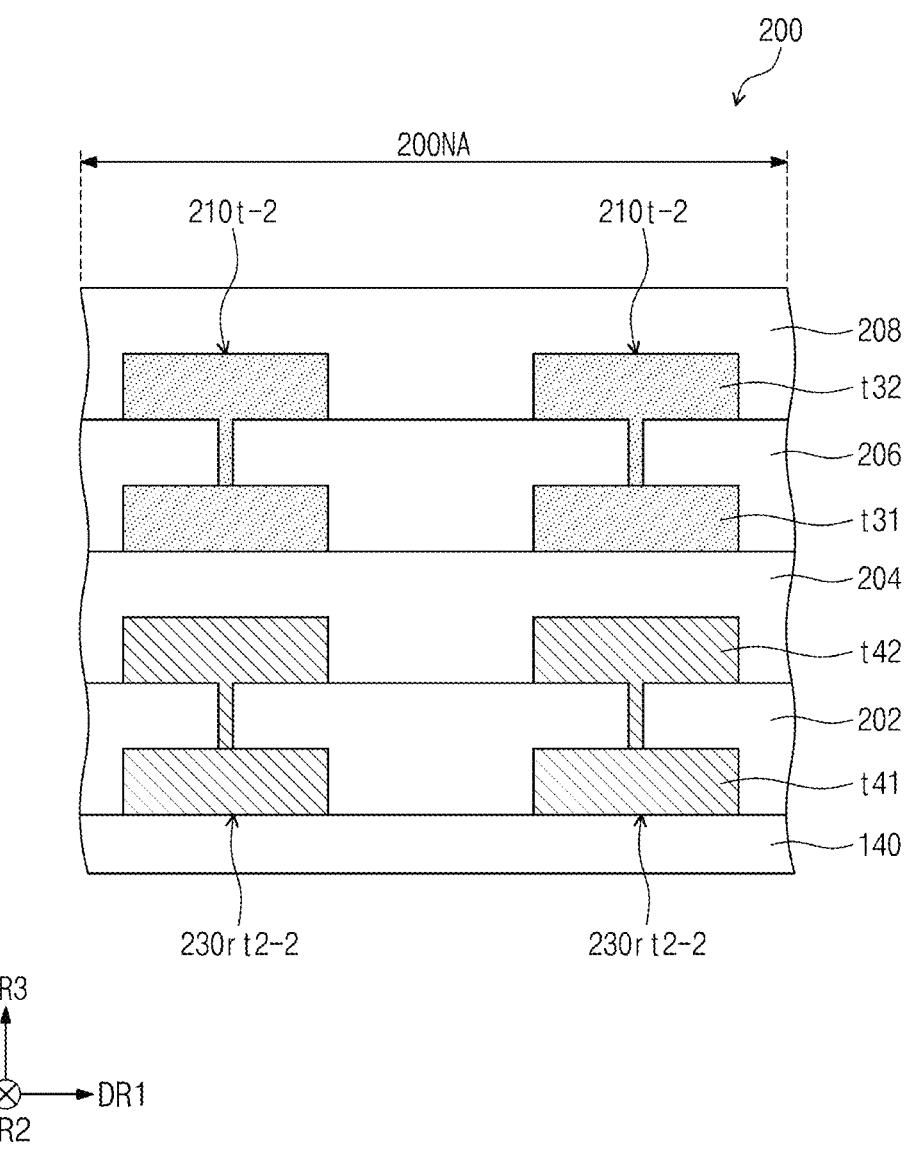

FIGS. 18A and 18B are enlarged cross-sectional views of the portion of the peripheral area 200NA of the sensor layer 200 according to some embodiments of the present disclosure.

Referring to FIGS. 6, 7A, 18A, and 18B, according to some embodiments of the present disclosure, each of the first trace lines 210t may include parts having different structures. Each of the fifth trace lines 230rt2 may include parts having different structures.

According to some embodiments, each of the first trace lines 210t may include a $(1-1)^{th}$ line part 210t-1 extending in the first direction DR1 and a $(2-1)^{th}$ line part 210t-2 extending in the second direction DR2. The $(1-1)^{th}$ line parts 210t-1 of the first trace lines 210t may be arranged in the second direction DR2. The $(2-1)^{th}$ line parts 210t-2 of the first trace lines 210t may be arranged in the first direction DR1. Each of the fifth trace lines 230rt2 may include a $(1-2)^{th}$ line part 230rt2-1 extending in the first direction DR1 and a $(2-2)^{th}$ line part 230rt2-2 extending in the second direction DR2. The $(1-2)^{th}$ line parts 230rt2-1 of the fifth trace lines 230rt2 may be arranged in the second direction DR2. The $(2-2)^{th}$ line parts 230rt2-2 of the fifth trace lines 230rt2 may be arranged in the first direction DR1.

FIG. 18A is an enlarged view illustrating portions of the $(1-1)^{th}$ line parts 210t-1 of the first trace lines 210t and the $(1-2)^{th}$ line parts 230rt2-1 of the fifth trace lines 230rt2, and FIG. 18B is an enlarged view illustrating portions of the $(2-1)^{th}$ line parts 210t-2 of the first trace lines 210t and the $(2-2)^{th}$ line parts 230rt2-2 of the fifth trace lines 230rt2.

The $(1-1)^{th}$ line parts 210t-1 of the first trace lines 210t may include the $(1-1)^{th}$ group lines 211t and the $(1-2)^{th}$ group lines 212t that are arranged on different layers and alternately arranged. Each of the $(2-1)^{th}$ line parts 210t-2 of the first trace lines 210t may have a multi-layer structure. Each of the $(2-1)^{th}$ line parts 210t-2 of the first trace lines 210t may include the $(3-1)^{th}$ sub-wiring line t31 and the $(3-2)^{th}$ sub-wiring line t32.

The $(1-2)^{th}$ line parts 230rt2-1 of the fifth trace lines 230rt2 may include the $(3-1)^{th}$ group lines 231rt2 and the $(3-2)^{th}$ group lines 232rt2 that are arranged on different layers and alternately arranged. Each of the $(2-2)^{th}$ line parts 230rt2-2 of the fifth trace lines 230rt2 may have a multi-layer structure. Each of the $(2-2)^{th}$ line parts 230rt2-2 of the fifth trace lines 230rt2 may include the $(4-1)^{th}$ sub-wiring line t41 and the $(4-2)^{th}$ sub-wiring line t42.

According to some embodiments, by applying an alternately arranged structure to portions of the trace lines arranged in the second direction DR2, the peripheral area 200NA having a decreased width in the second direction DR2 may be provided, and the narrow bezel may be implemented. Meanwhile, the width of the peripheral area in the second direction DR2 may be relatively less affected by portions of the trace lines arranged in the first direction DR1. Accordingly, by applying a multi-layer structure to the portions of the trace lines arranged in the first direction DR1, resistance of the trace lines may be decreased.

Figure 19A:
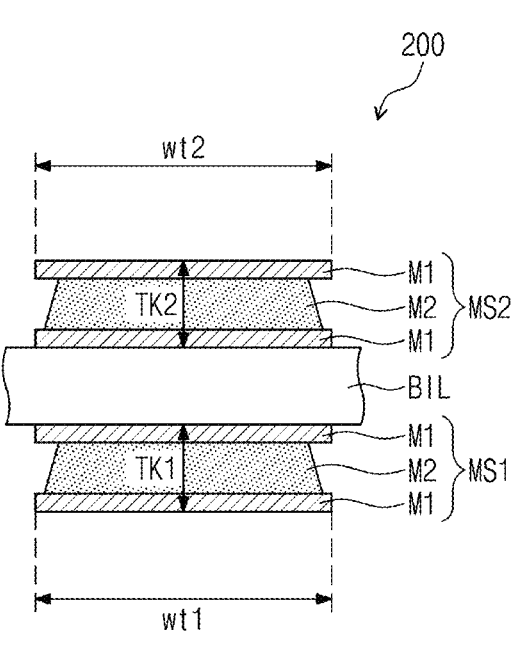
FIGS. 19A to 19C are cross-sectional views of the sensor layer according to some embodiments of the present disclosure.
Figure 19B:
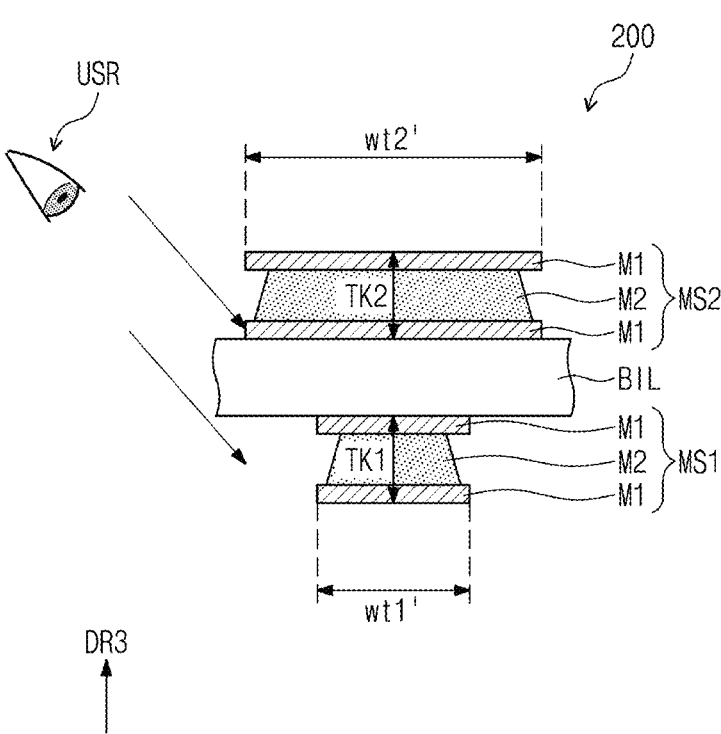
Figure 19C:
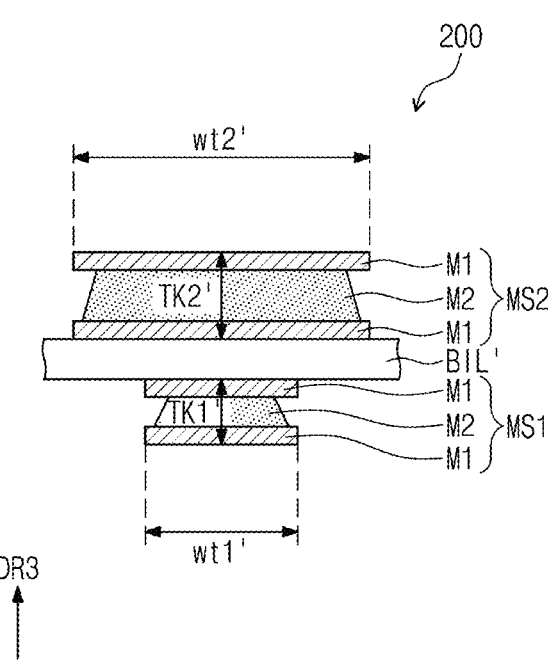

FIGS. 19A, 19B, and 19C are cross-sectional views of the sensor layer 200 according to some embodiments of the present disclosure. FIGS. 19A to 19C are enlarged views illustrating cross sections of a first mesh line MS1 included in one of the first to third conductive layers 201, 203, and 205 (see FIG. 6) and a second mesh line MS2 included in the fourth conductive layer 207 (see FIG. 6).

Referring to FIGS. 6 and 19A to 19C, according to some embodiments, each of the first mesh line MS1 and the second mesh line MS2 may include first metal layers M1 and a second metal layer M2 located between the first metal layers M1. Illustratively, the first metal layers M1 may include titanium (Ti), and the second metal layer M2 may include aluminum (Al). However, this is merely an example, and the structure and materials of the first and second mesh lines MS1 and MS2 are not particularly limited thereto.

As illustrated in FIG. 19A, according to some embodiments of the present disclosure, a first width wt1 of the first mesh line MS1 and a second width wt2 of the second mesh line MS2 may be the same (or substantially the same).

Alternatively, as illustrated in FIGS. 19B and 19C, according to some embodiments of the present disclosure, a first width wt1' of the first mesh line MS1 may be smaller than a second width wt2' of the second mesh line MS2. When a user USR views the first mesh line MS1 and the second mesh line MS2 from a side surface, the first mesh line MS1 has a width that is smaller than that of the second mesh line MS2, and thus a probability that the first mesh line MS1 is visually recognized by the user USR may be decreased.

Referring to FIGS. 6 and 19A to 19C, at least one insulating layer BIL or BIL' may be located between the first mesh line MS1 and the second mesh line MS2, and the insulating layer BIL or BIL' illustrated in FIGS. 19A to 19C may correspond to an insulating layer, which directly covers the first mesh line MS1, among the first to third insulating layers 202, 204, and 206 of the sensor layer 200. For example, when the first mesh line MS1 is included in the third conductive layer 205, the insulating layer BIL or BIL' of the FIGS. 19A to 19C may correspond to the third insulating layer 206.

As illustrated in FIGS. 19A and 19B, according to some embodiments of the present disclosure, the insulating layer BIL may include an organic film. In this case, a first thickness TK1 of the first mesh line MS1 and a second thickness TK2 of the second mesh line MS2 may be set independently of each other without limitation. FIGS. 19A and 19B illustratively illustrate that the first thickness TK1 of the first mesh line MS1 and the second thickness TK2 of the second mesh line MS2 are the same (or substantially the same).

Alternatively, as illustrated in FIG. 19C, according to some embodiments of the present disclosure, the insulating layer BIL' may include an inorganic film. In this case, a first thickness TK1' of the first mesh line MS1 may be set to be thinner than a second thickness TK2' of the second mesh line MS2. A thickness of an electrode including the first mesh line MS1 may be thinner than a thickness of an electrode including the second mesh line MS2. Therefore, it may be possible to prevent or reduce instances of a high level difference being formed in the insulating layer BIL' that covers the first mesh line MS1, and it may be possible to prevent or reduce instances of cracks being formed in the insulating layer BIL'. According to some embodiments, the first mesh line MS1 illustrated in FIG. 19C may be included in the first bridge pattern 12 described above in FIGS. 8A, 8B, 9A, and 9B or the second bridge pattern 22 described above in FIG. 8C.

Figure 20A:
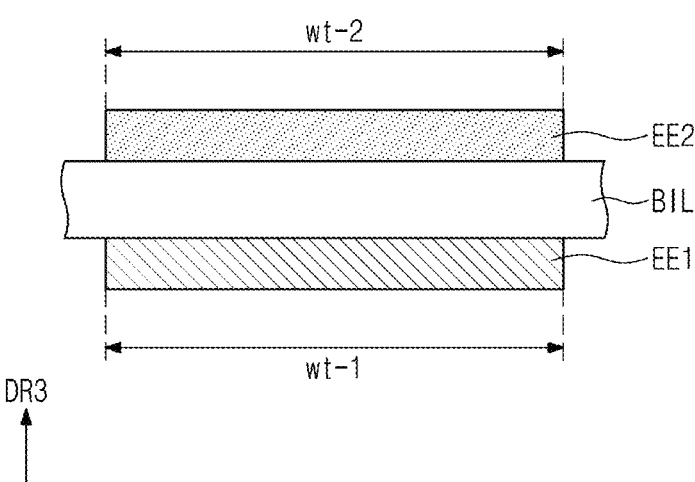
FIGS. 20A and 20B are cross-sectional views of the sensor layer according to some embodiments of the present disclosure.
Figure 20B:
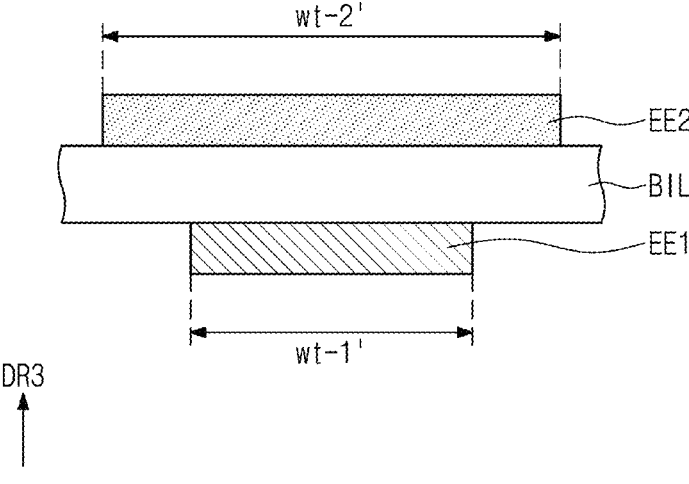

FIGS. 20A and 20B are cross-sectional views of the sensor layer 200 according to some embodiments of the present disclosure. FIGS. 20A and 20B are enlarged views illustrating a cross section of a lower electrode EE1 included in any one of the first to third conductive layers 201, 203, and 205 (see FIG. 6), an upper electrode EE2 included in the fourth conductive layer 207 (see FIG. 6), and the insulating layer BIL located between the lower electrode EE1 and the upper electrode EE2.

The lower electrode EE1 and the upper electrode EE2 illustrated in FIGS. 20A and 20B may be selected as a combination of electrodes, which overlap each other in a thickness direction, among the first to fourth electrodes 210, 220, 230, and 240 (see FIG. 7A). The insulating layer BIL illustrated in FIGS. 20A and 20B may correspond to an insulating layer, which directly covers the lower electrode EE1, among the first to third insulating layers 202, 204, and 206 of the sensor layer 200. For example, when the lower electrode EE1 is included in the third conductive layer 205, the insulating layer BIL of FIGS. 20A and 20B may correspond to the third insulating layer 206.

As illustrated in FIG. 20A, according to some embodiments of the present disclosure, a width wt-1 of the lower electrode EE1 in one direction may be the same (or substantially the same) as a width wt-2 of the upper electrode EE2 in the one direction.

Alternatively, as illustrated in FIG. 20B, according to some embodiments of the present disclosure, a width wt-1' of the lower electrode EE1 in the one direction may be smaller than a width wt-2' of the upper electrode EE2 in the one direction. When the user USR views the lower electrode EE1 and the upper electrode EE2 from a side surface, a probability that the lower electrode EE1 is visually recognized by the user USR may be decreased.

Meanwhile, according to some embodiments of the present disclosure, the lower electrode EE1 may be provided to overlap at least a portion of the upper electrode EE2 in an entire area. That is, the upper electrode EE2 included in the fourth conductive layer 207 may be designed to cover all of the lower electrodes EE1 included in the first to third conductive layers 201, 203, and 205 on a plane. Therefore, the lower electrode EE1 may not be exposed from the upper electrode EE2, and the probability that the lower electrode EE1 is visually recognized by the user USR may be decreased.

Figure 21A:
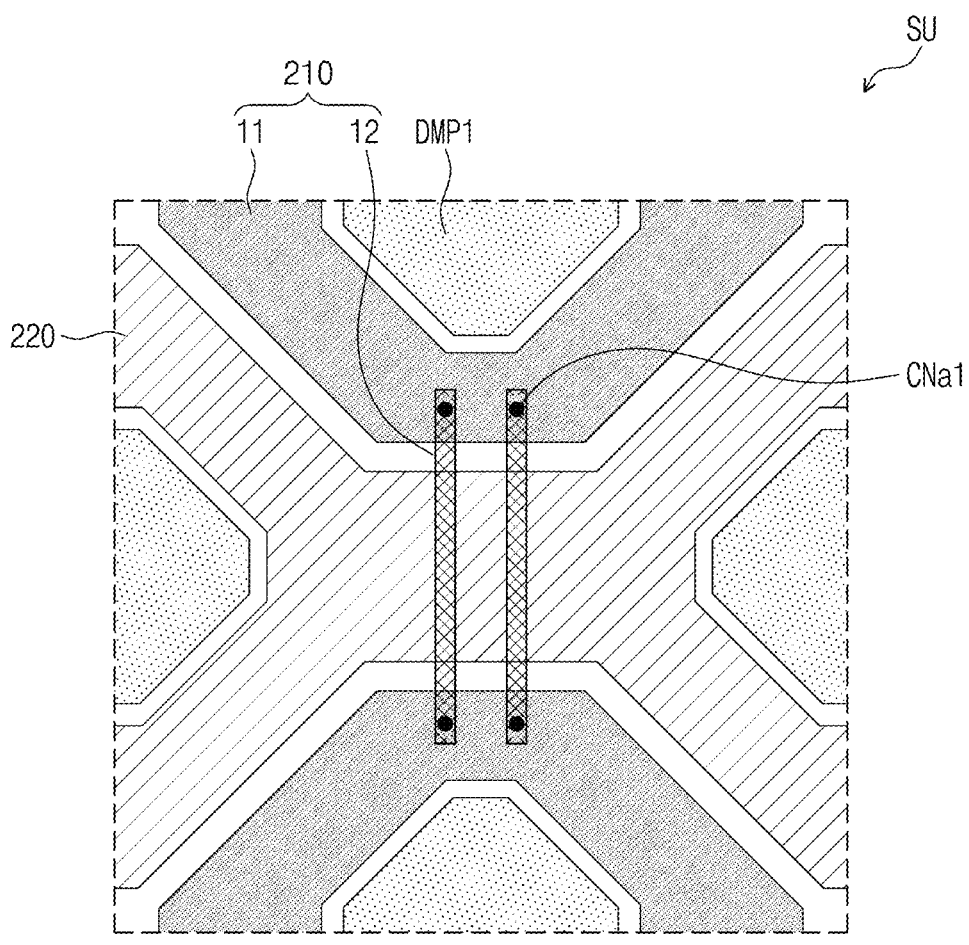
FIG. 21A is a plan view illustrating some electrodes inside a sensing unit according to some embodiments of the present disclosure.
Figure 21A:
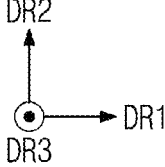
Figure 21B:
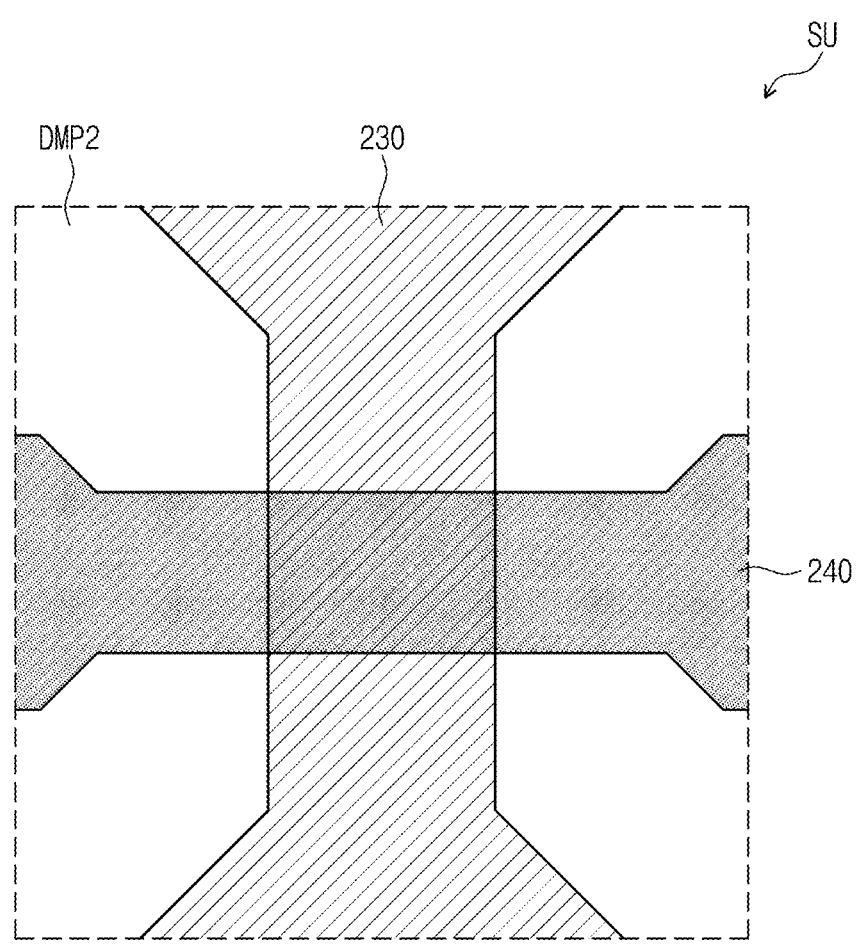
FIG. 21B is a plan view illustrating some electrodes inside the sensing unit according to some embodiments of the present disclosure.
Figure 21B:
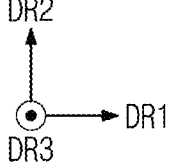

FIG. 21A is a plan view illustrating some electrodes inside the sensing unit SU according to some embodiments of the present disclosure. FIG. 21B is a plan view illustrating some electrodes inside the sensing unit SU according to some embodiments of the present disclosure.

Referring to FIGS. 7A, 21A, and 21B, the one sensing unit SU may include the first electrode 210, the second electrode 220, the third electrode 230, and the fourth electrode 240. FIG. 21A illustratively illustrates the first electrodes 210 and the second electrodes 220 inside the one sensing unit SU, and FIG. 21B illustratively illustrates the third electrodes 230 and the fourth electrodes 240 inside the one sensing unit SU.

Referring to FIGS. 7A and 21A, each of the first electrodes 210 may include the first sensing patterns 11 and the first bridge patterns 12. The first sensing patterns 11 may be spaced apart from each other in the second direction DR2, and the first bridge patterns 12 may extend in the second direction DR2. FIG. 21A illustratively illustrate that two adjacent first sensing patterns 11 are electrically connected to each other through two first bridge patterns 12, but embodiments according to the present disclosure are not particularly limited thereto. For example, the two adjacent first sensing patterns 11 may be electrically connected to each other through the one first bridge pattern 12 or electrically connected to each other through the three or more first bridge patterns 12. Each of the second electrodes 220 may extend in the first direction DR1. According to some embodiments of the present disclosure, an outer edge of each of the first and second electrodes 210 and 220 may be similar to a diamond shape.

According to some embodiments of the present disclosure, the first sensing patterns 11 and the second electrodes 220 may be arranged on the same layer, and the first bridge patterns 12 may be arranged on a layer different from the first sensing patterns 11 and the second electrodes 220. Alternatively, according to some embodiments of the present disclosure, the first electrodes 210 may be arranged on a different layer from the second electrodes 220. FIG. 21A illustratively illustrates that each of the first electrodes 210 includes spaced patterns (e.g., the first sensing patterns 11 and the first bridge patterns 12), but according to some embodiments, each of the first electrodes 210 may continuously extend in one direction, which is similar to the second electrode 220. That is, the first electrodes 210 and the second electrodes 220 may not provide a separate bridge pattern for insulating and intersecting two electrodes in an area in which the first electrodes 210 and the second electrodes 220 intersect each other.

Referring to FIGS. 7A and 21B, each of the third electrodes 230 may extend in the second direction DR2, and each of the fourth electrodes 240 may extend in the first direction DR1. According to some embodiments of the present disclosure, the third electrodes 230 may be arranged on a different layer from the fourth electrodes 240. Accordingly, the third electrodes 230 or the fourth electrodes 240 may not provide a separate bridge pattern for insulating and intersecting two electrodes in an area in which the third electrodes 230 and the fourth electrodes 240 intersect each other.

According to some embodiments of the present disclosure, an area occupied by components included in the first electrode 210 and the second electrode 220 inside the one sensing unit SU may be larger than an area occupied by components included in the third electrode 230 and the fourth electrode 240. A change in the capacitance due to the first input 2000 (see FIG. 4) may be greater as a distance therefrom becomes shorter. Thus, components for sensing the first input 2000 (see FIG. 4) may be arranged in a relatively larger area in a layer adjacent to a surface of the electronic device 1000 (see FIG. 1A). As a result, touch performance may be relatively improved.

According to some embodiments of the present disclosure, at least some of the first to fourth conductive layers 201, 203, 205, and 207 may include dummy patterns DMP1 and DMP2. In conductive layers including the first electrodes 210 and/or the second electrodes 220 among the first to fourth conductive layers 201, 203, 205, and 207, the dummy patterns DMP1 may be arranged in an empty space in which the first electrodes 210 and/or the second electrodes 220 are not arranged. In conductive layers including the third electrodes 230 or the fourth electrodes 240 among the first to fourth conductive layers 201, 203, 205, and 207, the dummy patterns DMP2 may be arranged in an empty space in which the third electrodes 230 or the fourth electrodes 240 are not arranged.

According to some embodiments of the present disclosure, an area of the third electrode 230 and an area of the first sensing pattern 11 may be adjusted. For example, a position of a boundary between the third electrode 230 and the dummy patterns DMP2 and a position of a boundary between the first sensing pattern 11 and the dummy patterns DMP1 may be adjusted. In this case, an area of an overlapping area in which the third electrode 230 and the first sensing pattern 11 overlap each other may be adjusted, and thus, a magnitude of a capacitance of a coupling capacitor between the third electrode 230 and the first sensing pattern 11 may be adjusted.

Figure 22:
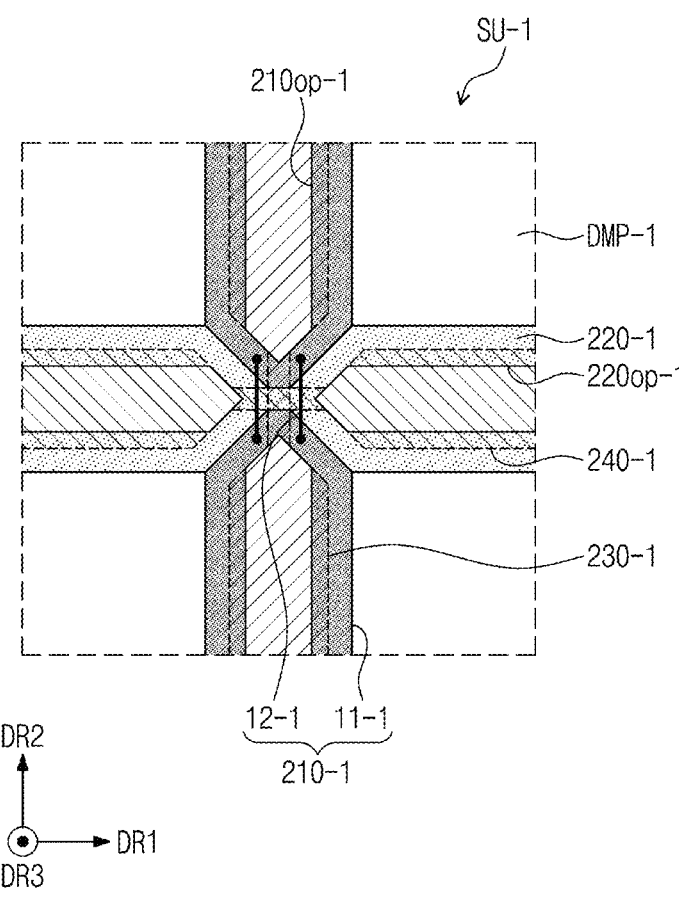
FIG. 22 is a plan view illustrating electrodes inside the sensing unit according to some embodiments of the present disclosure.

FIG. 22 is a plan view illustrating electrodes inside a sensing unit SU-1 according to some embodiments of the present disclosure.

Referring to FIGS. 7A and 22, the one sensing unit SU-1 may include a first electrode 210-1, a second electrode 220-1, a third electrode 230-1, and a fourth electrode 240-1.

Each of the first electrodes 210-1 may include first sensing patterns 11-1 and first bridge patterns 12-1. The first sensing patterns 11-1 may be spaced apart from each other in the second direction DR2, and the first bridge patterns 12-1 may extend in the second direction DR2. FIG. 21A illustratively illustrates that the two adjacent first sensing patterns 11-1 are electrically connected to each other by the two first bridge patterns 12-1, but embodiments according to the present disclosure are not particularly limited thereto. For example, the two adjacent first sensing patterns 11-1 may be electrically connected to each other through the one first bridge pattern 12-1 or electrically connected to each other through the three or more first bridge patterns 12-1. Each of the second electrodes 220-1 may extend in the first direction DR1. According to some embodiments, each of the first and second electrodes 210-1 and 220-1 may be similar to a bar shape extending in a specific direction.

According to some embodiments of the present disclosure, the first sensing patterns 11-1 and the second electrodes 220-1 may be arranged on the same layer, and the first bridge patterns 12-1 may be arranged on a layer different from the first sensing patterns 11-1 and the second electrodes 220-1. Alternatively, according to some embodiments of the present disclosure, the first electrodes 210-1 may be arranged on a different layer from the second electrodes 220-1. FIG. 21A illustratively illustrates that each of the first electrodes 210-1 includes spaced patterns (e.g., the first sensing patterns 11-1 and the first bridge patterns 12-1), but according to some embodiments, each of the first electrodes 210-1 may continuously extend in one direction, which is similar to the second electrode 220-1. That is, the first electrodes 210-1 and the second electrodes 220-1 may not provide a separate bridge pattern for insulating and intersecting two electrodes in an area in which the first electrodes 210-1 and the second electrodes 220-1 intersect each other.

Referring to FIGS. 7A and 22, each of the third electrodes 230-1 may extend in the second direction DR2, and each of the fourth electrodes 240-1 may extend in the first direction DR1. According to some embodiments of the present disclosure, the third electrodes 230-1 may be arranged on a different layer from the fourth electrodes 240-1. Accordingly, the third electrodes 230-1 or the fourth electrodes 240-1 may not provide a separate bridge pattern for insulating and intersecting two electrodes in an area in which the third electrodes 230-1 and the fourth electrodes 240-1 intersect each other.

According to some embodiments of the present disclosure, a first opening 210op-1 may be defined in any one of the first electrode 210-1 and the third electrode 230-1, and a second opening 220op-1 may be defined in any one of the second electrode 220-1 and the fourth electrode 240-1. FIG. 22 illustratively illustrates that the first opening 210op-1 is defined in the first electrode 210-1 and the second opening 220op-1 is defined in the second electrode 220-1, but embodiments according to the present disclosure are not particularly limited thereto.

According to some embodiments of the present disclosure, an area or shape of each of the first opening 210op-1 and the second opening 220op-1 may be adjusted, and thus a capacitance between the first electrode 210-1 and the third electrode 230-1 and a capacitance between the second electrode 220-1 and the fourth electrode 240-1 may be adjusted. Thus, capacitances having appropriate levels in consideration of touch sensitivity and pen sensing sensitivity may be provided. Meanwhile, according to some embodiments, no opening may be defined in all of the first to fourth electrodes 210-1, 220-1, 230-1, and 240-1.

Further, the sensing unit SU-1 may further include dummy patterns DMP-1. The dummy patterns DMP-1 may be floating or electrically floating and may be provided in a space in which the first to fourth electrodes 210-1, 220-1, 230-1, and 240-1 are not arranged.

Meanwhile, referring to FIGS. 21A, 21B, and 22, shapes of the first to fourth electrodes 210, 220, 230, 240, 210-1, 220-1, 230-1, and 240-1 inside the sensing unit SU or SU-1 are illustratively illustrated, but the shapes of the first to fourth electrodes 210, 220, 230, 240, 210-1, 220-1, 230-1, and 240-1 are not limited to the illustrated shapes. According to some embodiments, the first to fourth electrodes may be arranged through the four conductive layers, and thus a ratio of an area that may be utilized for pattern design may be increased, and a shape that may provide more relatively improved touch sensitivity and pen sensing sensitivity may be more easily designed.

Figure 23:
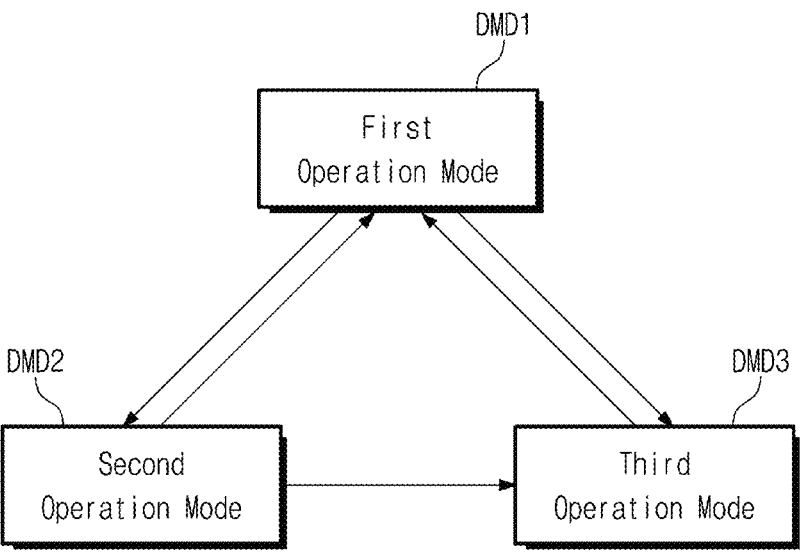
FIG. 23 is a view illustrating an operation of a sensor driving unit according to some embodiments of the present disclosure.
Figure 24:
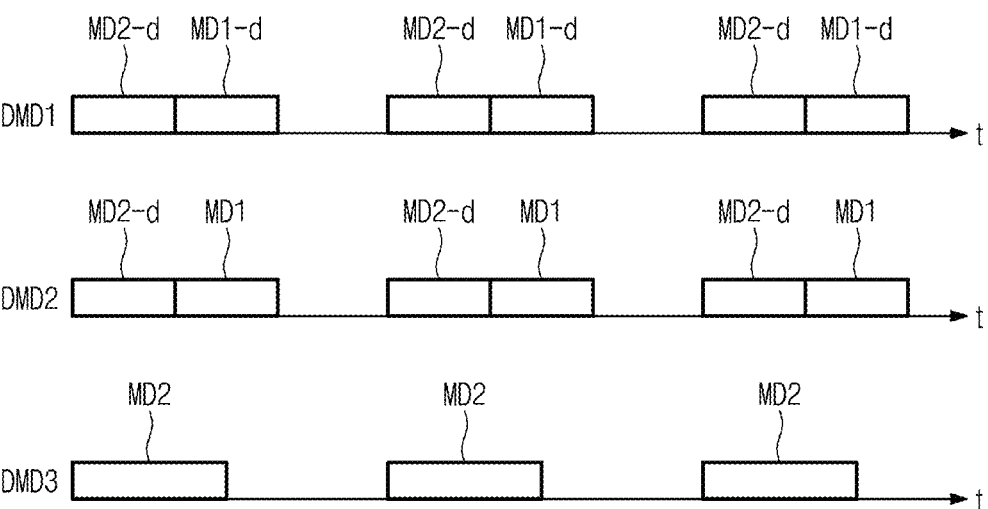
FIG. 24 is a view illustrating the operation of the sensor driving unit according to some embodiments of the present disclosure.

FIG. 23 is a view illustrating an operation of the sensor driving unit 200C (see FIG. 5) according to some embodiments of the present disclosure. FIG. 24 is a view illustrating the operation of the sensor driving unit 200C (see FIG. 5) according to some embodiments of the present disclosure.

Referring to FIGS. 5 and 23, the sensor driving unit 200C may be configured to be selectively driven in one of a first operation mode DMD1, a second operation mode DMD2, and a third operation mode DMD3.

The first operation mode DMD1 may be referred to as a touch and pen waiting mode, the second operation mode DMD2 may be referred to as a touch activation and pen waiting mode, and the third operation mode DMD3 may be referred to as a pen activation mode. The first operation mode DMD1 may be a mode that waits for the first input 2000 and the second input 3000. The second operation mode DMD2 may be a mode that senses the first input 2000 and waits for the second input 3000. The third operation mode DMD3 may be a mode that senses the second input 3000.

According to some embodiments of the present disclosure, the sensor driving unit 200C may be first driven in the first operation mode DMD1. When the first input 2000 is sensed in the first operation mode DMD1, the sensor driving unit 200C may be switched (or changed) to the second operation mode DMD2. Alternatively, when the second input 3000 is sensed in the first operation mode DMD1, the sensor driving unit 200C may be switched (or changed) to the third operation mode DMD3.

According to some embodiments of the present disclosure, when the second input 3000 is sensed in the second operation mode DMD2, the sensor driving unit 200C may be switched to the third operation mode DMD3. When the first input 2000 is released (or not sensed) in the second operation mode DMD2, the sensor driving unit 200C may be switched to the first operation mode DMD1. When the second input 3000 is released (or not sensed) in the third operation mode DMD3, the sensor driving unit 200C may be switched to the first operation mode DMD1.

FIGS. 5, 23, and 24 illustratively illustrate operations in the first to third operation modes DMD1, DMD2, and DMD3 in an order of a time "t."

In the first operation mode DMD1, the sensor driving unit 200C may be repeatedly driven in a second mode MD2-d and a first mode MD1-d. During the second mode MD2-d, the sensor layer 200 may be scan-driven to detect the second input 3000. During the first mode MD1-d, the sensor layer 200 may be scan-driven to detect the first input 2000. FIG. 23 illustratively illustrates that the sensor driving unit 200C is continuously operated in the first mode MD1-d after the second mode MD2-d, but an order thereof is not limited thereto.

In the second operation mode DMD2, the sensor driving unit 200C may be repeatedly driven in the second mode MD2-d and a first mode MD1. During the second mode MD2-d, the sensor layer 200 may be scan-driven to detect the second input 3000. During the first mode MD1, the sensor layer 200 may be scan-driven to detect coordinates by the first input 2000.

In the third operation mode DMD3, the sensor driving unit 200C may be driven in a second mode MD2. During the second mode MD2, the sensor layer 200 may be scan-driven to detect coordinates by the second input 3000. In the third operation mode DMD3, the sensor driving unit 200C may not be operated in the first mode MD1-d or MD1 until the second input 3000 is released (or not sensed).

Referring to FIG. 7A together, in the first mode MD1-d of the first operation mode DMD1 and the first mode MD1 of the second operation mode DMD2, all the third electrodes 230 and the fourth electrodes 240 may be grounded or a constant voltage may be applied thereto. Alternatively, in the first mode MD1-d and the first mode MD1, all of the third electrodes 230 and the fourth electrodes 240 may be floating. Alternatively, in the first mode MD1-d and the first mode MD1, a signal having the same phase as a transmission signal provided to the first electrodes 210 may be applied to the third electrodes 230 and the fourth electrodes 240. In this case, instances of touch noise being introduced through the third electrodes 230 and the fourth electrodes 240 may be prevented or reduced.

In the second mode MD2-d of the first operation mode DMD1 or the second operation mode DMD2 and the second mode MD2 of the third operation mode DMD3, one end of each of the third electrodes 230 and the fourth electrodes 240 may be floating. Further, in the second mode MD2-d and the second mode MD2, the other end of each of the third electrodes 230 and the fourth electrodes 240 may be grounded or floating. Thus, the compensation for the sensing signal may be maximized or increased or improved by coupling between the first electrodes 210 and the third electrodes 230 and coupling between the second electrodes 220 and the fourth electrodes 240.

Figure 25:
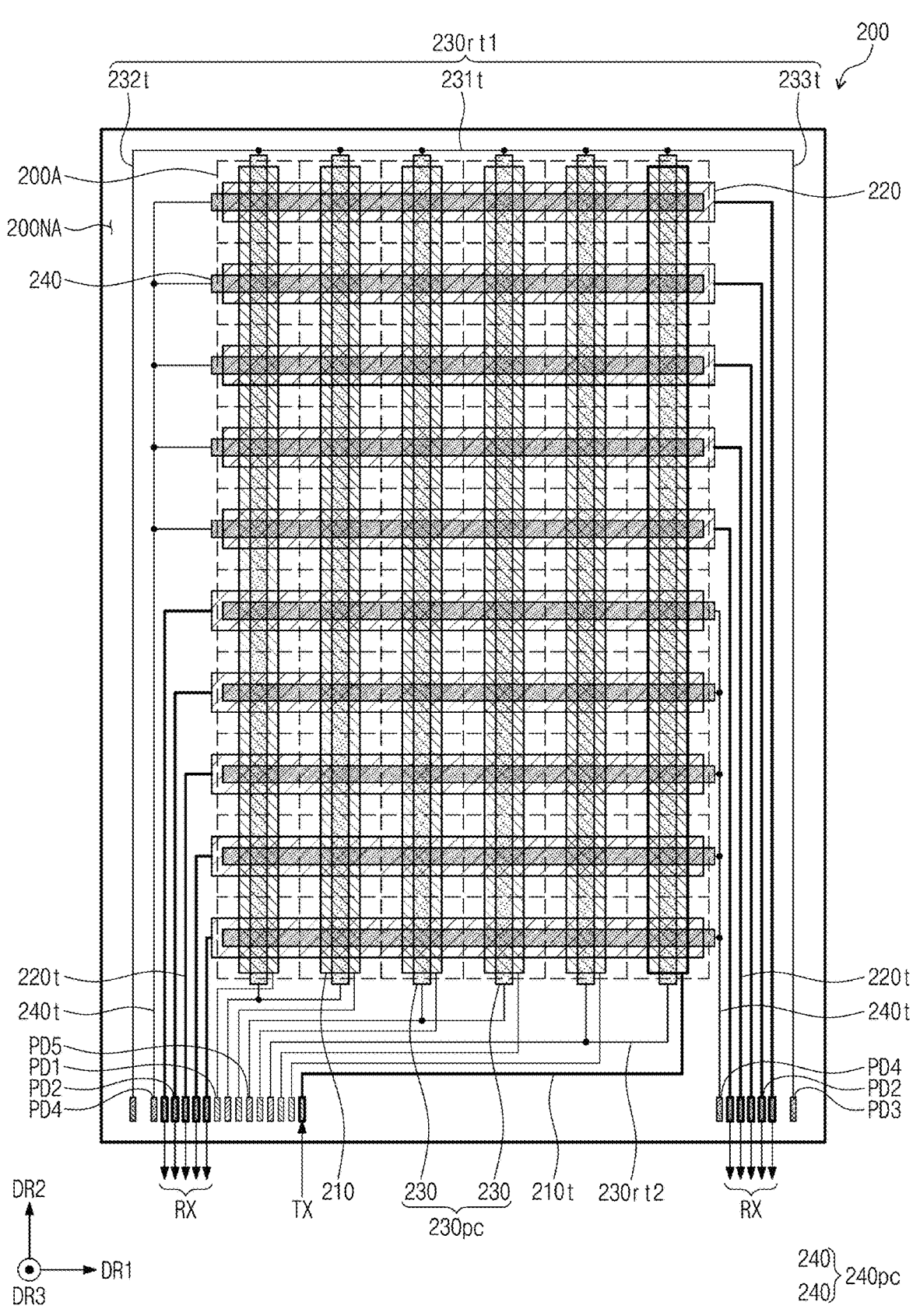
FIG. 25 is a view for describing a first mode according to some embodiments of the present disclosure.

FIG. 25 is a view for describing a first mode according to some embodiments of the present disclosure.

Referring to FIGS. 5, 24, and 25, the first mode MD1-d of the first operation mode DMD1 and the first mode MD1 of the second operation mode DMD2 may include a mutual capacitance detecting mode. FIG. 25 is a view for describing the mutual capacitance detecting mode in the first mode MD1-d of the first operation mode DMD1 and the first mode MD1 of the second operation mode DMD2.

In the mutual capacitance detecting mode, the sensor driving unit 200C may sequentially provide a transmission signal TX to the first electrodes 210 and detect coordinates for the first input 2000 using a reception signal RX detected through the second electrodes 220. For example, the sensor driving unit 200C may calculate input coordinates by sensing a change in a mutual capacitance between the first electrodes 210 and the second electrodes 220.

FIG. 25 illustratively expresses that the transmission signal TX is provided to the one first electrode 210 and the reception signal RX is output from the second electrodes 220. To clarify the expression of the signal, in FIG. 25, only the one first electrode 210 to which the transmission signal TX is provided is indicated in bold. The sensor driving unit 200C may detect input coordinates for the first input 2000 by sensing the change in the capacitance between the first electrodes 210 and the second electrodes 220.

According to some embodiments of the present disclosure, at least one of the first mode MD1-d of the first operation mode DMD1 or the first mode MD1 of the second operation mode DMD2 may further include a self-capacitance detecting mode. In the self-capacitance detecting mode, the sensor driving unit 200C may output driving signals to the first electrodes 210 and the second electrodes 220 and calculate the input coordinates by sensing the change in the capacitance between the first electrodes 210 and the second electrodes 220.

According to some embodiments of the present disclosure, at least one of the first mode MD1-d of the first operation mode DMD1 or the first mode MD1 of the second operation mode DMD2 may further include a self-capacitance detecting mode. In the self-capacitance detecting mode, the sensor driving unit 200C may output the driving signals to the first electrodes 210 and the second electrodes 220 and calculate the input coordinates by sensing the change in the capacitance between the first electrodes 210 and the second electrodes 220. An operation of outputting the driving signals to the first electrodes 210 and the second electrodes 220 may be operated separately at different timings or may be superposed in time.

Figure 26:
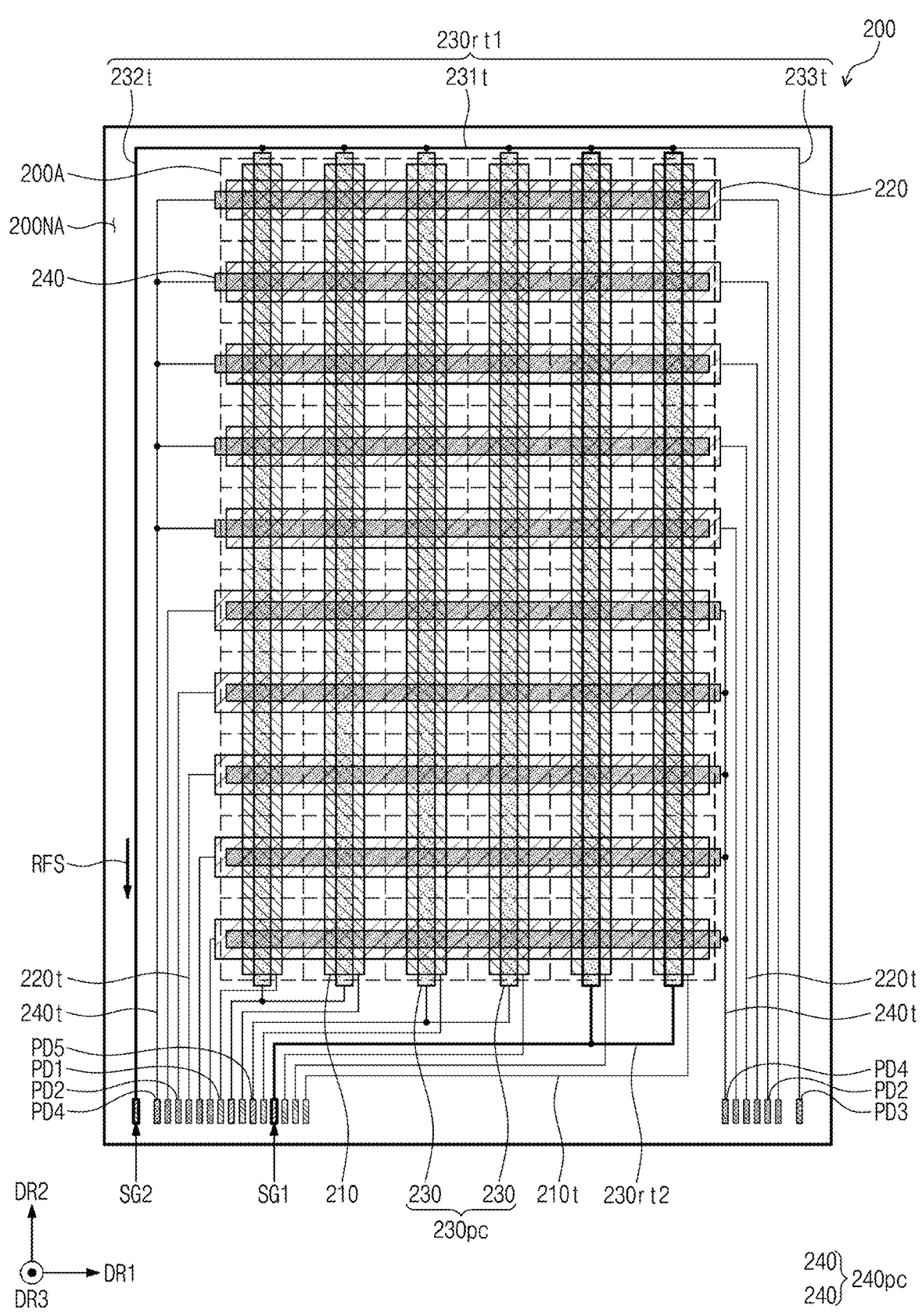
FIG. 26 is a view for describing a second mode according to some embodiments of the present disclosure.
Figure 27A:
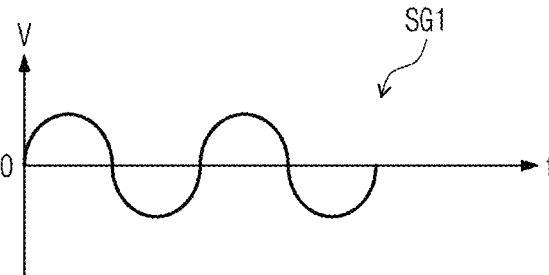
FIG. 27A is a graph depicting a waveform of a first signal according to some embodiments of the present disclosure.
Figure 27B:
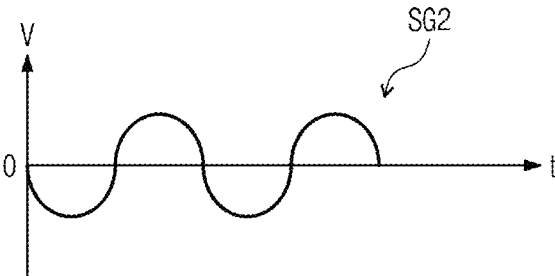
FIG. 27B is a graph depicting a waveform of a second signal according to some embodiments of the present disclosure.

FIG. 26 is a view for describing a second mode according to some embodiments of the present disclosure. FIG. 26 is a view for describing the second mode, particularly, the charging drive mode, according to some embodiments of the present disclosure. FIG. 27A is a graph depicting a waveform of a first signal according to some embodiments of the present disclosure. FIG. 27B is a graph depicting a waveform of a second signal according to some embodiments of the present disclosure.

Referring to FIGS. 5, 26, 27A, and 27B, the second mode MD2 may include the charging drive mode. The charging drive mode may include a searching charging drive mode and a tracking charging drive mode.

The searching charging drive mode may be a drive mode before a position of the pen is sensed. Thus, a first signal SG1 or a second signal SG2 may be provided to all of channels included in the sensor layer 200. That is, in the searching charging drive mode, an entire area of the sensor layer 200 may be scanned. In the searching charging drive mode, when the pen PN is sensed, the sensor layer 200 may be driven for tracking charging. For example, in the tracking charging drive mode, the sensor driving unit 200C may sequentially output the first signal SG1 and the second signal SG2 to an area overlapping a point at which the pen PN is sensed rather than the entire sensor layer 200.

In the charging drive mode, the sensor driving unit 200C may apply the first signal SG1 to one pad among the third pads PD3 and the fifth pads PD5 and apply the second signal SG2 to the other one pad. The second signal SG2 may be an inverse signal of the first signal SG1. For example, the first signal SG1 may be a sinusoidal signal.

Because the first signal SG1 and the second signal SG2 are applied to at least two pads, a current RFS may have a current path flowing to the other one pad through the one pad. Further, because the first signal SG1 and the second signal SG2 are sinusoidal signals having an inverse phase relationship, a direction of the current RFS may be changed periodically. According to some embodiments of the present disclosure, the first signal SG1 and the second signal SG2 may be square wave signals having an inverse phase relationship.

When the first signal SG1 and the second signal SG2 have the inverse phase relationship, noise caused in the display layer 100 (see FIG. 4) by the first signal SG1 may be canceled with noise caused by the second signal SG2. Thus, a flicker phenomenon may not occur in the display layer 100, and display quality of the display layer 100 may be relatively improved.

According to some embodiments of the present disclosure, the first signal SG1 may be a sinusoidal signal. However, embodiments according to the present disclosure are not limited thereto, and the first signal SG1 may be a square wave signal. Further, the second signal SG2 may have a constant voltage (e.g., a set or predetermined constant voltage). For example, the second signal SG2 may be a ground voltage. That is, the pad to which the second signal SG2 is applied may be considered as being grounded. Even in this case, the current RFS may flow from the one pad to the other pad. Further, even when the other one pad is grounded, the first signal SG1 is a sinusoidal wave signal or a square wave signal, and thus the direction of the current RFS may be changed periodically.

FIG. 26 illustrates that the second signal SG2 is provided to the one third pad PD3 connected to the one third trace line 230rt1, and the first signal SG1 is provided to the one fifth pad PD5 connected to the third electrode 230. The current RFS may flow through a current path defined by the fifth pad PD5, the fifth trace line 230rt2 connected to the fifth pad PD5, the third electrode 230, a portion of the third trace line 230rt1 connected to the third pad PD3, and the third pad PD3. The current path may have a coil shape. Thus, in the charging drive mode of the second mode, a resonant circuit of the pen PN may be charged by the current path.

According to the present disclosure, the current path having a loop coil pattern may be implemented by components included in the sensor layer 200. Thus, the electronic device 1000 (see FIG. 1A) may charge the pen PN using the sensor layer 200. Thus, because an additional component having a coil for charging the pen PN is not separately required, an increase in the thickness, an increase in the weight, and a decrease in the flexibility of the electronic device 1000 may not occur.

In the charging drive mode, the first electrodes 210, the second electrodes 220, and the fourth electrodes 240 may be grounded or electrically floating, or a constant voltage may be applied thereto. In particular, the first electrodes 210, the second electrodes 220, and the fourth electrodes 240 may be floating. In this case, the current RFS may not flow through the first electrodes 210, the second electrodes 220, and the fourth electrodes 240.

Figure 28A:
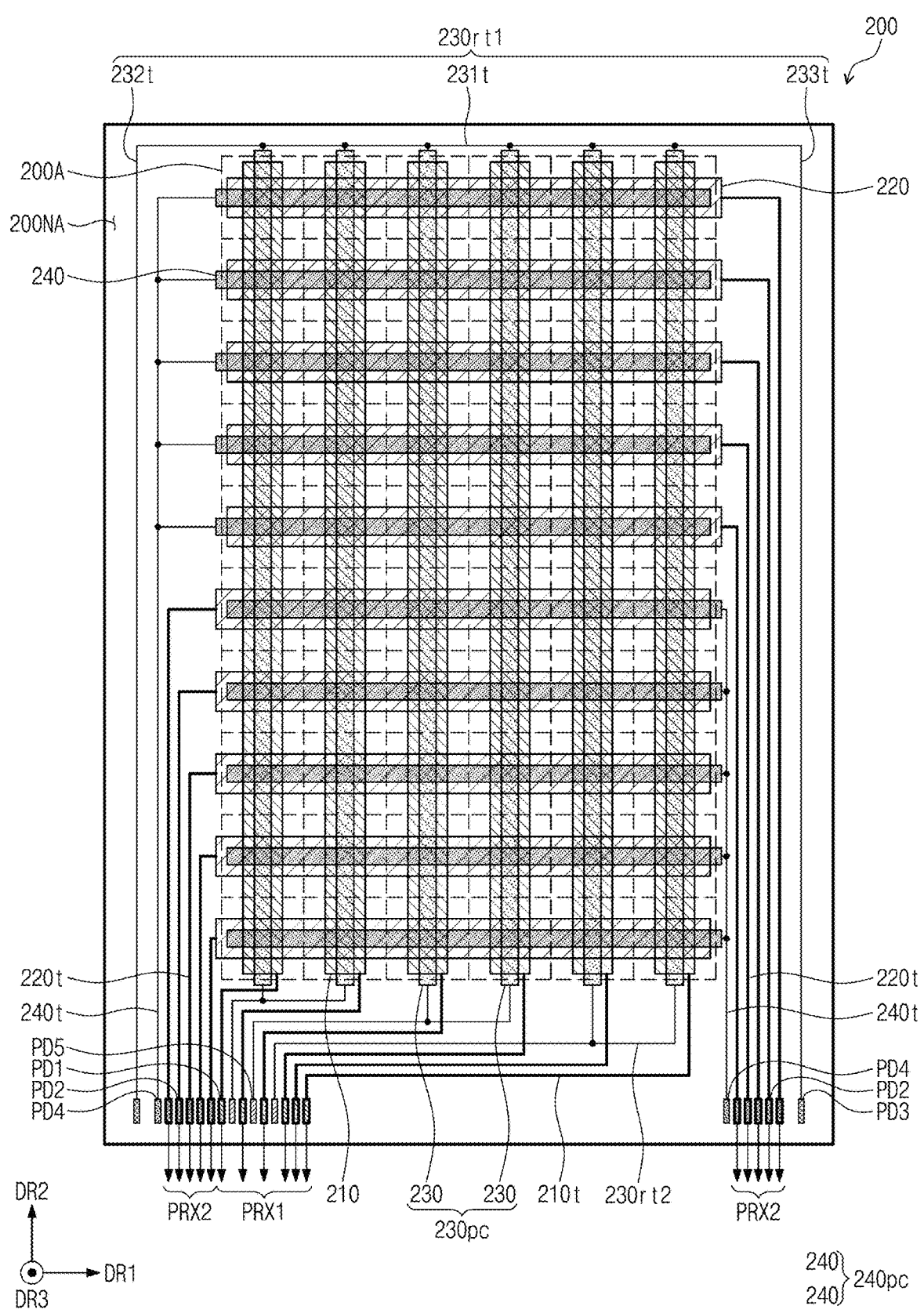
FIG. 28A is a view for describing the second mode according to some embodiments of the present disclosure.
Figure 28B:
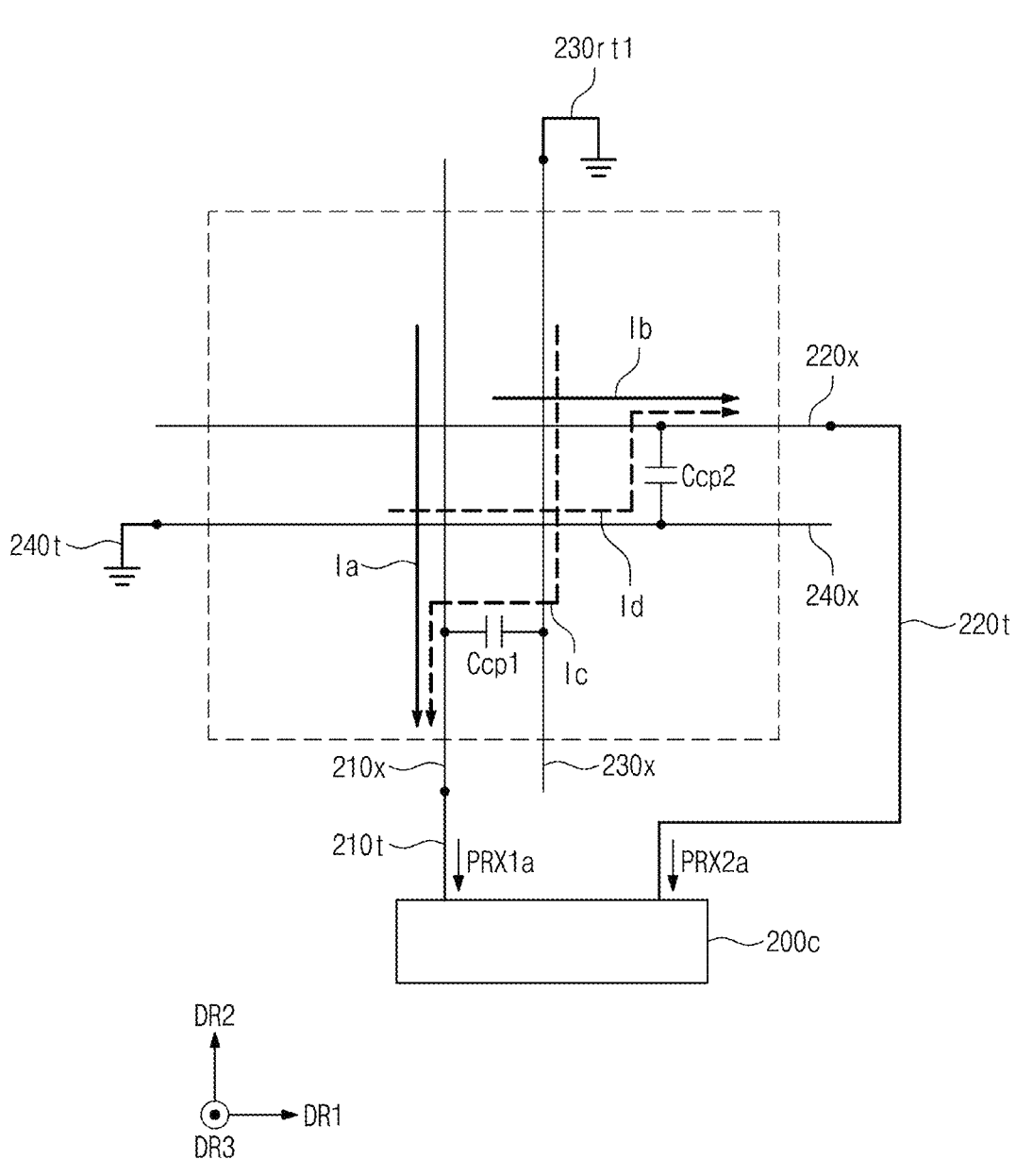
FIG. 28B is a view for describing the second mode according to some embodiments of the present disclosure.
Figure 28C:
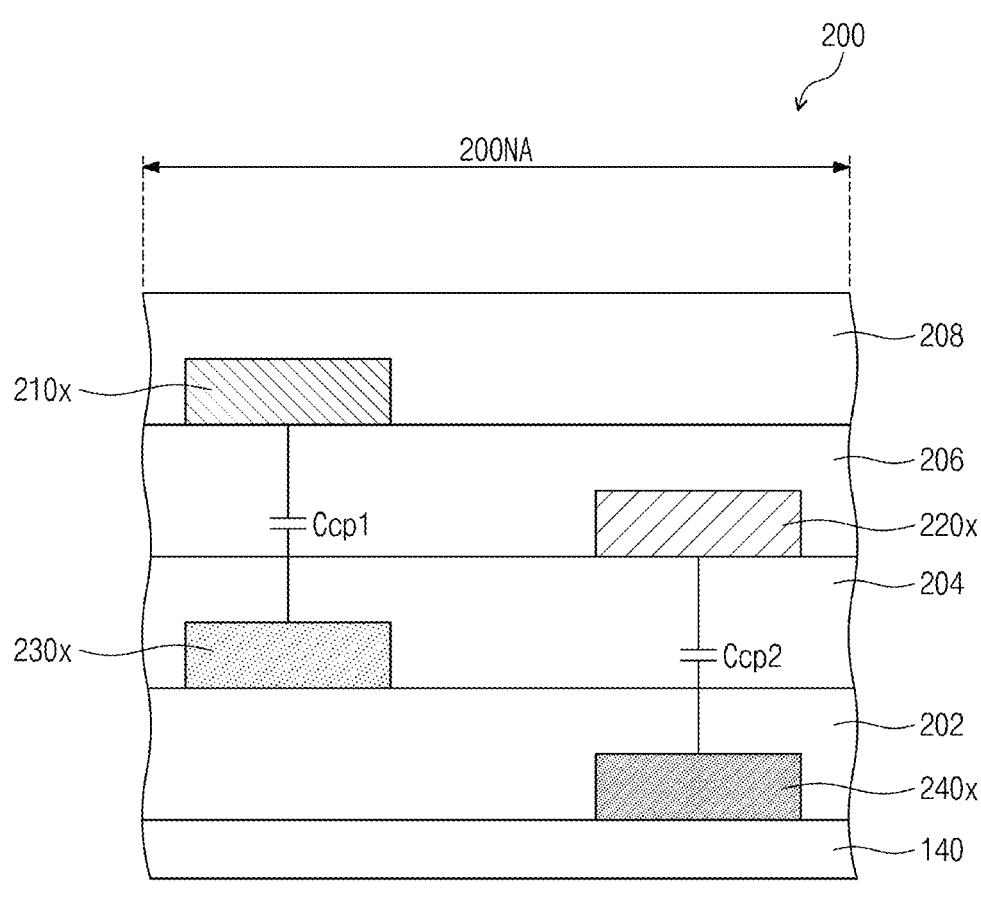
FIG. 28C is a cross-sectional view of the sensor layer according to some embodiments of the present disclosure.

FIG. 28A is a view for describing the second mode according to some embodiments of the present disclosure. FIG. 28B is a view for describing the second mode according to some embodiments of the present disclosure. FIG. 28C is a cross-sectional view of the sensor layer 200 according to some embodiments of the present disclosure.

Referring to FIGS. 5, 28A, and 28B, the second mode may include the charging drive mode and a pen sensing drive mode. FIGS. 28A and 28B are views for describing the pen sensing drive mode. FIG. 28B is an equivalent circuit diagram of a partial configuration of the one sensor layer 200 through which first to fourth induced currents Ia, Ib, Ic, and Id generated by the pen PN flow.

According to some embodiments of the present disclosure, routing directions of the one electrode and the other one electrode of the sensor layer 200, which overlap each other, may be different from each other. For example, a routing direction of a first electrode 210x and a routing direction of a third electrode 230x may be different from each other. Further, a routing direction of a second electrode 220x and a routing direction of a fourth electrode 240x may be different from each other. For example, in FIG. 28B, the first electrode 210x and the first trace line 210t may be connected each other at a lower portion of the sensing unit SU, and the third electrode 230x and the third trace line 230rt1 may be connected to each other at upper portion of the sensing unit SU. The second electrode 220x and the second trace line 220t may be connected to each other on a right side of the sensing unit SU, and the fourth electrode 240x and the fourth trace line 240t may be connected to each other on a left side of the sensing unit SU.

The RLC resonant circuit of the pen PN may emit a magnetic field having a resonant frequency while discharging the charged charges. By the magnetic field provided in the pen PN, the first induced current Ia may be generated in the first electrode 210x, and the second induced current Ib may be generated in the second electrode 220x. Further, the third induced current Ic may be generated in the third electrode 230x, and the fourth induced current Id may be generated in the fourth electrode 240x.

At least a portion of the third electrode 230x may overlap at least a portion of the first electrode 210x. A first coupling capacitor Ccp1 may be formed between the third electrode 230x and the first electrode 210x. At least a portion of the fourth electrode 240x may overlap at least a portion of the second electrode 220x. A second coupling capacitor Ccp2 may be formed between the fourth electrode 240x and the second electrode 220x. The third induced current Ic may be transmitted to the first electrode 210x through the first coupling capacitor Ccp1, and the fourth induced current Id may be transmitted to the second electrode 220x through the second coupling capacitor Ccp2.

The sensor driving unit 200C may receive, from the first electrode 210x, a first reception signal PRX1a based on the first induced current Ia and the third induced current Ic and may receive, from the second electrode 220x, a second reception signal PRX2a based on the second induced current Ib and the fourth induced current Id. The sensor driving unit 200C may detect the input coordinates of the pen PN based on the first reception signal PRX1a and the second reception signal PRX2a.

The sensor driving unit 200C may receive the first reception signal PRX1a from the first electrode 210x and may receive the second reception signal PRX2a from the second electrode 220x. In this case, both ends of the third electrode 230x and the fourth electrode 240x may be floating. Thus, the compensation for the sensing signal may be maximized or increased or improved by coupling second reception signal PRX2a between the first electrode 210x and the third electrode 230x and coupling between the second electrode 220x and the fourth electrode 240x.

Further, the other ends of the third electrode 230x and the fourth electrode 240x may be grounded or floating. Thus, the third induced current Ic and the fourth induced current Id may be sufficiently transmitted to the first electrode 210x and the second electrode 220x by the coupling between the first electrode 210x and the third electrode 230x and the coupling between the second electrode 220x and the fourth electrode 240x.

According to the above description, an input by a pen as well as a touch input may be sensed using a sensor layer. Thus, because an electronic device does not require an additional separate component (e.g., a digitizer) for pen sensing, an increase in a thickness, an increase in a weight, and a decrease in flexibility of the electronic device due to addition of the digitizer may not occur.

Further, the sensor layer may include four conductive layers laminated in a thickness direction, and thus a sufficient area in which electrodes may be arranged inside the sensor layer may be secured. Accordingly, the degree of freedom in designing a pattern of each of the electrodes may be relatively improved. According to some embodiments, electrodes provided for touch sensing and electrodes provided for pen sensing may not be arranged on the same layer, and thus a width of an area in which each of the electrodes provided for touch sensing and the electrodes provided for pen sensing may be located may be maximally secured. As a result, both touch sensing sensitivity and pen sensing sensitivity may be relatively improved.

The sensor layer may include four conductive layers laminated in the thickness direction, and thus trace lines of the sensor layer may be provided in a multi-layer structure. Therefore, resistance of the trace lines may be decreased, thereby relatively improving sensing sensitivity.

The sensor layer may include four conductive layers laminated in the thickness direction, the trace lines of the sensor layer may include group lines arranged on different layers, and the group lines may be alternately arranged when viewed on a plane. Therefore, an area of a peripheral area of the sensor layer may be decreased. As a result, an area of a front surface of the electronic device, which is occupied by the peripheral area, may be decreased, and a narrow bezel may be implemented.

Although the description has been made above with reference to aspects of some embodiments of the present disclosure, it may be understood that those skilled in the art or those having ordinary knowledge in the art may variously modify and change the present disclosure without departing from the spirit and technical scope of the present disclosure described in the appended claims. Thus, the scope of embodiments according to the present disclosure are not limited to the detailed description of the specification but should be defined by the appended claims, and their equivalents.

What is claimed is:

1. An electronic device comprising:
   a sensor layer including a first conductive layer, a second conductive layer on the first conductive layer, a third conductive layer on the second conductive layer, and a fourth conductive layer on the third conductive layer; and
   a sensor driving unit configured to drive the sensor layer and to be selectively operated in a first mode of sensing a touch input or a second mode of sensing a pen input,
   wherein two conductive layers among the first to fourth conductive layers include:
   a plurality of first touch electrodes arranged in a first direction; and
   a plurality of second touch electrodes arranged in a second direction intersecting the first direction and insulated from and intersecting the plurality of first touch electrodes, and
   wherein another two conductive layers among the first to fourth conductive layers include:
   a plurality of first pen electrodes arranged in the first direction; and
   a plurality of second pen electrodes arranged in the second direction and insulated from and intersecting the plurality of first pen electrodes,
   wherein at least one of the plurality of first touch electrodes, the plurality of second touch electrodes, the plurality of first pen electrodes, or the plurality of second pen electrodes includes sub-electrodes arranged on different layers and at least partially overlapping each other.

2. The electronic device of claim 1, wherein each of the plurality of first touch electrodes includes first sensing patterns spaced apart from each other in the second direction and a first bridge pattern connecting the first sensing patterns, and wherein the first sensing patterns and the plurality of second touch electrodes are included in the fourth conductive layer, and the first bridge pattern is included in the third conductive layer.

3. The electronic device of claim 2, wherein the plurality of first pen electrodes are included in one of the first conductive layer and the second conductive layer, and the plurality of second pen electrodes are included in the other one of the first conductive layer and the second conductive layer.

4. The electronic device of claim 1, wherein each of the plurality of second touch electrodes includes second sensing patterns spaced apart from each other in the first direction and a second bridge pattern connecting the second sensing patterns, and wherein the second sensing patterns and the plurality of first touch electrodes are included in the fourth conductive layer, and the second bridge pattern is included in the third conductive layer.

5. The electronic device of claim 1, wherein each of the plurality of first touch electrodes includes first sensing patterns spaced apart from each other in the second direction and a first bridge pattern connecting the first sensing patterns, and wherein the first sensing patterns and the plurality of second touch electrodes are included in the second conductive layer, and the first bridge pattern is included in the first conductive layer.

6. The electronic device of claim 5, wherein the plurality of first pen electrodes are included in one of the third conductive layer and the fourth conductive layer, and the plurality of second pen electrodes are included in the other one of the third conductive layer and the fourth conductive layer.

7. The electronic device of claim 1, wherein the plurality of first touch electrodes are included in one of the third conductive layer and the fourth conductive layer, and the plurality of second touch electrodes are included in another one of the third conductive layer and the fourth conductive layer.

8. The electronic device of claim 7, wherein the plurality of first pen electrodes are included in one of the first conductive layer and the second conductive layer, and the plurality of second pen electrodes are included in another one of the first conductive layer and the second conductive layer.

9. The electronic device of claim 1, wherein the plurality of first touch electrodes are included in one of the first conductive layer and the second conductive layer, and the plurality of second touch electrodes are included in another one of the first conductive layer and the second conductive layer.

10. The electronic device of claim 9, wherein the plurality of first pen electrodes are included in one of the third conductive layer and the fourth conductive layer, and the plurality of second pen electrodes are included in another one of the third conductive layer and the fourth conductive layer.

11. The electronic device of claim 1, wherein each of the plurality of first touch electrodes, the plurality of second touch electrodes, the plurality of first pen electrodes, and the plurality of second pen electrodes has a mesh structure.

12. The electronic device of claim 1, wherein at least one of the first to fourth conductive layers further includes dummy patterns that are floating.

13. The electronic device of claim 12, wherein each of the plurality of first touch electrodes, the plurality of second touch electrodes, the plurality of first pen electrodes, the plurality of second pen electrodes, and the dummy patterns has a mesh structure, and wherein a boundary of each of the plurality of first touch electrodes, the plurality of second touch electrodes, the plurality of first pen electrodes, the plurality of second pen electrodes, and the dummy patterns corresponds to a cutting line that cuts the mesh structure.

14. The electronic device of claim 1, wherein at least a portion of each of the plurality of first pen electrodes overlaps at least a portion of a corresponding first touch electrode among the plurality of first touch electrodes, and wherein at least a portion of each of the plurality of second pen electrodes overlaps at least a portion of a corresponding second touch electrode among the plurality of second touch electrodes.

15. An electronic device comprising:

a sensor layer including a first conductive layer, a second conductive layer on the first conductive layer, a third conductive layer on the second conductive layer, and a fourth conductive layer on the third conductive layer; and a sensor driving unit configured to drive the sensor layer and to be selectively operated in a first mode of sensing a touch input or a second mode of sensing a pen input, wherein two conductive layers among the first to fourth conductive layers include:

a plurality of first touch electrodes arranged in a first direction; and a plurality of second touch electrodes arranged in a second direction intersecting the first direction and insulated from and intersecting the plurality of first touch electrodes, and wherein another two conductive layers among the first to fourth conductive layers include:

a plurality of first pen electrodes arranged in the first direction; and a plurality of second pen electrodes arranged in the second direction and insulated from and intersecting the plurality of first pen electrodes, wherein the sensor layer further includes a plurality of first trace lines electrically connected to the plurality of first touch electrodes, and wherein each of the plurality of first trace lines has a two-layer structure including two sub-wiring lines arranged on different layers.

16. The electronic device of claim 1, wherein the sensor layer further includes a plurality of first trace lines electrically connected to the plurality of first touch electrodes, and wherein the plurality of first trace lines include $(1\text{-}1)^{th}$ group lines and $(1\text{-}2)^{th}$ group lines arranged on different layers and alternately arranged, each of the $(1\text{-}1)^{th}$ group lines is included in one of the first to fourth conductive layers, and each of the $(1\text{-}2)^{th}$ group lines is included in another one of the first to fourth conductive layers.

17. The electronic device of claim 1, wherein the sensor layer further includes a plurality of second trace lines electrically connected to the plurality of second touch electrodes, and wherein each of the plurality of second trace lines has a multi-layer structure.

18. The electronic device of claim 17, wherein each of the plurality of second trace lines has a four-layer structure including four sub-wiring lines arranged on different layers.

19. The electronic device of claim 17, wherein the plurality of second trace lines include $(2\text{-}1)^{th}$ group lines and $(2\text{-}2)^{th}$ group lines arranged on different layers and alternately arranged, and each of the $(2\text{-}1)^{th}$ group lines and the $(2\text{-}2)^{th}$ group lines has a two-layer structure including two sub-wiring lines arranged on different layers.

20. The electronic device of claim 1, wherein the sensor layer further includes a third trace line electrically connected to all of the plurality of first pen electrodes.

21. The electronic device of claim 1, wherein the sensor layer further includes a fourth trace line electrically connected to at least some of the plurality of second pen electrodes, and wherein the plurality of fourth trace line has a multi-layer structure.

22. The electronic device of claim 1, wherein the sensor layer further includes a plurality of fifth trace lines electrically connected to the plurality of first pen electrodes, and wherein each of the plurality of fifth trace lines has a two-layer structure including two sub-wiring lines arranged on different layers.

23. The electronic device of claim 1, wherein the sensor layer further includes a plurality of fifth trace lines electrically connected to the plurality of first pen electrodes, and wherein the plurality of fifth trace lines include $(3\text{-}1)^{th}$ group lines and $(3\text{-}2)^{th}$ group lines arranged on different layers and arranged alternately, each of the $(3\text{-}1)^{th}$ group lines is included in one of the first to fourth conductive layers, and each of the $(3\text{-}2)^{th}$ group lines is included in another one of the first to fourth conductive layers.

24. The electronic device of claim 1, wherein the sensor layer further includes:

a plurality of first trace lines electrically connected to the plurality of first touch electrodes; and a plurality of fifth trace lines electrically connected to the plurality of first pen electrodes, and wherein the plurality of first trace lines are included in two of the first to fourth conductive layers, and the plurality of fifth trace lines are included in another two of the first to fourth conductive layers.

25. The electronic device of claim 24, wherein each of the plurality of first trace lines includes a $(1\text{-}1)^{th}$ line part and a $(1\text{-}2)^{th}$ line part having different structures, and each of the plurality of fifth trace lines includes a $(2\text{-}1)^{th}$ line part and a $(2\text{-}2)^{th}$ line part having different structures.

26. The electronic device of claim 25, wherein the sensor layer further includes a plurality of pads connected to the first trace lines and the fifth trace lines, and a sensing area and a peripheral area adjacent to the sensing area are defined in the sensor layer, and wherein the plurality of first trace lines and the plurality of fifth trace lines are arranged between the sensing area and the plurality of pads.

27. The electronic device of claim 1, wherein electrodes included in the first to third conductive layers among the plurality of first touch electrodes, the plurality of second touch electrodes, the plurality of first pen electrodes, and the plurality of second pen electrodes are defined as lower electrodes, and wherein electrodes included in the fourth conductive layer among the plurality of first touch electrodes, the plurality of second touch electrodes, the plurality of first pen electrodes, and the plurality of second pen electrodes are defined as upper electrodes.

28. The electronic device of claim 27, wherein, in a plan view, all of the lower electrodes overlap the upper electrodes.

29. The electronic device of claim 27, wherein a width of the upper electrodes in one direction is smaller than or equal to as a width of the lower electrodes in the one direction.

30. The electronic device of claim 27, wherein the sensor layer further includes a first insulating layer configured to cover lower electrodes included in the first conductive layer among the lower electrodes, a second insulating layer configured to cover lower electrodes included in the second conductive layer among the lower electrodes, and a third insulating layer configured to cover lower electrodes included in the third conductive layer among the lower electrodes, and wherein at least one of the first to third insulating layers includes an inorganic film, and a thickness of the lower electrodes, which is directly covered by the at least one of the first to third insulating layers including the inorganic film, among the first to third insulating layers, is smaller than a thickness of the upper electrodes.

31. The electronic device of claim 1, wherein, in the first mode, the plurality of first touch electrodes and the plurality of second touch electrodes are configured to sense capacitance, and the plurality of first pen electrodes and the plurality of second pen electrodes are grounded, and wherein the second mode includes a pen sensing drive mode, and in the pen sensing drive mode, the sensor driving unit is configured to receive reception signals based on induced currents flowing through the plurality of first touch electrodes, the plurality of second touch electrodes, the plurality of first pen electrodes, and the plurality of second pen electrodes.

32. The electronic device of claim 31, wherein the second mode further includes a charging drive mode, and in the charging drive mode, a current path defined by at least the plurality of first pen electrodes is formed, and the plurality of first touch electrodes, the plurality of second touch electrodes, and the plurality of second pen electrodes are floating.

33. An electronic device comprising:

a sensor layer; and a sensor driving unit configured to drive the sensor layer and to be selectively operated in a first mode of sensing a touch input or a second mode of sensing a pen input, wherein the sensor layer includes:

a plurality of first touch electrodes arranged in a first direction;

a plurality of second touch electrodes arranged in a second direction intersecting the first direction and insulated from and intersecting the plurality of first touch electrodes;

a plurality of first pen electrodes arranged in the first direction; and a plurality of second pen electrodes arranged in the second direction and insulated from and intersecting the plurality of first pen electrodes, and wherein the plurality of first touch electrodes and the plurality of second touch electrodes are arranged on a different layer from the plurality of first pen electrodes and the plurality of second pen electrodes, wherein at least one of the plurality of first touch electrodes, the plurality of second touch electrodes, the plurality of first pen electrodes, or the plurality of second pen electrodes includes sub-electrodes arranged on different layers and at least partially overlapping each other.

34. The electronic device of claim 33, wherein the sensor layer includes:

a first conductive layer and a second conductive layer including a plurality of first electrodes arranged in the first direction and a plurality of second electrodes arranged in the second direction intersecting the first direction and insulated from and intersecting the plurality of first electrodes; and a third conductive layer and a fourth conductive layer including a plurality of first auxiliary electrodes arranged in the first direction and a plurality of second auxiliary electrodes arranged in the second direction and insulated from and intersecting the plurality of first auxiliary electrodes.

* * * * *